United States Patent
Shah et al.

(10) Patent No.: US 12,375,470 B2
(45) Date of Patent: *Jul. 29, 2025

(54) DYNAMIC USER INTERFACE (UI) FRAMEWORK

(71) Applicant: Citizens Financial Group, Inc., Providence, RI (US)

(72) Inventors: Rajesh K. Shah, Parsippany, NJ (US); Arif Sufi, Harrison, NJ (US); Balamurugan Muthu, Phoenix, AZ (US); Sudip Mukhopadhyay, Jamaica, NY (US); Deepak Nayak, Dayton, NJ (US); Christine Roberts, Wayland, MA (US); Ryan Pearson, Cumberland, RI (US); Jeffrey M. Mayerson, Addison, TX (US); Christopher C. Ebeling, Westwood, MA (US); Kalyan C. Gottipati, Phoenix, AZ (US)

(73) Assignee: Citizens Financial Group, Inc., Providence, RI (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/482,947

(22) Filed: Oct. 9, 2023

(65) Prior Publication Data
US 2024/0146712 A1    May 2, 2024

Related U.S. Application Data

(63) Continuation of application No. 18/348,631, filed on Jul. 7, 2023, now Pat. No. 11,818,115.
(Continued)

(51) Int. Cl.
*H04L 9/40* (2022.01)
*G06F 21/62* (2013.01)

(52) U.S. Cl.
CPC ...... *H04L 63/0815* (2013.01); *G06F 21/6245* (2013.01); *H04L 63/20* (2013.01)

(58) Field of Classification Search
CPC ................ H04L 63/0815; H04L 63/20; G06F 21/6245
See application file for complete search history.

(56) References Cited

U.S. PATENT DOCUMENTS

| 9,258,344 | B2 | 2/2016 | Sharaga et al. |
| 10,698,738 | B1 | 6/2020 | Sun |

(Continued)

OTHER PUBLICATIONS

Boroujeni (Development of a Shared Authentica-Tion System—A Microservice Approach, Master of Science Thesis Nov. 2019, 65 pages), (Year 2019).

(Continued)

*Primary Examiner* — Oleg Korsak
(74) *Attorney, Agent, or Firm* — Ice Miller LLP; Richard L. Cruz

(57) ABSTRACT

A unified platform may comprise a combination of independent frameworks that have been integrated and configured to collaboratively operate seamlessly. In some aspects, the unified platform may comprise one or more of an authentication and authorization framework, a dynamic user interface framework, a workflow state management framework, a notification and active data loss and prevention (DLP) engine framework, and an orchestration engine framework. Each of the frameworks included in the unified platform may comprise one or more of the plurality of computing devices executing computer-readable program instructions.

27 Claims, 25 Drawing Sheets

Related U.S. Application Data

(60) Provisional application No. 63/423,530, filed on Nov. 8, 2022, provisional application No. 63/423,652, filed on Nov. 8, 2022, provisional application No. 63/422,180, filed on Nov. 3, 2022, provisional application No. 63/422,029, filed on Nov. 3, 2022, provisional application No. 63/421,785, filed on Nov. 2, 2022, provisional application No. 63/421,797, filed on Nov. 2, 2022.

(56) References Cited

U.S. PATENT DOCUMENTS

| | | |
|---|---|---|
| 11,818,115 B1 | 11/2023 | Shah |
| 2004/0172445 A1 | 9/2004 | Singh |
| 2013/0081126 A1 | 3/2013 | Soukup |
| 2014/0189123 A1 | 7/2014 | Dodd |
| 2015/0088558 A1 | 3/2015 | Guyan et al. |
| 2016/0124742 A1 | 5/2016 | Rangasamy et al. |
| 2016/0127352 A1 | 5/2016 | Xu |
| 2018/0176326 A1* | 6/2018 | Shantharam .......... H04L 69/329 |
| 2019/0355068 A1* | 11/2019 | Yu ........................ G06Q 40/123 |
| 2020/0065897 A1 | 2/2020 | McBride |
| 2022/0116381 A1 | 4/2022 | Bosch |
| 2023/0247003 A1 | 8/2023 | Chanak et al. |

OTHER PUBLICATIONS

TitleEditor (Nondeterministic finite automaton, WikipediA, May 6, 2022, 10 pages) (Year: 2022).

Jgeek1: "Microservice orchestration using camunda 8 and API gateway," Sep. 2022 [12 Pages].

Suhas Pai, "Automated Data Classification for Mainframes," Eindhoven University of Technology, 2012 [110 Pages].

* cited by examiner

1310 — SMS: OTP and Balance Transfers

Update your account info

Your Verification Code

Hi, Here's the verification code you requested: 076102

If you did not make this request, please contact us at (877) 123-5789

1320 — Balance Transfer SMS channel

2:58

Text Message
Today 2:51 PM

Dear Harshad, your request for fund transfer is successful. You have transferred $250.32 from xxxxxx4564 to xxxxxx9200.

1330 — Direct Mail: Adverse Action Letters:

Student Lending
123 MAIN ST
Anywhere, USA

John Q. Student
456 Front St
Somewhere, USA

Loan Type: Student Loan
Application ID: XYZ123

Dear John,

Thank you for recent application for Student Loan. After careful consideration of your application, we are unable to approve your request for the following reason(s):

Your reasons(s):
- Income insufficient

Your primary applicant's reason(s):
- Unable to verify address

Sincerely,

Customer Service
Student Lending Department

Email: Disclosures

Private Education Loan Approval Disclosure
Application ID: 9192815346637

| BORROWER: | CREDITOR: |
|---|---|
| DAVID BORROW | ABC Bank |
| 89 River Dr. | PO Box 12345 |
| Mountian View, USA | Loaner, USA |

Loan Rates & Estimated Total Costs

| Total Loan Amount | Interest Rate | Finance Charge | Total of Payments |
|---|---|---|---|
| $2,000.00 | 5.05% | $337.79 | $2,337.79 |
| The total amount you are borrowing | Your current interest rate. | The estimated dollar amount the credit will cost you. | The estimated amount you will have paid when you have made all payments. |

ITEMIZATION OF AMOUNT FINANCED

| Amount paid to you | $0.00 |
|---|---|
| Amount paid to others on your Behalf:<br>Art Center College of Design | +$2,000.00 |
| Amount Financed<br>(total amount provided) | =$2,000.00 |
| Initial finance charges<br>Origination Fee ($0.00) | +$0.00 |
| Total Loan Amount | =$2,000.00 |

ABOUT YOUR INTEREST RATE
- Your rate is fixed. This means that your rate will remain constant over the term of your loan. For more information on this rate, see the Reference Notes below.
- The maximum rate on this Parent Loan is the interest rate disclosed above.
- Your Annual Percentage Rate (APR) is 5.05% The APR is typically different than the interest Rate since it considers fees and reflects the cost of your loan as a yearly rate.

FEES
- Late Charge: 5% of the payment amount for payments not made within 15 days of the due date.
- Optional Service Charges: Lender may charge you for such services.

Estimated Repayment Schedule & Terms

| Loan Term: 5 YRS | MONTHLY PAYMENTS | |
|---|---|---|
| | at 5.05%<br>the current interest rate of your loan | Maximum Rate<br>same as current rate |
| 10/18/2022 to 08/18/2023<br>11 interest-only payments | $8.40 | $8.40 |
| 09/18/2023 to 02/18/2024<br>6 interest-only payments | $8.49 | $8.49 |
| 03/18/2024 to 09/18/2027<br>43 monthly payments | $50.00 | $50.00 |
| 10/18/2027<br>1 monthly payments | $44.44 | $44.44 |

Borrower Signature:_____ Date: _____

FIG. 13D

DYNAMIC USER INTERFACE (UI) FRAMEWORK

CROSS-REFERENCE TO RELATED APPLICATIONS

This application is a continuation of U.S. patent application Ser. No. 18/348,631, filed on Jul. 7, 2023, which claims the benefit of U.S. Provisional Patent Application No. 63/421,785 (filed Nov. 2, 2022), U.S. Provisional Patent Application No. 63/421,797 (filed Nov. 2, 2022), U.S. Provisional Patent Application No. 63/422,029 (filed Nov. 3, 2022), U.S. Provisional Patent Application No. 63/422,180 (filed Nov. 3, 2022), U.S. Provisional Patent Application No. 63/423,530 (filed Nov. 8, 2022), and U.S. Provisional Patent Application No. 63/423,652 (filed Nov. 8, 2022), which applications are expressly incorporated by reference herein in their entireties.

The foregoing patent applications, and all documents and references cited therein, are hereby incorporated herein by reference in their entirety.

TECHNICAL FIELD

The present disclosure relates generally to modular, end-to-end electronic platforms, and more particularly, to modular, expandable end-to-end unified lending platforms.

BACKGROUND

Existing approaches for fully processing, from end-to-end, all aspects of complex multi-step workflow journeys require implementing multiple, independent solutions and systems. This is because complex multi-step workflow journeys, by definition, comprise multiple, often independent operational/processing requirements, each invoking any number of specialized processing operations, components and/or systems specifically configured for carrying out one or more of the operational/processing requirements. Since each of these specialized operations, components and/or systems has its own set of compatibility limitations, protocol(s), programming language(s), standards, etc., they operate independently of one another. As a result, existing approaches are unable to leverage, integrate or combine various processing operations, components and/or systems, leading to operationally redundancies, disjointed and inefficient processing, inconsistent end-user experiences, high latency, manual coordination of output between systems, high operating and maintenance costs, continual updating and maintenance, etc.

To illustrate the foregoing concept, reference is made to Table 1 below. Table 1 includes an illustrative chart depicting (in tabular form) that different electronic lending products (e.g., student lending, credit card, personal loan, working capital, bilateral loan, commercial real-estate, etc.) may each be defined by a respective complex multi-step workflow journey. In other words, each electronic product journey may require and invoke a different combination of computer operations, components and/or systems for completing the same, where said computer operations, components and/or system may themselves be operating independently of one another.

TABLE 1

| Entity | Loan Type | Products | Workflow Operations | | | | |
|---|---|---|---|---|---|---|---|
| | | | Originate | Underwrite | Process | Issue/ Disburse | Service |
| Consumer | Unsecured | Student Lending | Sol. 1 | Sol. 13 | Sol. 25 | Sol. 37 | Sol. 49 |
| | | Credit Card | Sol. 2 | Sol. 14 | Sol. 26 | Sol. 38 | Sol. 50 |
| | | Personal Loan | Sol. 3 | Sol. 15 | Sol. 27 | Sol. 39 | Sol. 51 |
| | | Buy Now Pay Later | Sol. 4 | Sol. 16 | Sol. 28 | Sol. 40 | Sol. 52 |
| | Secured | Mortgage Loan | Sol. 5 | Sol. 17 | Sol. 29 | Sol. 41 | Sol. 53 |
| | | Auto Loan | Sol. 6 | Sol. 18 | Sol. 30 | Sol. 42 | Sol. 54 |
| | | Home Equity Line of Credit | Sol. 7 | Sol. 19 | Sol. 31 | Sol. 43 | Sol. 55 |
| Commercial | Unsecured | Commercial & Corporate Credit Cards | Sol. 8 | Sol. 20 | Sol. 32 | Sol. 44 | Sol. 56 |
| | | Working Capital | Sol. 9 | Sol. 21 | Sol. 33 | Sol. 45 | Sol. 57 |
| | Secured | Syndicated Loans | Sol. 10 | Sol. 22 | Sol. 34 | Sol. 46 | Sol. 58 |
| | | Historical Loans | Sol. 11 | Sol. 23 | Sol. 35 | Sol. 47 | Sol. 59 |
| | | Commercial Real Estate | Sol. 12 | Sol. 24 | Sol. 36 | Sol. 48 | Sol. 60 |

Although the different workflow journeys shown in Table 1 appear to share similar workflow operations/processing requirements (Originate, Underwrite, Process, Issue/Disburse, Service), factors such as product type (e.g., secured vs. non-secured), entity type (consumer, commercial, etc.), and others render them different. As a result, existing approaches require that each workflow journey associated with each type of product, separately initiate a respective combination of solutions, independently of other (similar) workflow journey solutions. As shown in Table 1, for example, despite having a respective Originate requirement, each of the listed products (e.g., Student Lending, Credit Card, Personal Loan, . . . Commercial Real Estate) requires a different Originate solution (e.g., Sol. 1, Sol. 2, Sol. 3 . . . Sol. 12), where each solution corresponds to a different combination of operations, systems, etc. This is due, at least in part, to the inability of existing technology and systems to integrate disparate operations, components and/or systems into a single platform, and/or their inability to leverage common and/or overlapping operations, components and/or systems across multiple workflow journeys, as discussed above.

Indeed, even if a single user invokes multiple workflow journeys that share common or similar workflow steps (e.g., common processing requirements of common user data), existing approaches still require each of the same user's workflow journeys to proceed independently of one another. That is, existing approaches are unable to leverage one instance of a particular set of operations (e.g., data collecting/processing), components and/or systems across multiple workflow journeys. Instead, multiple (redundant) instances of that particular set of operations, components and/or systems are needed, one for each workflow journey.

To further illustrate, reference is made to FIG. 1 (which corresponds to Table 1 above). As shown, a particular entity (Consumer) 101 may wish to initiate, via a system interface 103, multiple complex multi-step workflow journeys 105, 107, one each in connection with an electronic lending product (e.g., electronic Student Lending product 105 and an electronic Credit Card product 107). Each of these two journeys 105,107 involve similar/overlapping workflow steps (e.g., Originate 105a/107a, Underwrite 105b/107b, Process (not shown), Issue/Disburse (not shown), Service 105n/107n), and possibly one or more uncommon/journey-specific workflow steps (not shown). Despite these two workflow journeys 105,107 being initiated by the same user 101, defined by the same data, and sharing common/overlapping workflow steps 105a/107a-105n-107n (e.g., sharing common data and/or processing requirements), independent solutions are needed to complete reach respective workflow journey 130, 140. For example, Solution 110 is needed to accomplish the Originate portion 110 of the Student Lending workflow journey 105 (i.e., Solution 1), which differs from Solution 116 which is needed to accomplish the Originate portion 116 of the Credit Card workflow journey 107 (i.e., Solution 2). This means that different, multiple and redundant instances of systems, operations, etc. must be invoked to accomplish the respective Originate 105a,107a, Underwrite 105b,107b and Service 105n,107n workflow steps, as well as any other workflow steps of the two workflow journeys 105,107 that may have similar, shared and/or overlapping data and/or processing requirements.

It should be noted that Solutions 110, 112, 114, 116, 118, 120 depicted in FIG. 1 may be external solutions, meaning that operations, components and/or systems that exist outside of conventional platforms are needed to provide respective solutions for each workflow journey 105,107. As indicated above, this leads to redundancies, processing inefficiencies, latency, and other systematic deficiencies. Even in situations where different workflow journeys 105, 107 involve a same internal Solution 106 (e.g., a solution provided by the platform facilitating the workflow journeys 105,107), existing approaches require multiple instances 106a, 106b of that internal Solution 106 to be invoked for each respective workflow journey 105,107, thereby leading to further redundancies and inefficiencies.

It is also noted that one or more data sources (not shown) may be needed to provide data and information to these various Solutions (106, 110, 112, 114, 116, 118, 120) for processing. These data sources may be internal to a particular system, external to the particular system or a combination of both. Similar to the independence amongst the various solutions (106, 110, 112, 114, 116, 118, 120) discussed above, data requirements for each particular solution are also resolved independently. That is, each solution requiring data from a particular data source must independently obtain (e.g., call, request, etc.) a separate instance of that data from that particular source. As will be appreciated, this further exacerbates the redundancies, inefficiencies, latency, etc. associated with existing approaches.

In addition to the foregoing, the various operations, components and systems utilized by existing approaches are themselves technologically inferior, insofar as they are individually inefficient, lack scalability, are not 'future proof' (i.e., they are bound by limitations of existing systems and technologies), are not configurable (e.g., to account for use different types and/or complexities of multi-step workflows, for use in different types of systems, etc.), etc. In addition, these existing operations, components and systems are limited by programming languages, protocols, operation standards, compatibility requirements, etc. As a result, they are not suitable for integration into a single end-to-end platform. Some of the technological deficiencies associated with the existing operations, components and systems relate to: authentication and authorization; generation, maintenance, and compatibility of user interfaces; maintaining and transitioning between states of multi-step workflows; active data lost protection and notification; orchestration and integration of disparate solutions comprising diverse communication protocols, language bytecodes, exchanges protocols, etc. These and other technological deficiencies and limitations are discussed below.

Existing single sign-on (SSO) authentication and authorization technology relies on implementation of a particular open standard protocol (e.g., OAuth, OAuth2.0) to define how service providers (SPs) and identity providers (IdPs) can exchange identity and authentication information with each other. Systems, software applications, etc. that rely on competing protocols are therefore incompatible, and cannot be integrated into a single platform using existing approaches. That is, existing solutions and systems lack the infrastructure and technology to mutually authenticate between and across various types of resources such as internal, external and/or hybrid systems, services, micro-services, networks, application program interfaces (APIs), software applications, etc. that utilize multiple IdPs relying on diverse authorization protocols (e.g., OAuth 1.0, OAuth 2.0, etc.) and/or diverse authentication standards and/or formats (e.g., security assertion markup language ("SAML"), javascript object notation web tokens ("JWT")), etc.).

Existing solutions and systems also lack the ability to unify authentication functions using single access credentials (e.g., SSO) to provide access to applications and other resources across multiple systems, networks, etc., even when the applications and resources utilize the same authentication standards and/or protocol. Further still, existing solutions and systems lack the technology to establish authorization across numerous micro-services to enable denial of internal and/or external service attacks, and others.

For these (and other) reasons, existing solutions and systems are not suitable for authentication and/or authorization in connection with multi-step workflow journeys, which involve accessing multiple (and often independent) services, micro-services, application program interfaces (APIs), software applications, systems, etc. that rely on multiple and diverse identity providers (IdPs) implementing disparate authentication protocols.

Accordingly, there is a need for a new, single SSO multi-IdP framework that is capable of operating in an integrated and polyglot micro-services architecture for managing authentication and/or authorization across any number of IdPs, services, systems, networks, platforms, APIs, etc. in connection with any number and complexity of multi-step workflow journeys.

Because, as noted above, existing solutions and systems are disjointed (and involve multiple independent solutions and systems), so too are the online user experiences (UXs) associated with navigating through end-to-end workflows. Indeed, creating an online UX journey may involve developing and deploying, via numerous online platforms and systems, numerous web pages that a user must interact with and navigate through in order to complete a particular UX journey, where each step along the journey may itself involve building any number of additional and/or different web pages. For example, a UX journey associated with purchasing an online product may include developing and deploying an initial 'log-in' web page (e.g., to receive user credentials), a notification web page (e.g., to alert the user that his credentials have been accepted and authenticated), a data entry web page (e.g., to receive user profile data), a product selection web page (e.g., to receive user selection criteria), a check-out web page (e.g., to receive user payment details), an order confirmation web page (e.g., to provide a notice that the user's order has been accepted and is being processed), any number of error-correction web pages (e.g., to request corrective/missing data), and others. The foregoing list of exemplary web pages is certainly non-exhaustive, as even the most basic UX journeys may require hundreds of different web pages.

The number of web pages required may grow exponentially as the complexity of the UX journey increases, as the number of users and/or user personas accessing the particular system increases, as the types of devices (e.g., mobile devices, tablet computers, desk top computers, etc.) accessing the system increases, as the number of different screen sizes of the different devices increases, as the different types of web browsers (e.g., Edge™, Firefox™ Safari™, etc.) on which the web pages must rendered increase, and/or any other number of variables changes or increases. As a result, some UX journeys, no matter how 'simple', may nonetheless require the building of thousands, tens of thousands, hundreds of thousands or even millions more different web pages (e.g., to account for the many permutations created by the many variables discussed above).

Existing systems lack the technology and infrastructure to build so many web pages quickly and efficiently, nor are they able to scale to large numbers of web pages, account for changes, updates, unexpected errors or unexpected paths in any given journey, or provide consistent web page experiences for any number of users and/or user personas, across any number and type of user devices and web browsers, and across any number and/or complexity of UX journeys and workflows (e.g., for varying products, sub-products, services, etc.). This may include, for example, the inability to maintain a consistent user experience across varying web page designs, to ensure consistent web page rendering across varying types of user devices and/or web browsers, and to decouple web page design and logic while scaling any number of web pages across any number of devices, etc.

As a result, existing systems attempt to address the foregoing variability by brute force, that is, by developing and building the anticipated web pages needed for each anticipated UX journey as individual, isolated, purpose-fit web pages. That is, developers attempt to identify and build each possible web page that may be required for each end-to-end user experience. As indicated above, this may involve having to build hundreds of thousands (or more) individual web pages, depending on the complexity of the user experience and/or the variables contemplated and/or accounted for (e.g., types of devices, types of web browser, etc.). Moreover, any changes or updates (or unexpected errors) in any given end-to-end experience will require the building of even more web pages. Further still, user experiences that encounter unexpected errors and/or take unexpected paths may cause the system to malfunction, pause, crash, etc. (e.g., become inoperable) until such time as the needed (additional) web pages may be developed and deployed. Accordingly, there is a need for a new, dynamic user interface (UI) framework that resolves these and other technological deficiencies of existing systems.

Maintaining and transitioning between states within multi-step workflow journeys is in and of itself complex. The complexities become exponentially amplified when the workflows are required to operate in real-time, span across multiple systems, platforms, entities, networks, etc., are simultaneously accessed by large numbers of users (e.g., thousands, hundreds of thousands, millions, etc.) having multiple/diverse personas, invoke numerous internal and external system integrations, comprise other highly complex end-to-end workflow journeys, etc. Existing systems lack the technology and infrastructure for effectively and efficiently maintaining and transitioning the states of such multi-step workflows. More particularly, existing systems lack the architecture and technology for: maintaining, managing and transitioning states as part of a highly complex workflow orchestration; maintaining concurrent deterministic and non-deterministic events and associated state transitions; maintaining states and transitions for real-time events that occur in less than a millisecond; maintaining states and transitions for real-time events that can be changed by any entity, user, persona, product feature, etc. and/or triggered through a variety of input interfaces like user interfaces (UI), application program interfaces (API), data ETL's (extract, transform, load), scripts, etc.; maintaining, managing and transitioning workflow states when the workflows themselves have hard coded rules inside micro-services, nullifying encapsulation and abstraction principles; de-coupling actions during state transitions between different workflows; and others. Accordingly, there is a need for a new workflow state management framework configured to resolve the foregoing (and other) technological deficiencies, which includes (for example) the ability to manage, maintain and orchestrate state transitions within and/or across workflow journeys, including in real-time and in a systematically-efficient manner.

Aspects and characteristics of complex multi-step workflow environments (such as an end-to-end unified lending journey, for example) also render conventional data loss and prevention (DLP) technology inadequate and ineffective for addressing the uniquely complex risks of data loss, leakage and/or exposure within such environments. An end-to-end unified lending workflow journey, for example, may have any number of characteristics, features, functions, variables and/or permutations, each of which may represent a unique and/or increasingly complex risk of data loss, leakage and/or exposure. Examples of such characteristics, features, functions, variables and/or permutations may include (without limit): interactions with multiple types of entities (e.g., consumer, commercial, etc.) and/or entity systems; system offerings comprising varying digital product journeys, each having a unique combination of workflow steps (e.g., student loan products, credit cards, auto loan products, home mortgage products, home equity lending products, personal loan products, commercial real estate products, bilateral loan products, syndicated loan products, working capital loan products, etc.); using multiple user personas to initiate multiple end-to-end workflow journeys (e.g., a single user may initiate multiple end-to-end lending journeys, including as a sole borrower, co-borrower, institutional investor, small business owner, commercial borrower, etc.); and different combinations of workflow steps that require access to and/or interaction with various system resources, applications, systems, networks, etc.

Examples of some of the deficiencies and vulnerabilities of existing DLP technology include (for example) its inability to: identify, maintain, manage, and react to potential data loss, leakage and/or exposure events triggered by a user initiating multiple workflows associated with a diverse set of products, user interactions comprising multiple user persona's, and/or multiple communication types and/or communication channels; identify, maintain, manage, and react to an ever-changing landscape of personal identifying information (PII) data attributes; limit false positives that can inversely impact users' experiences by being too restrictive; cater to real-time and batch events in an integrated architecture (e.g., across systems, computers, networks, etc.); cater to real-time and batch communications that may be transmitted across a wide variety of communication channels in an integrated architecture (e.g., across systems, networks, etc.); provide strong controls with transparency on the events, triggers, data and communications; and others. Accordingly, there is a need for a new active DLP framework and engine configured for addressing these and other technological deficiencies.

Maintaining and transitioning through complex multi-step workflow journeys may include, for example, building numerous application program interfaces (APIs) to provide descriptions for applications to interact with the system's backend, for example. The complexities associated with building these APIs become exponentially more complex when the workflows are processed in a micro-service architectural environment (e.g., architectures in which applications are broken down into smaller, micro-service components, as opposed to containing all components in a single/monolithic application), when the workflows are required to operate in real-time, span across multiple systems, platforms, entities, networks, etc. that use any number of diverse communication protocols (e.g., as part of a micro-service polyglot architecture), when the workflows are simultaneously accessed by large numbers of users (e.g., thousands, hundreds of thousands, millions, etc.) having multiple/diverse personas, when the workflows invoke numerous internal and external system integrations, when the workflows comprise multiple end-to-end workflow journeys, etc.

Existing solutions and systems are incapable of addressing the unique challenges associated with end-to-end workflow journeys noted above, which include the inability to provide complex real-time service orchestration (e.g., API generation) for complex multi-step workflows in a polyglot micro-services architecture. Additional challenges of existing solutions and systems in this regard include (without limitation), the inability to handle and/or resolve the state(s) and transition(s) between multiple micro-services, orchestrations between numerous concurrent services, diverse communication protocols (as part of a polyglot architecture (e.g., HTTP, HTTPS, RPC, etc.), communications between various components written in a diverse set of languages and/or for different runtime environments (e.g., Java™, Python™, Node.Js™, .Net™, etc.), service start, restart, pause, resume, etc. in a micro-service architecture with multiple real-time dependencies, and others. Accordingly, there is a new for a new orchestration framework and engine configured for resolving these and other technological deficiencies.

In addition to the foregoing, there is a need for a new document automation and template management framework configured specifically for capturing data from documents, as well as automatically building templates for generating and issuing documents. There is also a need for a new micro-service architecture, a new domain-based data architecture and a one-click infrastructure as a service framework.

Further still, there is a need for a fully integrated platform that provides a complete end-to-end solution for processing all aspects of any number and type of complex multi-step workflow journeys in a manner that reduces and/or significantly improves redundancies, inefficiencies, inconsistencies, latency, operating and maintenance costs, update and maintenance requirements, and other limitations of existing solutions and systems.

SUMMARY

According to one aspect, a unified platform may comprise a combination of independent frameworks that have been uniquely integrated and configured to collaboratively operate seamlessly. Each of the frameworks may comprise one or more computing devices, each comprising one or more processors executing computer-readable program instructions. The unified platform may comprise an authentication and authorization framework configured to receive, from a user device, access credentials for proceeding through one or more workflow journeys, determine at least one protocol, standard and format associated with the access credentials, determine an authentication of the access credentials based on authentication policy rules stored in one or more memory devices of the unified platform system, generate an authentication response, according to the determined at least one protocol, standard and format, based on the authentication policy rules, and transmit the authentication response to the user device.

The unified platform may also comprise a dynamic user interface framework configured to identify, select and obtain, from the one or more memory devices, configuration and properties data associated with the user device, generate at least one web page for the one or more workflow journeys based on the configuration and properties data, generate web page metadata for the at least one web page based on the configuration and properties data, and deploy at least one web page and corresponding web page metadata, the at least one web page being configured specifically for the user device.

In addition, the unified platform may comprise a workflow state management framework configured to determine that an initiate state event for the one or more workflow journeys has occurred, determine a next best step from among a plurality of next best steps for the one or more workflow journeys based on metadata associated with the initiate state event and on metadata associated with one or more other events, and initiate a flow between two or more states of the one or more workflow journeys based on the determined next best step.

Moreover, the unified platform may also comprise a notification and active data loss and prevention (DLP) engine framework configured to capture a flow of data associated with the one or more workflow journeys, extract data objects from the captured flow of data, determine whether the data objects comprise sensitive data, classify the data objects based on the determination as to whether the data objects comprise sensitive data, and initiate at least one of an action and control when the data objects are classified as comprising the sensitive data.

The unified platform may also comprise an orchestration engine framework configured to translate the flow of data to generate translated data based on a communication protocol, obtain, from the one or more memory devices, one or more rules, and perform one or more micro-service orchestrations based on the translated data and the one or more rules.

In another aspect, a computer-implemented method may comprise receiving, from a user device, access credentials for proceeding through one or more workflow journeys, and determining at least one protocol, standard and format associated with the access credentials. The method may further involve determining an authentication of the access credentials based on authentication policy rules stored in one or more memory devices, generating an authentication response, according to the determined at least one protocol, standard and format, based on the authentication policy rules, and transmitting the authentication response to the user device.

In some examples, the computer-implemented method may further include identifying, selecting and obtaining, from one or more memory devices, configuration and properties data associated with the user device, generating at least one web page for the one or more workflow journeys based on the configuration and properties data, generating web page metadata for the at least one web page based on the configuration and properties data, and deploying at least one web page and corresponding web page metadata, where the at least one web page is configured specifically for the user device.

In some examples, the computer-implemented method may also include determining that an initiate state event for the one or more workflow journeys has occurred, determining a next best step from among a plurality of next best steps for the one or more workflow journeys based on metadata associated with the initiate state event and on metadata associated with one or more other events, and initiating a flow between two or more states of the one or more workflow journeys based on the determined next best step.

Further, the computer-implemented method may comprise capturing a flow of data associated with the one or more workflow journeys, extracting data objects from the captured flow of data, determining whether the data objects comprise sensitive data, classifying the data objects based on the determining as to whether the data objects comprise sensitive data, and initiating at least one of an action and control when the data objects are classified as comprising the sensitive data.

In some examples, the computer-implemented method may also include translating the flow of data to generate translated data based on a communication protocol, obtaining from the one or more memory devices, one or more rules, and performing one or more micro-service orchestrations based on the translated data and the one or more rules.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 13C illustrates an exemplary event-triggered direct mail notification generated according to the present disclosure;

FIG. 13D illustrates an exemplary event-triggered e-mail notification generated according to the present disclosure;

To facilitate understanding, identical reference numerals may have been used, where possible, to designate identical elements that are common to the figures. It is contemplated that elements disclosed in one embodiment may be beneficially utilized on other embodiments without specific recitation.

DETAILED DESCRIPTION

Figure 1:
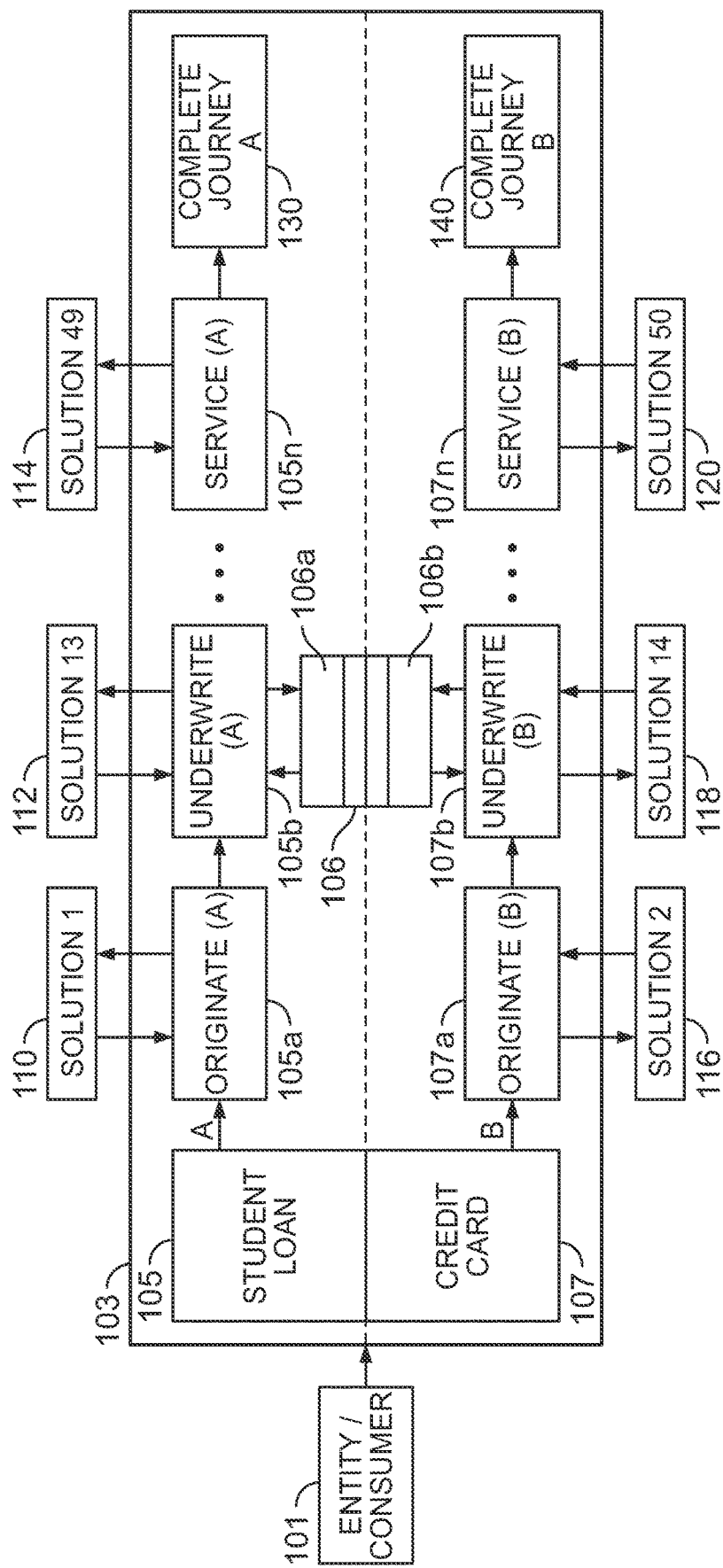
FIG. 1 is diagram illustrating a conventional approach for processing complex workflow journeys.

The present disclosure describes new systems, methods and computer program products for providing a modular, expandable, unitary end-to-end platform solution configured for all aspects of complex multi-step workflow journeys, without regard to the number of products (or sub-products), services, entities, users, personas, resources, communication channels, protocols, etc. that may be involved in and/or implicated by the complex multi-step work flow journeys.

For purposes of this disclosure, a workflow refers to a combination of data processing activities (e.g., processes, scripts, routines, functions, workflows, etc.) that, if completed, achieve a particular outcome (e.g., provide a product, sub-product, service, etc.). This combination of data processing activities may have a fixed order (i.e., activities that must be executed in a particular sequence), a non-fixed order (i.e., those may be executed in parallel or are not subject to any particular sequence), or a combination of both. In addition to defining data processing activities to be performed, a workflow may also define the systems, module, components, etc. responsible for performing said data processing activities, inter-dependencies between and among the data processing activities, options for executing, arranging and/or completing the data processing activities and options for contingencies (e.g., error handling). In some embodiments, a workflow may span across any number of computer modules, components, systems, platforms and/or networks.

Steps (as in a workflow steps) refers to the workflow activities defined above, such that completion of the workflow steps achieves the workflow's outcome.

The state within a workflow refers to the particular action (or inaction) being taken or occurring, and/or the stage or progress within that action, at any particular instant in time. In the context of a workflow step/activity, for example, possible states of a particular activity may include (without limitation) initiating, running, paused, executing, terminating, etc. In an exemplary embodiment, each step of a workflow comprises a finite number of states.

A journey refers to the particular path through and/or sequence of activities and/or states within a workflow. A journey may also include accessing and/or initiating any number of system recourses and/or functions needed for progressing through the workflow. Such resources may include (without limitation) web pages, application program interfaces (APIs), data integration (i.e., combining data from multiple data sources into a single, consistent data store that is loaded into a data warehouse or other target system, also known as "ETL" (extract, transform, load)), etc.

An event refers to system and/or user steps or activities that are not necessarily a part of a particular workflow, but may nonetheless influence the outcomes/states of the workflow. For example, a system error may cause the system to shut down, thereby impeding immediate progress of a workflow and/or initiating a contingency activity to account for the shutdown. As another example, a determination that a certain electronic communication may be at risk for data loss, leakage and/or exposure may also constitute an event for purposes of this disclosure A persona refers to a particular combination of attributes, preferences, parameters, profile characteristics, etc. associate with a user. Non-limiting examples of personas may include sole borrower, co-signer, institutional investor, commercial user, business owner, student, etc. Users may each have multiple personas, and use each such persona to access a different online experience (e.g., access different combinations of online products/services, user interfaces, etc.) via an online electronic platform.

An entity refers to any type of institution (e.g., commercial, consumer, etc.) that offers products and/or services defined as workflows that are executed, at least partially, via an online electronic platform. Users may access one or more of the products and/or services simultaneously (or at different times), using one or more of the user's personas, via the entity's online electronic platform.

To illustrate the foregoing concepts in a non-limiting example, if a particular process that defines a product or service requires execution of X number of routines to achieve a particular outcome, the workflow of that process may comprise the X number of routines, the computer components responsible for executing the routines, any interdependencies between and amongst the X routines, possible options for arranging and executing the X routines, and options for handling process contingency events (e.g., improper data type, missing data, runtime error, etc.). Each of the X routines may be considered as a workflow step (or activity), and progression through the X routines (e.g., from routine to routine and/or from state to state within and amongst routines, including contingency handling routines), as well as initiation of system resources for said progression, may be considered the workflow's journey. Users desiring to access the product or service associated with the process may do so by accessing, via a user interface using one or more respective personas, an online electronic platform that embodies the process's workflow. The online electronic platform may be associated with a particular entity that offers the product and/or service, and it may be accessed via one or more of a wired or wireless network using any type of user device (e.g., mobile phone, desktop computer, tablet computer, etc.). The online electronic platform itself may comprise any number of specialized computers and/or computer modules.

The end-to-end platform solution described herein will be described in the context of a complex multi-step end-to-end lending journey. To that end, the platform may be referred to as a unified lending platform. It should be understood, however, that the platform of the present disclosure is not so limited. To the contrary, the platform described herein is suitable for use in any industry, in connection with any type of complex multi-step end-to-end journey, where it is desirable to integrate multiple, independent systems into a single, modular platform that is 'future proof' (e.g., can easily be scaled without limit, as needed, and may easily be updated to account for changing protocols, machine languages, standards, etc.).

An exemplary complex multi-step lending journey may consist of any number of workflow steps, including Origination, Underwriting, Processing, Disbursement/Issuance, and Services. Other examples of lending journeys may include alternative and/or additional workflow steps.

Having recognized the infrastructural and technological deficiencies of existing solutions and/or systems, the Applicant has developed a novel, modular, and unified platform comprising multiple, technologically-improved 'building blocks' that may be combined and integrated to form an end-to-end solution for any number and type of complex multi-step workflow journeys, including unified lending journeys, across multiple entities, products and/or personas. Notably, although each of these building blocks (e.g., system frameworks, computer systems, computer components, etc.) may be described in the context of the unified platform described herein, each such building block is not limited thereto. To the contrary, each building block described herein is specifically designed to be utilized in connection with and/or independently of any other building block described herein, as well as other building blocks that are not a part of this disclosure. As a result, each such building block may be utilized (whether alone and/or in combination with other building blocks) in connection with any type of system, platform and/or implementation. An overview of (some of) the platform's building blocks is provided below.

0. Authentication and Authorization Framework—manage various users and user types of the platform/systems (e.g., Customers, Clients, platform-side Colleagues etc.) and mutual authentication/authorization across systems and components having diverse authentication/authorization protocols and/or standards.
1. Dynamic User Interface (UI) Framework—quickly and efficiently builds and personalizes web-page experiences across any number and complexity of workflow journeys, each configured for rendering across any type of device (e.g., web, mobile, tablet, etc.) and across diverse browser types with forward and backward compatibility.
2. Workflow state Management Framework—provides real-time process automation across and within any number and complexity of workflow journeys.
3. Document Automation and Template Management Framework—configured to:
a. capture, orient, extract, score and store documentation associated with various aspects of any number and complexity of workflow journeys (e.g., documentation relating to identity, income, assets, liability, expenses etc.); and
b. build, govern and deploy templates for disclosures, notifications, promissory notes, adverse actions, terms and conditions and other documentation, as needed.
4. Notification and Active Data Loss Prevention (DLP) Engine Framework—enables seamless communications across any number communications channels, including (without limit) e-mail, short message service (SMS) messages, text messages, etc.
5. Orchestration Engine Framework—functions as the 'brains' of the platform to (among other things):
a. manage and resolve complex conflicts such as diverse communication protocols, language bytecodes and exchange protocols that arise from a polyglot and micro-service architecture; and
b. manage and orchestrate complex rules and states necessary to complete any number (and complexity) of journeys and sub-journeys, including those that span across any number (e.g., thousands, hundreds of thousands, etc.) of webpages, API's and/or databases.
6. API's/Micro-Service Architecture—provides access to services (e.g., business and data services) and future-proofs the platform by clearly defining platform functions, isolating the logic for high maintainability and actions for creating, reading, updating and deleting information.
7. Domain Based Data Architecture—further future-proofs the platform by allowing horizontal and vertical scaling of data, features and functions to add new products and features without the need for re-architecting the platform.
8. One-click Infrastructure as a Service Framework—readily packages, provisions and deploys the network, security, storage and compute infrastructure as a container and/or as a function on the cloud.

Figure 2A:
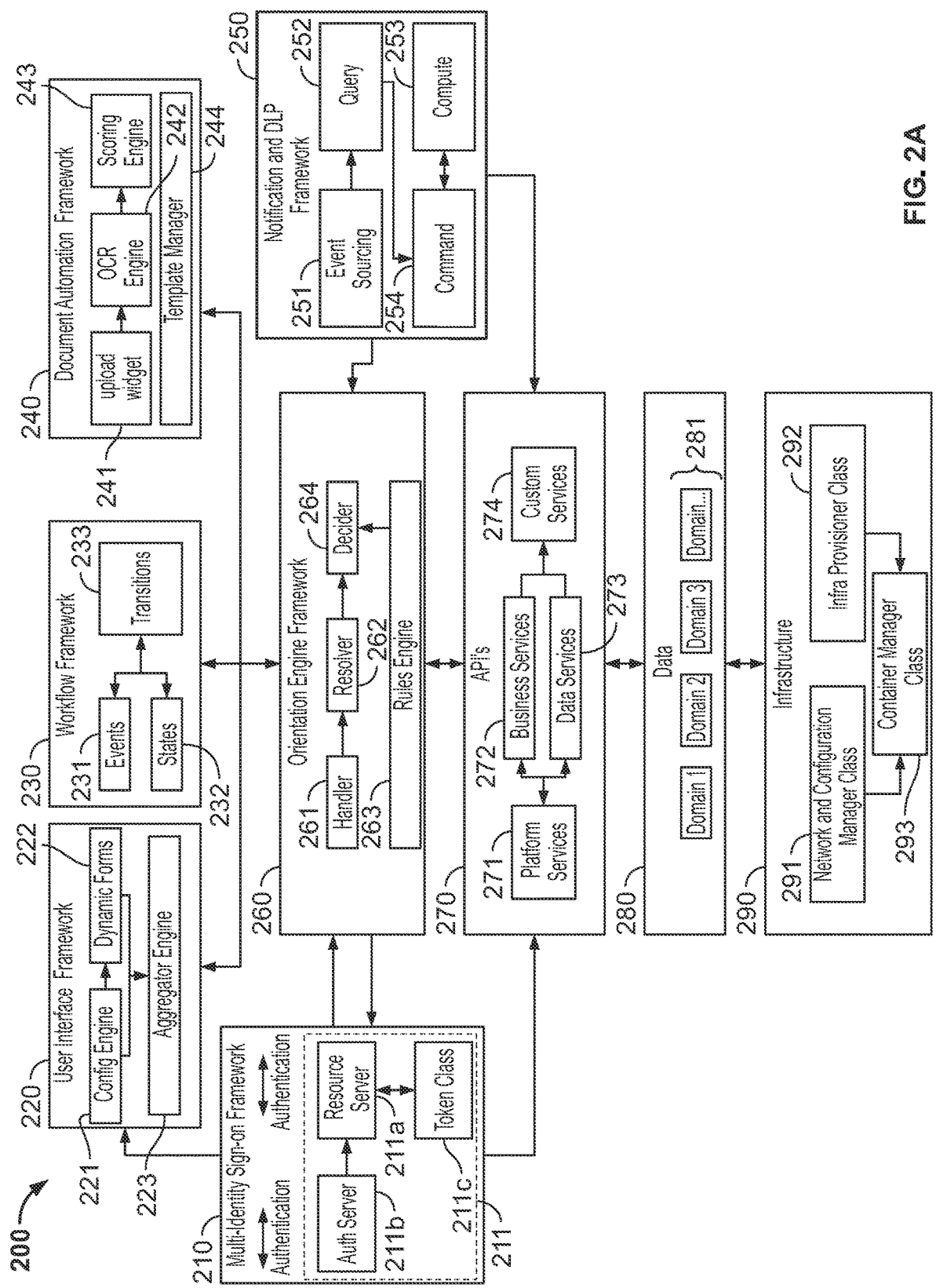
FIG. 2A is an exemplary unified lending platform (also referred to as the "unified platform") according to the present disclosure.

Turning now to FIG. 2A, an exemplary unified lending platform (also referred to as the "unified platform" or "platform") 200 according to the present disclosure is shown. For illustrative purposes, the unified platform 200 shall be described in the context of a unified lending journey. In this regard, the unified platform 200 may be operated by or associated with a financial institution, such as a banking institution. It should be understood, however, that the unified platform 200 of the present disclosure is not limited thereto. Indeed, the unified platform 200 may be configured for use in connection with other types of journeys and/or institutions including, but not limited to, motor vehicle registration, voting and voting registration, academic institutions (e.g., applications, enrollments, etc.), etc.

The unified lending platform 200 may be operable within a computing environment that includes, among other things, one or more computer systems (e.g., that collectively define the platform 200), one or more third-party computing systems (not shown) and one or more user devices (not shown). Each of the one or more computing systems, one or more third-party computing systems, and one or more user devices may each be operatively connected to, and interconnected across, one or more communications networks. Examples of such communications networks may include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the computing devices and computing systems operating within such a computing environment may perform operations that establish and maintain one or more secure channels of communication across the one or more communications networks, such as, but not limited to, a transport layer security (TLS) channel, a secure socket layer (SSL) channel, or any other suitable secure communication channel.

As illustrated in FIG. 2A, the exemplary unified lending platform 200 includes a combination of independently innovative frameworks that have been uniquely integrated and configured to collaboratively operate seamlessly as the unified platform 200. That is to say, the various frameworks comprising the exemplary platform 200 are innovations unto themselves, and their combination and interoperability represents yet another innovation. As a result, each of the frameworks combined to form the unified platform 200 may itself be configured for use independently and/or in connection with one or more other modules, components, systems, etc., as shall be discussed below.

The various frameworks comprising the exemplary unified platform 200 may include an Authentication and Authorization Framework 210, a Dynamic User Interface Framework 220, a Workflow State Management Framework 230, a Document Automation and Template Management Framework 240, a Notification and Active DLP Engine Framework 250, an Orchestration Engine Framework 260, an APIs/Micro-service Architecture 270, a Domain Based Data Architecture 280 and a One-Click Infrastructure as a Service Framework 290, each of which is further described below. It should be understood, however, that the unified lending platform 200 may include additional or alternative elements (e.g., frameworks, systems, etc.), for example, to customize the platform 200 according to a particular implementation.

Each of the frameworks 210-290 comprised within the unified platform 200 may include one or more servers and one or more tangible, non-transitory memory devices storing executable code, application engines, or application modules. Each of the one or more servers may include one or more processors, which may be configured to execute portions of the stored code, application engines or modules, or application programs to perform operations consistent with the disclosed exemplary embodiments.

In some embodiments, the unified platform 200 may correspond to a discrete computing system, while in other embodiments, the unified platform 200 may correspond to a distributed computing system having multiple, computing components and frameworks distributed across one or more computing networks, or one or more networks established and maintained by one or more cloud-based providers. Further, the unified platform 200 may include one or more communications interfaces, such as one or more wireless transceivers, coupled to the one or more processors for accommodating wired and/or wireless internet communications across one or more communications networks with other computing systems and devices operating within the unified platform's 200 computing environment.

As described herein, the unified platform 200 may, via its various frameworks 210-290, perform any of the exemplary functions and/or processes described herein. This includes, among other things, hosting, storing, maintaining and operating executable code, application engines or modules, or application programs for enabling remote and dynamic collaboration of one or more users that are remote from each other. The platform 200 may enable dynamic collaboration via an interactive graphical user interface (GUI) capable of receiving input and/or displaying prompts, data, graphics, alerts, messages, etc. in real-time, and simultaneously from and to one or more users (not shown).

Further, the unified platform 200 is uniquely configured to leverage execution and processing functions that may be common across multiple workflow steps and/or across multiple workflow journeys, so as to reduce redundancy, latency and system resource consumption.

Figure 2B:
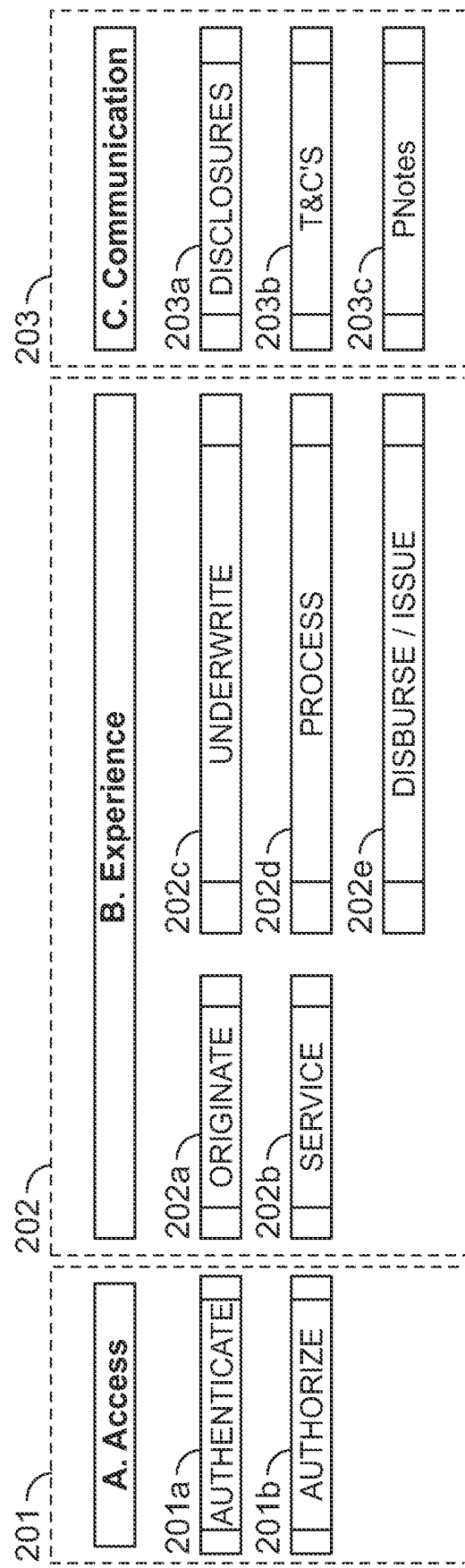
FIG. 2B is a diagram illustrating various categories of operations facilitated by a unified lending platform according to the present disclosure.

The various operations facilitated by the exemplary unified lending platform 200 may be described as belonging to one of three (3) general categories: Access 201, Experience 202, and Communications 203, as shown in FIG. 2B. The first category, Access 201, may encompass authentication and authorization features and functions for completing the Authenticate 201a and Authorize 201b workflow steps of an exemplary unified lending journey. These authentication and authorization features and functions may comprise determining and controlling the level of access and authorization granted to users of the platform 200, as well as controlling and facilitating access between and amongst elements within the platform 200 (e.g., software applications, services, micro-services, APIs, etc.) and elements that reside outside of the platform 200 (third party systems, networks, etc.).

The second category, Experience 202, may encompass journey-specific features and functions for completing additional workflow steps relating to any number and type of workflow journeys, such the exemplary unified lending journey. In this example, the workflow steps comprising the Experience 202 category may include: Originate 202a, Service 202b, Underwrite 202c, Process 202d, and Disburse/Issue 202e, although other workflow journeys may comprise other combination(s) of workflow steps. As noted above, each of the workflow steps 202a-202e in this example may comprise a combination of activities and operations (e.g., processes, scripts, routines, functions, workflows, etc.) that result in one or more designated outcomes. For instance, the designated outcome(s) of the exemplary unified lending journey may relate to one or more unified lending products, lending sub-products, lending services, etc. It is noted, however, that other workflow journeys comprising other combinations of features and functions, may result in other types of outcomes.

The third category, Communications 203, may comprise communications-related features and functions associated with the Access 201 and/or Experience 202 categories. This may include, for example, functionality for composing, scoring, extracting, generating and/or processing system and/or user generated documents and/or communications. In the context of the exemplary unified lending workflow journey, the documents and/or communications may relate to Disclosures 203a, Terms and Conditions 203b, Notes 203c, etc. associated with various workflow steps within the Access 201 and/or Experience 202 categories of the exemplary unified lending workflow journey.

Referring again to FIG. 2A, the frameworks 210-290 of the exemplary unified platform 200 are configured to seamlessly work together in order to facilitate a systematically-efficient and secure transition through each phase (e.g., workflow step) of any number and complexity of workflow journeys (e.g., including a unified lending journey). This includes facilitating all functions and operations associated with the Access 201, Experience 202 and Communications 203 categories discussed above.

In operation, a user desiring to access the platform 200 and/or initiate one or more workflow journeys (e.g., a unified lending journey) may do so by logging-in to the platform 200 and/or launching one or more software applications (e.g., a Lending As A Service or 'LAAS' software application, discussed below) provided by the platform 200 via one or more input devices (e.g., mouse, touch screen on a graphical user interface (GUI), voice recognition, biometric reader, etc.—not shown in FIG. 2A). The input device(s) may be a part of the platform 200 itself and/or part of a user device (e.g., mobile phone, desktop computer, tablet computer, etc.—not shown in FIG. 2A) that is in communication with the platform 200 (e.g., via a local connection or remotely over a network).

In some embodiments, logging into the platform 200 may involve the user device transmitting a signal (e.g., a log-in request, launch of an LAAS application, etc.) to the platform 200. In response, the platform 200 may execute instructions to receive and process the signal from the user device. For example, upon receiving the signal from the user device, the platform 200 may execute instructions to generate and transmit a prompt message including prompt data to the user device. In response to and based on the prompt message, instructions executing on the user device (e.g., a software application) may utilize the prompt data of the prompt message to present a dynamic and interactive graphical user interface (GUI) on a display of the user device. As further discussed below, the dynamic and interactive GUI may be generated and configured by the Dynamic User Interface Framework 220 of the platform 200, specifically for the user device, and made accessible to the user device via a custom, interactive web page.

The GUI displayed on the user device may include a prompt requesting that the user of the user device provide log-in credentials (also referred to as access credentials) to the platform 200 via the user device's input unit. The log-in or access credentials may include a username and password, biometric data, voice command, and/or any other authentication factor.

In response to receiving the access credentials, the user device may transmit the access credentials to the platform 200 for authentication and authorization via the platform's Authentication and Authorization Framework 210.

In some embodiments, the Authentication and Authorization Framework 210 may comprise a single sign-on (SSO) multi-IdP engine (also referred to herein as the "multi-IdP engine") 211 that itself includes one or more servers, including a resource server 211*a*, an authentication server 211*b* and an authorization token class server 211*c*. It should be noted, however, that the multi-IdP engine 211 according to this disclosure may have more or fewer servers and/or server types, co-located and/or located across one or more physical locations and connected physically or through network or wireless links. Each of the one or more servers of the multi-IdP engine 211 may also comprise one or more processors executing computer-readable instructions that cause the one or more servers to perform certain functions described herein.

In some embodiments, the resource server 211*a* may be configured to function as a gateway for receiving and/or responding to any number and types of authentication and/or authorization requests, according to any protocols and/or standards (e.g., OAuth1.0 and OAuth2.0), and it may be configured to exchange data and attributes (e.g., logins, authentication states, etc.) with software applications, systems, service providers, etc. (both within and outside of the platform 200) according to any standard or format (e.g., SAML, JWT, etc.). In addition, the resource server 211*a* may be configured to accept any type or form of users' access credentials, which themselves may comply with any desired protocol, standard and/or framework. The resource server 211*a* may also include a validator class engine (not shown) configured for granting and performing token validations. In some aspects, the token validations may include validating token signatures (e.g., in connection with OAuth2.0 protocol) and/or token expirations for mutual system authentications.

The authentication server 211*b* may be configured to store authentication credentials, as well as associated authorization levels for use in authenticating users according to authentication policy rules and orchestration. The authentication server 211*b* may further be configured to receive access credentials and/or identity tokens from the resource server 211*a*, interrogate its authentication policy rules orchestration and/or authorization module(s) using the received access credentials and/or identity tokens, and return authentication responses in the form of tokens and/or assertions.

The authorization token class server 211*c* may comprise one or more modules (not shown) for generating tokens (e.g., for use in granting access to applications, services, micro-services, systems, etc.) using one or more hashing algorithms, for time-binding the tokens to limit how long the tokens may remain active, and for refreshing (or regenerating) the tokens if they expire according to their respective time-bindings. The authorization token class server 211*c* may also comprise a signature module for providing token signatures that include, for example, grant types, roles, etc., as well as public and private keys.

Upon receiving the access credentials from the user device, the platform 200 may direct the access credentials to the multi-IdP engine 211, wherein the resource server 211*a* may parse and/or extract information therefrom (e.g., meta data) to determine the particular protocol, standard and/or format associated with the access credentials. The access credentials may then be provided to the authentication server 211*b*, which in turn may interrogate an authentication policy rules orchestration and/or authorization module(s) using the received access credentials and return an authentication response to the resource server 211*a*.

If the access credentials are authenticated, the resource server 211*a* may build and return an authentication response to the user device according to the protocol, standard and/or format. In response to and based on the authentication response, instructions executing on the user device may present a dynamic and interactive GUI on the display of the user device to indicate that the user has been authentication and to provide access to the platform 200 according to the user's authorization level. As with all other GUIs discussed herein, this dynamic and interactive GUI may be generated and configured by the Dynamic User Interface Framework 220 of the platform 200, specifically for the user device, as a custom, interactive web page.

Alternatively, if the access credentials are not authenticated, the authentication response generated by the resource server 211*a* and received by the user device may cause the user device to present a dynamic and interactive GUI on the display of the user device to indicate that the user has not been authentication, and to request re-entry and/or alternative access credentials. The re-entered and/or alternative access credentials may then be processed according to the authentication process outlined above. In some embodiments, failure to provide authenticated access credentials after a predetermined number of attempts may result in the user being temporarily or permanently locked-out of (e.g., prevented from accessing) the platform 200.

Once the user's access credentials are authenticated, the user device may be logged in to the platform 200 and engaged in an active session with the multi-IdP engine 211. The user device may then present a dynamic and interactive GUI on the display of the user device that includes, among other things, one or more selectable/input areas for initiating one or more multi-step workflow journeys (e.g., such as the exemplary unified lending journey). Receiving input via the one or more selectable/input areas may in turn cause the user device to initiate the one or more multi-step workflow journeys, for example, by generating and transmitting a signal or instruction to the platform 200. In some embodiments, the one or more workflow journeys may be initiated by launching one or more software applications that (among other things) provides links to available workflow journeys and/or enables any number of users to initiate any number workflow journeys simultaneously. In some embodiments, successfully logging in to the platform 200 automatically launches the one or more software applications.

In some embodiments, if a user attempts to initiate one or more workflow journeys without having first been authenticated, the platform 200 may redirect the user to the multi-IdP engine 211 for authentication, after which the user may continue with the one or more multi-step workflow journey(s).

Each workflow journey initiated by the user device, including the exemplary unified lending journey, may itself involve accessing any number of disparate (and/or independent) resources such as software applications, systems, networks, routes, services, micro-services, APIs, etc., some of which may be native to the platform 200 and some of which may be external to and/or accessed by the platform 200. In either case, before access to any of the resources is granted, each such resource may generate and transmit a respective authentication/authorization request. The request(s) may be received and processed by the resource server 211a of the multi-IdP engine 211 according to protocols, standards and/or formats (e.g., OAuth1.0, OAuth2.0, SAML, JWT, etc.) implemented by the requesting software application, system, network, route, service, micro-service, etc. This is made possible, at least in part, because the resource server 211a may be specifically configured for processing all such requests. For example, upon receiving an authentication and/or authorization request, the resource server 211a may be configured to parse each such request to identify and extract information therefrom (e.g., meta data) to determine the particular protocol (e.g., OAuth1.0, OAuth2.0), standard and/or format utilized by the requesting resource. Based on these determinations, the resource server 211a may build responses to such requests according to the appropriate data format and/or standard (e.g., SAML, JWT, etc.), as further discussed below. Among others, such capabilities represent a significant advancement over conventional IdP engines. Indeed, existing IdP engines need to know (ahead of time) and be specifically built to process the protocol that is tied to a specific access methodology or a URL of an end point, as each such end point would be accepting the authentication and/or authorization request in a specific metadata template pertaining to the protocol. The conventional IdP engine can then perform the necessary validation and build the responses to requests with the appropriate data format and/or standard defined in the request or pre-defined in the IdP engine.

Responsive to each request, the resource server 211a may retrieve the user's access credentials from the authentication server 211b to authenticate the user. In some embodiments, the access credentials may be provided in the form of identity token(s) and/or assertion(s), depending on the standard, protocol and/or format determined for the response.

The resource server 211a may also initiate the authorization token class server 211c to authorize access on behalf of the user. This may include, for example, providing identity token(s) and/or assertion(s) to the authorization token class server 211c, which in turn may generate access and/or authorization token(s) according to the user's authorization level, impose a time limit for the access and/or authorization token(s), and return the access and/or authorization token(s) to the resource server 211a. In some instances, and depending on the authorization protocol being used (e.g., OAuth2.0), the resource server 211a may also validate access and/or authorization token signatures and expirations, if needed. In some embodiments, if any of the token(s) generated by the token class server 211c expires during any point of a particular workflow journey, the token class server 211c may be further configured to regenerate the access and/or authorization token(s) from any step in the particular workflow journey, as needed.

Upon receiving the access and/or authorization token(s) (and validating token signatures and expirations, if necessary), the resource server 211a may complete building responses to the authentication/authorization requests according to the appropriate protocol, standard and/or format. The multi-IdP engine 221a may then provide the responses comprising the access and/or authorization token(s) to the requesting resources. And once each response is verified by the requesting software application, system, network, route, service, micro-service, API, etc., access to the same is granted.

Once a user is authenticated, has been granted access to the platform 200, and has initiated one or more workflow journeys (e.g., such as the exemplary unified lending journey), other frameworks 220-250 comprising the platform 200 may collaborate to guide and enable the user to progress throughout the user's workflow journey(s). For example, as indicated above, the Dynamic User Interface Framework 220 may dynamically generate and configure, for each user's particular user device, all GUIs needed to navigate all aspects and all workflow steps of the user's workflow journey(s). To accomplish this, the Dynamic User Interface Framework 220 may comprise a number of components that, collectively, are configured for dynamically and quickly generating all needed user interfaces (UIs), each as a custom, interactive web page that is accessible by and configured specifically for each user's user device.

Components of the Dynamic User Interface Framework 220 may include a combination of hardware and software components (e.g., servers, modules, applications, executable code, logic, etc.). In some embodiments, the Dynamic User Interface Framework 220 may comprise one or more modules embodied in one or more servers that define a configuration engine 222, a dynamic forms engine 222 and an aggregator engine 223, each of which may be reused and configured for rapid UI/UX development.

The configuration engine 221 may be configured to capture, store, maintain and/or update configuration and properties data that may be used to build any number of customized web pages. This data may include, for example, universal resource locator (URL) data, web page layout data, data structure information, etc., for any number of device types, web browsers, etc. In this manner, the configuration engine 221 may maintain and centrally manage all of the configuration and properties that may ultimately be used for building custom web pages on the fly.

For example, during authentication (e.g., Authenticate 201a, as discussed above) and/or one or more workflow steps of the exemplary unified lending workflow journey (e.g., Originate, Underwrite, Process, etc.), and in response to user input and/or a user interaction on a current web page (e.g., via a current web browser on a particular user device having a current display configuration), the configuration engine 221 may identify (e.g., based on metadata, data stored on the user device, data stored in the platform 200, etc.) and select a combination of configuration and properties data for use in automatically building a subsequent user-specific web page. In some embodiments, the Dynamic User Interface Framework 220 may render on pre-coded display configurations rather than dynamically rendering data when a specific webpage is requested as part of an initial load or subsequent action based load.

The configuration engine 221 may then use the selected configuration and properties data to generate and output universal object(s), such as JSON (Javascript object notation) objects or objects of any other text-based format for representing structured data and having universal compatibility/usability across any programming language (e.g., Angular, React, Vue, Python, .Net, etc.). These universal object(s) may then be provided to both the dynamic forms module 222 and the aggregator engine 223.

The dynamic forms module 222 may itself comprise one or more components for performing functions and operations described below. These components may include one or more of an abstract wrapper, a publish engine, a render engine, a responsive web translator and/or a properties interpreter, all of which are discussed further below (not shown in FIG. 2A). In operation, upon receiving the objects from the configuration engine 221, the dynamic forms module 222 may be configured to translate the objects from their standard text-based format to an XML (extensible markup language) format, or to another suitable simple text-based format for representing structured information.

Once the objects are translated, the dynamic forms module 222 may then interpret the properties data and configuration data selected and provided by the configuration engine 221. This configuration and properties data may then be used to deploy a proper rendering of every subsequent web page for the particular user device (e.g., desktop computer, mobile device, tablet computer, etc.) and web browser, as determined by the configuration engine 221. For example, the configuration data may include web page layout data, forms data, fields data, sequencing data, etc., whereas the properties data may include data defining device type(s), web browser type and version, etc. (e.g., for forward and backward rendering compatibility). Once each subsequent web page is created, the dynamic forms module 222 may test each subsequent web page before being published.

Output of the dynamic forms engine 222 may include, for example, HTML (HyperText Markup Language) tags (or tags coded with another suitable standard code for structuring the subsequent web page and its contents) to build and/or integrate with any programming language. The HTML tags may then be provided to the aggregator engine 223. The dynamic forms engine 222 may also generate objects (e.g., JSON objects or objects in any other standard text-based format for representing structured data), which similarly may be provided to the aggregator engine 223. These objects may include details for integrating one or more webpages to an API and/or database, for example.

The aggregator engine 223 may then build web page metadata for rapid integration with backend components (API's, databases, scripts, etc.) of the platform 200. This may include, for example, providing information and instructions to be carried out by the backend components of the platform 200. To do this, the aggregator engine 223 may comprise one or more components (e.g., a reference maps component, an event generator component, etc., discussed further below, but not shown in FIG. 2A). Collectively, these components may be configured to include reference or index maps, for instructing the platform 200 as to when to invoke certain functions (e.g., group and/or cluster web page forms together, etc.), and to provide information and instructions (to the platform's 200 backend components) as to how to sequentially execute events by creating metadata (e.g., for going from one web page to another). In some embodiments, certain functions of the aggregator engine 223 may occur in a runtime environment.

Output of the aggregator engine 223 may also be provided in the form of text-based objects (e.g., JSON objects or objects in any other suitable standard text-based format), so as to enable use and integration with any existing programming language.

Once created and configured for the particular user device, web browser, etc., each subsequent web page, together with each web page's metadata, may then be output by the Dynamic User Interface Framework 220 to other frameworks 210, 230-290 within the platform 200, for rapid integration with the platform's 200 backend components (e.g., API's, database). In some embodiments, the web page(s) may be built in batch and/or in real time; and in some embodiments, the output of the Dynamic User Interface Framework 220 may take the form of standard text-based objects (e.g., JSON).

The Workflow State Management Framework 230 may provide features and functions for controlling (e.g., managing, maintaining, transitioning, etc.), in real-time, the flow between states triggered by API's, user interfaces, data ETL's (extract, transform, load), scripts, etc. associated with any number of real-time workflow journeys, such as the exemplary unified lending journey. In this regard, the Workflow State Management Framework 230 may comprise a combination of hardware and software components (e.g., servers, modules, applications, executable code, logic, etc.) that define an event and state management utility (not shown in FIG. 2A) that controls the functioning and operation of various components of the real-time Workflow State Management Framework 230, which may include an events database 231, an event states database 232 and a transition utility 233. The events database 231 may be configured to capture, maintain and store event metadata for one or more workflows (e.g., the unified lending workflow). In operation, each time an event occurs and/or is triggered, metadata associated with that event may be captured, maintained and stored in the events database 231. Similarly, state machine metadata (e.g., state machine codes for each workflow event) may be captured and stored by the event states database 232.

The transition utility 233, which may comprise immutable storage, may be configured to capture permutations of possible workflows, events, states, and transition data (e.g., from events database 231 and/or event states database 232), and store such data in a manner that enables real-time (or near real-time) data retrieval. Once captured, this data may be continually tested (e.g., via machine learning modeling, not shown) and updated so as to provide the most up-to-date data at all times, and to continually improve determinations as to next best step, state, transition, resource, etc. Thus, as a user progresses through each step, phase, aspect of a workflow journey, the data maintained by the transition utility 233 may be used (e.g., by an event and state management utility (not shown)) to control the flow between states triggered by API's, user interfaces, data ETL's, scripts, etc.

In operation, at any given point of a given workflow's journey (e.g., including at any point during the Authenticate 201a, Originate 202a . . . , etc. workflow steps), input parameters provided (e.g., from the user device) to the platform 200 and/or other initiators (discussed further below) associated with the workflow may trigger one or more events that result in an initiate state event. In response, then-current state data associated with the workflow may be used (e.g., by an event and state management utility, not shown in FIG. 2A) to determine and suggest the next best step, state, transition, resource, etc. to continue the workflow's journey. As indicated above, the then-current state data may be stored in immutable storage of the transition utility 233 and based on event and event state metadata captured by the events database 231 and event states database 232, respectively.

Once the determination as to the next best step, state, transition, resource, etc. is made, the given workflow journey may advance to the next best step, state, etc. This process (including multiple instances thereof) may be continuously repeated, sequentially and/or in parallel, until the given workflow journey is completed. That is, this process may be executed multiple times simultaneously responsive to one or more triggering events requiring multiple transitions.

The Document Automation and Template Management Framework 240 may comprise a combination of hardware and software components (e.g., servers, modules, applications, executable code, logic, etc.) that, collectively, are configured to obtain, model and/or assess data associated with users of the platform 200 (including data embodied in electronic documents and/or communications), and generate and transmit informative electronic documents to the users (e.g., terms, conditions, disclosures and notifications about a loan product, information required by regulations and/or policies, etc.) as needed throughout each user's workflow journey(s). This includes, for example, generating all documents that may fall within the Communications 203 category discussed above.

In some embodiments, the Document Automation and Template Management Framework 240 may include, among others, an upload widget module 241, an optical character recognition (OCR) engine 242, a scoring engine 243 and a template manager 244. In operation, the upload widget module 241 may be configured to upload any document (from a user device or any other data source) of any type in any format, and orient and store the document. The optical OCR engine 242 may then scan, identify and extract predetermined types and quantities of information from the uploaded document. The scoring engine 243 may then score the extracted information, based on machine learning modeling, for accuracy. Based on the scoring, the Document Automation and Template Management Framework 240 may verify the document(s) and/or automate certain tasks based on the information extracted from the document(s), such as printing, faxing, reading, translating, coding, storing information from the uploaded document(s), etc.

Verified information extracted from uploaded documents (and/or other data captured and/or stored by the platform 200) may be used by the template manager 244 to automatically generate electronic documents or communications (e.g., emails, text messages, etc.). In some embodiments, the template manager 244 may retrieve one or more document templates from storage and auto-populate the templates with the information obtained from uploaded documents, one or more external data sources and/or the platform 200 itself. Completed/populated document templates may then be converted into an electronic communication suitable for transmitting and/or displaying to a user via a user device.

The Notification and Active DLP Engine Framework 250 may comprise a combination of hardware and software components (e.g., servers, modules, applications, executable code, logic, etc.) that, collectively, are configured to detect and prevent loss, leakage, and/or exposure of sensitive data and information such as PII, particularly in complex computing environments comprising any number of frameworks, connections, systems, components, networks, communication channels etc. (e.g., the environment of the unified lending platform 200). The Notification and Active DLP Engine Framework 250 may also be configured to provide both real-time and batch based detection, protection and controls to prevent and/or mitigate data loss, leakage and/or exposure that may occur during and/or in connection with any number and type of real-time workflow journeys (e.g., such as the unified lending journey). Further still, Notification and Active DLP Engine Framework 250 may be configured to automatically initiate tasks within the platform 200, including automatically generating notifications, relating to any detected/determined instance of potential data loss, leakage and/or exposure.

In some embodiments, the Notification and Active DLP Engine Framework 250 may comprise an event sourcing framework 251, a query module 252, a compute module 253 and a command module 254. The event sourcing framework 251 may itself include any number of components or modules configured for capturing and/or extracting data, including in real-time and/or in batch, at any given time (e.g., on-demand, periodically, continuously, etc.), from any type of data source, during a real-time workflow journey (e.g., such as the unified lending journey). The data sources may include user devices (e.g., via a direct link, user input, etc.), the platform 200 itself (e.g., platform-generated data), and/or any type of communication (e.g., text message, email, video communications, scanned/uploaded document, etc.) received into, deployed out of and/or circulating within the platform 200. The captured data, which may include PII and non-PII, may be then be translated into text-based data objects (e.g., JSON objects), after which other components of the event sourcing framework 251 may process such data objects to identify and assess the source(s) of the captured/extracted data. In this manner, the event sourcing framework 251 may determine and ensure that the captured/extracted data has been provided by a registered and/or authorized publisher or source.

The query module 252 may be configured to receive the captured/extracted data objects from the event sourcing framework 251, as well as to read and apply patterns, rules, and/or scores to the data objects in order to classify the data objects as comprising PII and/or non-PII data. The patterns, rules, and/or scores used by the query module 252 may be determined by a combination of the command module 254 and compute module 253, discussed below, and stored in one or more databases and/or immutable logs (not shown in FIG. 2A) that are accessible by the query module 252.

The command module 254 and the compute module 253 (together with one or more immutable logs, not shown in FIG. 2A) may collectively be referred to as a configurable rules engine that may be configured to (among other things) generate real-time dynamic data scores, which may involve executing rules and/or computing probabilities based on predictive and/or unsupervised machine learning models (e.g., unsupervised generative statistical models).

The command module 254 may itself be configured to make determinations that include initiating actions such as generation of a notification or alert, generating a stop or pause communication instruction, writing to an immutable log, or any number of other actions triggered by rules.

The compute module 253 may be configured for continuous learning (e.g., via machine learning models) to continuously improve the rules, patterns and/or other information used to score captured data objects. The machine learning models may be unsupervised, and configured to continually refine rules, patterns and/or scores, which may be provided to the command module 254 and written in an immutable log.

In operation, the platform may receive and/or generate an electronic communication at any point during a workflow journey. For example, during an Originate 202a workflow step of the exemplary unified lending journey, the platform 200 may receive an electronic document that has been uploaded by a user. In another example, the platform 200 may generate (e.g., via the Document Automation and Template Management Framework 240), an electronic disclosure document during an Underwrite 202c workflow step of the exemplary unified lending journey. In either case, the event sourcing framework 251 may analyze the electronic communication and/or parse, capture and/or extract data therefrom, convert the extracted data into text-based data objects (e.g., JSON objects) and further analyze the data to confirm that the electronic communication originated from a registered/authorized source. Once the source of the electronic communication is confirmed as being registered/authorized, the query module 252 may apply rules, patterns and/or scores to the text-based data objects to identify and classify which, if any, portions of the electronic communication may include PII or other sensitive information. The query module 252 may also be able to determine (based on the applied rules, patterns and/or scores) whether the electronic communication may itself be susceptible to data loss, leakage and/or exposure, regardless of the presence of PII.

Responsive to a determination that the electronic communication may include PII and/or may be susceptible to data loss, leakage and/or exposure, the command module 254 may initiate one or more actions and/or controls to mitigate and/or prevent potential loss, leakage and/or exposure of sensitive data. Such actions may include (without limit) generation of a notification, alert or other communication, imposition of additional security measures, and/or initiating a stop or pause communication instruction. In some embodiments, if the electronic communication is stopped or paused, other aspects/frameworks of the platform 200 may further analyze the electronic communication to determine how to further process the same.

The Orchestration Engine Framework 260 may comprise a combination of hardware and software components (e.g., servers, modules, applications, executable code, logic, etc.) that, collectively, are configured to control, orchestrate and/or call any of the platform's 200's frameworks, systems, components, etc., as needed, to perform all necessary operations and functions for traversing (e.g., initiating through completing) any number of complex real-time workflow journeys. As discussed herein, orchestration refers to the coordination and/or management of any number of computer systems, computer components, modules, applications and/or services, in order to string together multiple tasks in a proper sequence, so as to successfully and efficiently complete any number of workflow journeys, sub-journeys, and/or elements thereof.

In some embodiments, the Orchestration Engine Framework 260 may comprise a combination of components that include a handler 261, a resolver 262, a rules engine 263 and a decider module 264, as shown in FIG. 2A. The handler 261 may be configured to execute one or more routines configured to manage any number of APIs connecting to any number of endpoints to perform a set of capture validations (e.g., to validate incoming data) and/or event hooks (e.g., to create a chain of functions/procedures), which may then be stored in a real-time in-memory database (not shown in FIG. 2A).

The resolver 262 may be configured to resolve/translate communication protocols, language bytecodes, data exchange protocols, etc. associated with the data captured and managed by the handler 261. The resolver 262 may accomplish such resolve/translate functions via an interpreter (not shown in FIG. 2A) which translates, for example, language bytecodes into machine understandable bytecode. Metadata from the translations may then be stored within an in-memory database (not shown in FIG. 2A) for use in future resolver functions.

The rules engine 263 may be configured to store any number of workflow journey rules, sub-journey rules, exception rules, and/or other types of rules (e.g., for queueing, sequencing, indexing, etc.) in a persistent database (not shown in FIG. 2A), for example, which may then be utilized by the decider module 264 for performing its respective functions.

The decider module 264, with input from the resolver 262 and rules engine 263, may perform all needed orchestrations. This may include, for example, queueing, sequencing of state machines, indexing of APIs through various software development kits ("SDK's") and other micro-service orchestrations in accordance with the respective rules from the rules engine 263. Metadata of the orchestrations may then be stored in a real-time in-memory database (not shown in FIG. 2A), while the orchestrations themselves may be stored in a suitable persistent database (e.g., NoSQL ("Not Only Structured Queue Language"), RDBMS ("Relational Database Management System", etc., not shown in FIG. 2A).

Communications between and amongst the various Orchestration Engine Framework 260 components may occur using standard text-based data objects (e.g., JSON (JavaScript object notation)).

In operation, a workflow journey, sub-journeys and/or one or more related workflow steps may be initiated upon an occurrence of one or more initiation events. The one or more initiation events may include, for example, input or data that received by the platform 200 (e.g., from a user device, an external system, etc.), completion of one or more operations or functions, automatically in response to instructions generated by the platform 200 (e.g., responsive to determinations made by the platform 200 via, for example, machine learning routines), etc.

Once a workflow journey, sub-journey, step, etc. is initiated, a series of functions and operations that collectively are required to accomplish the initiated workflow journey, workflow sub-journey, etc. may also be triggered. In some embodiments, this series of functions and operations may include (among others) any number and combination of data capture functions, bureau call functions, calculator functions, decision functions, etc., all of which may be orchestrated by the Orchestration Engine Framework 260.

Once the data capture and bureau call functions are called, for example, the handler 261 may perform a set of API validation functions in connection with any number of APIs. Results of the validation functions, together with data and/or instructions associated with the data capture and bureau call functions, may then be provided to the resolver 262 (e.g., after being converted to text-based data objects). At the resolver 262, data objects received from the handler 261 may be processed and translated (e.g., via an interpreter) into a common, understandable machine language, which may in turn be provided to the decider 264. The decider 264 may then process the data objects received from the resolver 262, together with rules from the rules engine 263, and attend to sequence the data capture, bureau call, calculator and decision and any other functions associated with the initiated workflow journey, sub-journey, etc.

In some embodiments, sequencing of certain functions (as discussed above) may constitute an initiation event that initiates one or more subsequent workflow journeys, sub-journeys, etc. Functions and operations of the subsequent workflow journey(s), sub-journey(s), etc. may similarly be orchestrated, as discussed above. Orchestration by the Orchestration Engine Framework 260 may continue until all sub-journeys, steps, etc. of all initiated workflow journeys are completed or otherwise terminated.

The APIs/Micro-Service Architecture 270 may comprise a combination of hardware and software components (e.g., servers, modules, applications, executable code, logic, etc.) that, collectively, are configured to enable real-time information associated with each user's workflow journey(s), including the exemplary unified lending journey, to be exchanged between various components of the platform 200. For instance, the APIs/Microservice Architecture 270 may allow a component of the platform 200 to access one or more services through corresponding APIs. This may be accomplished, for example, by executing instructions to organize and/or utilize collections of smaller, independent ('micro') services (e.g., platform services 271, business services 272, data services 273, custom services 274, and any other type of services) that are able to communicate over well-defined APIs. This Architecture 270 also provides access to the platform's 200 features, functions and/or data (e.g., from the Domain Based Data Architecture 280) responsive to user action(s) and/or actions/operations of the platform 200 (e.g., from any of Frameworks 220-250).

The Domain Based Data Architecture 280 provides the platform's 200 data repository in the form of a domain driven data architecture that uses a balance of normalized and de-normalized data to cluster each user's workflow journey(s) information into databases and tables with keys to connect them. For example, domain based data architecture 280 may maintain, within one or more databases, data for each of a plurality of domains 281. As an example, the domain based data architecture 280 may maintain within one or more databases master data, lifecycle data, and reference data for each of the domains 281. Master data may include, among other data, store entity data, persona data, and product data. Lifecycle data may include data and information relevant to any workflow journey, sub-journey, and/or workflow steps. Such data and information may include, for example, identity provider data, marketing data, origination data, underwriting data, processing data, issuance data, disbursements data, servicing data, and document automation data, among other examples. Reference data may include, among other data, system reference data, product reference data, authentication and authorization reference data, document reference data, template reference data, and/or any other reference data.

The One-Click Infrastructure as a Service Framework 290 provides the infrastructure for hosting the overall platform 200 and its components. Since the platform 200 has a modular design, this infrastructure enables the platform 200 (and/or any of its components) to be easily scaled and/or updated. In this example, the Service Framework 290 includes Network and Configuration Manager Class 291, Infrastructure Provisioner Class 292, and Container Manager Class 293. Network and Configuration Manager Class 291 can generate network and security provisions, such as network and security provisions required by any workflow. Infrastructure Provisioner Class 292 can generate infrastructure provisions, such as infrastructure provisions required by any workflow. Further, Container Manager Class 293 can package the network and security provisions and infrastructure provisions provided by the Network and Configuration Manager Class 291 and Infrastructure Provisioner Class 292, respectively, and can transmit the packaged provisions such as to a user device. For example, the Service Framework 290 may generate a one click deploy/destroy package based on the packaged network and security provisions and infrastructure provisions provided by the container manager class, and may deploy the one click deploy/destroy package to a cloud-based repository. In this manner, the platform of this disclosure is scalable, for example, to account for new products, personas, user needs (e.g., users engaging in simultaneous and/or multiple end-to-end journeys, changes to linked systems, etc.).

Each of the various platform components mentioned above is described in further detail.

0. Authentication and Authorization Framework.

The authentication and authorization framework of the present disclosure includes a unique, single sign-on (SSO) multi-identity provider (IdP) engine and framework configured for operating in an integrated and polyglot microservices architecture for managing authentication and/or authorization across any number of resources, including (without limit) systems, services, micro-services, networks, platforms, IdPs, APIs, software applications, etc. in connection with any number and complexity of multi-step workflow journeys. That is, the SSO multi-IdP engine and framework described herein provides SSO functions and efficiencies across any number of internal, external and/or hybrid (internal+external) systems, applications, platforms, networks, services, micro-services, authentication protocols, etc., including where different access credentials are needed to access the different systems, applications, platforms, etc. Notably, this SSO multi-IdP engine and framework has unique aspects that facilitate use and integration with diverse systems and accessibility by various users and user types. These include authentication functionality for authenticating internal and external systems (and system components), as well as internal and external users having single or multiple log-in credentials; and authorization functionality for authorizing systems, users, and/or APIs through mutual authentication patterns (standards, protocols, etc.).

For purposes of this disclosure, single sign-on (SSO) technology may generally be characterized as a session and/or user authentication functionality that enables a user to use one set of log-in credentials (e.g., username and password) to access any number of systems, components, applications and/or services. For example, in a system that utilizes SSO technology, when a user (after logging into the system) attempts to access a software application (and/or service), a service provider associated with the software application may send an authentication request to an identity provider (IdP) utilized by the system. The IdP may comprise a system module that performs authentication functions, including responding to the service provider's request with data comprising the user's identity (e.g., the user's credentials) and/or the user's authorization level. The service provider may then process the response and, if the authentication is successful, the service provider may then grant the user access to the software application in accordance with the user's authorization level. In this regard, the IdP acts as an intermediary by sharing the user's authentication/authorization information with the service provider on behalf of the user (i.e., without the user having to re-enter his/her log-in credentials).

Attempting to implement SSO technology becomes exponentially more challenging in the context of multi-step workflow journeys that involve requesting access to multiple (and often independent) services, micro-services, APIs, software applications, systems, and other types of resources that utilize multiple and diverse IdPs implementing disparate authentication and authorization protocols. Having recognized these (and other) challenges, the present disclosure provides a novel SSO multi-IdP framework and engine that addresses such challenges.

Figure 3:
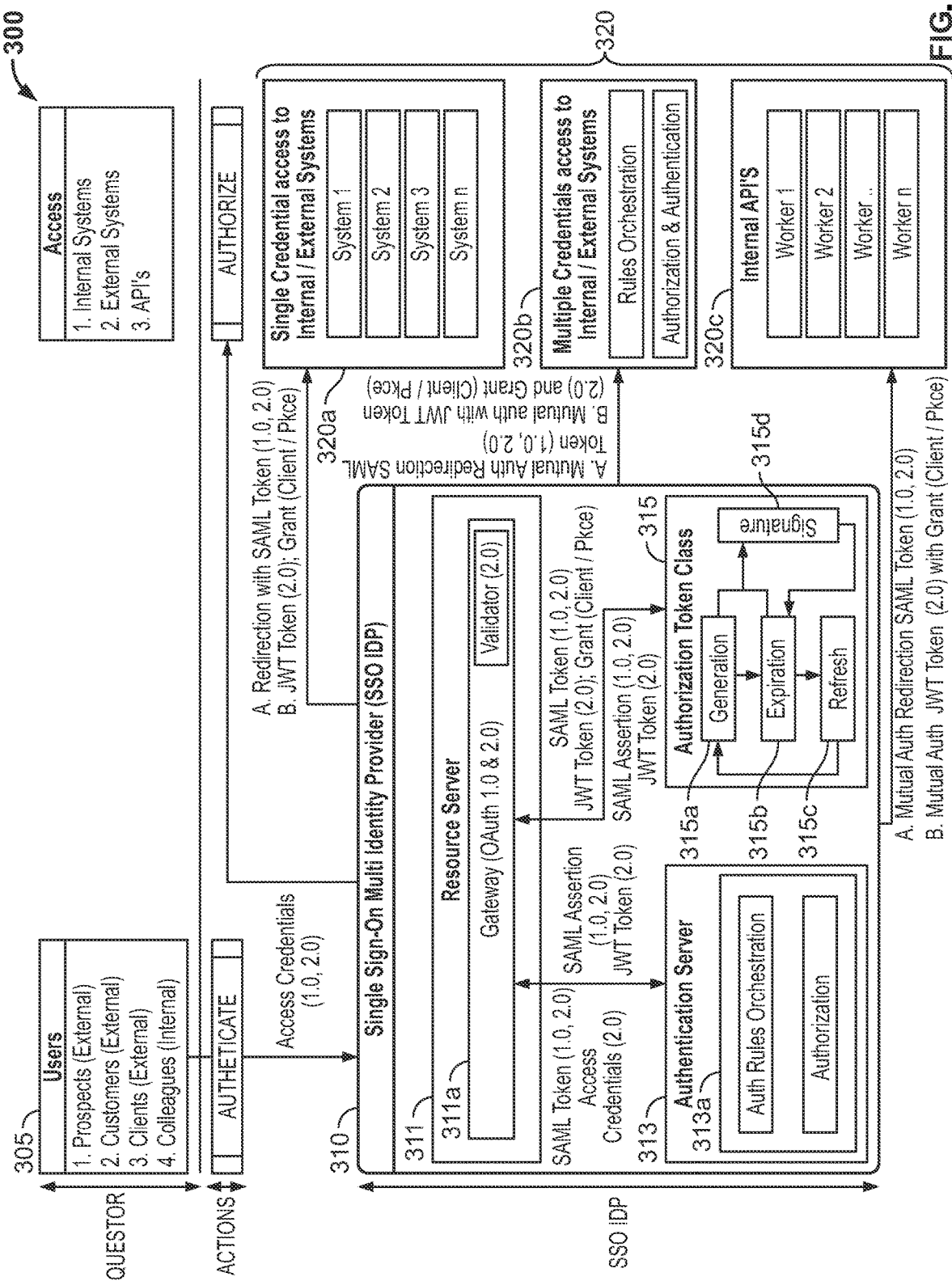
FIG. 3 is an exemplary single sign-on (SSO) multi-identity provider (IdP) framework according to the present disclosure.

Turning now to FIG. 3, an exemplary SSO multi-IdP framework 300 according to the present disclosure is shown. For illustrative purposes, aspects of FIG. 3 will be discussed in the context of a multi-IdP engine 310 configured for use with OAuth (or OAuth1.0) and OAuth2.0 authorization protocols that respectively define the format, standard, etc. (e.g., SAML and JWT) and other aspects of authentication/authorization communications within the framework 300. It should be noted, however, that the SSO multi-IdP framework 300 is not limited thereto. To the contrary, the SSO multi-IdP framework 300 of the present disclosure may be configured for use with additional and/or alternative IdP engines that utilize additional and/or alternative respective protocols and/or standards.

Returning now to FIG. 3, the exemplary SSO multi-IdP framework 300 may include an SSO multi-IdP engine (also referred to herein as the "multi-IdP engine") 310 that itself includes one or more servers, including a resource server 311, an authentication server 313 and an authorization token class server 315. Although the exemplary multi-IdP engine 310 is shown as having one each of a resource server 311, an authentication server 313 and an authorization token class server 315, it should be understood that the multi-IdP engine 310 of this disclosure may have more or fewer servers, co-located and/or located across one or more physical locations and connected physically or through network or wireless links. Each of the one or more servers of the multi-IdP engine 310 may also comprise one or more processors executing computer-readable instructions that cause the one or more servers to perform certain functions described herein.

In some embodiments, the resource server 311 may be configured to function as a gateway for receiving and/or responding to any number and types of authentication and/or authorization requests, according to any protocols and/or standards (e.g., OAuth1.0 and OAuth2.0), and it may be configured to exchange data and attributes (e.g., logins, authentication states, etc.) with software applications, systems, service providers, etc. according to any standard or format (e.g., SAML, JWT, etc.). In addition, the resource server 311 may be configured to accept any type or form of users' access credentials, which themselves may comply with any desired protocol, standard and/or framework (e.g., Access Credentials (1.0) or (2.0)). The resource server 311 may also include a validator class engine 311a configured for granting and performing token validations. In some aspects, the token validations may include validating token signatures (e.g., in connection with OAuth2.0 protocol) and/or token expirations for mutual system authentications.

The authentication server 313 may be configured to store authentication credentials, as well as associated authorization levels 313a, for use in authenticating users according to authentication policy rules and orchestration. The authentication server 313 may further be configured to receive access credentials and/or identity tokens from the resource server 311, interrogate its authentication policy rules orchestration and/or authorization module(s) 313a using the received access credentials and/or identity tokens, and return authentication responses in the form of tokens and/or assertions.

The authorization token class server 315 may comprise a generation module 315a, an expiry module 315b, and a refresh module 315c. The generation module 315a may be configured to generate tokens (e.g., for use in granting access to applications, services, micro-services, systems, etc.) using one or more hashing algorithms, for example. The expiration module 315b may be configured to time-bind the tokens to limit how long the tokens may remain active, and the refresh module 315c may be configured to refresh (or regenerate) tokens if they expire according to the time-limitations imposed by the expiration module 315b. The authorization token class server 315 may also comprise a signature module 315d, for providing token signatures that include, for example, grant types, roles, etc., as well as public and private keys.

In operation, a user may initiate a session with the multi-IdP engine 310 by providing access credentials (e.g., username and password, biometric data, or any other authentication factor), via one or more input devices (e.g., mouse, touch screen on a GUI, voice recognition, biometric reader, etc., not shown) to the platform and/or system on which the multi-IdP engine 310 is operating. The access credentials (noted as 'Access Credentials (1.0, 2.0)' in FIG. 3) may themselves be configured according to any number of protocols, standards and/or formats (e.g., OAuth1.0, OAuth2.0, SAML Token (1.0, 2.0), etc.). The access credentials may be provided from a remote user device 305 (e.g., over a network using a graphical user interface on the user's mobile device) or from a co-located user device 305 that is in communication with the platform and/or system. The type of user associated with the user device 305 and providing the access credentials may be one or more of an external user (e.g., customer, client, prospective customer or client, etc.) and/or an internal user (e.g., platform-side colleague). In some embodiments, access credentials of one or more external users and one or more internal users may be linked, such that once an external user successfully logs in, one or more internal users may also be granted access the external user's activity within the platform and/or system.

Once the user's access credentials are authenticated (e.g., by the authentication server 313), the user device 305 is logged in to the platform and/or system and engaged in an active session with the multi-IdP engine 310. Upon successfully logging in, the user device 305 may initiate one or more multi-step workflow journeys. In some embodiments, the one or more workflow journeys may be initiated by launching one or more software applications that (among other things) provides links to available workflow journeys and/or enables any number of users to initiate any number workflow journeys simultaneously. In some embodiments, successfully logging in to the platform automatically launches the one or more software applications.

Alternatively, a user may attempt to initiate one or more workflow journeys without having logged in (e.g., by attempting to launch an LaaS applications provided by the platform or system). In this case, the user may first be redirected to the multi-IdP engine 310 for authentication, after which the user may continue with the workflow journey(s).

Each workflow journey initiated by the user (e.g., via user device 305) may itself involve accessing any number of disparate (and/or independent) resources such as software applications, systems, networks, routes, services, micro-services, APIs, etc. 320. That is, progress through each of the one or more multi-step workflow journeys may involve calls/requests for services, micro-services, operations, functions, etc. from a combination of software applications, systems, networks, routes, APIs, etc. 320. These software applications, systems, networks, etc. 320 may be native to the platform and/or system (e.g., internal), or they may external to and/or accessed by the platform and/or system.

Before access to each of the software applications, systems, networks, routes, services, micro-services, APIs, etc. 320 (associated with each workflow journey) is granted, however, each such software application, system, network, route, service, micro-service, etc. 320 may respond to its respective call with an authentication/authorization request. The request(s) may be received and processed by the resource server 311 of the multi-IdP engine 310 according to protocols, standards and/or formats (e.g., OAuth1.0, OAuth2.0, SAML, JWT, etc.) used by the requesting software application, system, network, route, service, micro-service, etc. 320. This is made possible, at least in part, because the resource server 311 is specifically configured for processing all such requests. For example, upon receiving any authentication and/or authorization request, the resource server 311 may be configured to parse each such request to identify and extract information therefrom to determine the particular protocol (e.g., OAuth1.0, OAuth2.0), standard and/or format utilized by the requesting application, system, etc. 320. Based on these determinations, the resource server 311 may proceed to build responses to such requests according to the appropriate data format and/or standard (e.g., SAML, JWT, etc.), as further discussed below. As a result, the multi-IdP engine 310 is not limited by one particular authentication/authorization protocol or standard, but is instead uniquely configured to communicate and provide authentication/authorization responses to any application, system, network, route, service, micro-service, etc. without regard to protocol, standard and/or data format.

Responsive to each request, the resource server 311 may retrieve the user's access credentials from the authentication server 313 to authenticate the user. In some embodiments, the access credentials may be provided in the form of an identity token and/or assertion, depending on the standard, protocol and/or format determined for the response. The resource server 311 may also initiate the authorization token class server 315 to authorize access on behalf of the user. This may include, for example, providing identity token(s) and/or assertion(s) to the authorization token class server 315 and generating (by the generation module 315a) access and/or authorization token(s) according to the user's authorization level, imposing a time limit (by the expiration module 315b) for the access and/or authorization token(s) and, if the token(s) expires (e.g., during execution of an authorized application, system, resource, etc. 320), regenerating (by the refresh module 315c) the access and/or authorization token(s) from any step in the particular workflow journey, if needed. In addition, the signature module 315d may generate and provide token signatures that include, for example, grant types, roles, etc., as well as public and private keys, as part of the access and/or authorization token(s).

The access and/or authorization token(s) may then be returned to the resource sever 311 and, depending on the authorization protocol being used (e.g., OAuth2.0), the resource server 311 may validate the access and/or authorization token signatures and expirations.

Once token signatures and expirations validated (if necessary), the resource server 311 may then complete building the response to the authentication/authorization request(s) according to the appropriate protocol, standard and/or format. The multi-IdP engine 310 may then provide the response comprising the access and/or authorization token(s) to the requesting software application, system, network, route, service, micro-service, resource (e.g., API), etc. 320. And once the response is verified by the requesting software application, system, network, route, service, microservice, resource (e.g., API), etc. 320, access to the same is granted. For example, if the requesting entity comprises one or more internal and/or external systems 320a, each of which relies on a respective authentication and/or authorization protocol (e.g., OAuth1.0, OAuth2.0), the multi-IdP engine 310 may respond with SAML token(s) and/or JWT token(s), as appropriate for the particular requesting system 320a.

In some embodiments, the multi-IdP engine 310 may first require the requesting software application, system, network, route, service, micro-service, resource (e.g., API), etc. 320 to authenticate before providing the authentication/authorization token(s). This may be referred to as mutual authentication, and it may occur, for example, when the requesting entity comprises one or more internal and/or external systems requiring multiple credentials for access (320b), when the requesting entity comprises one or more internal APIs (320c), as well as in other scenarios. The use of mutual authentication may facilitate such internal and/or external integrations, including with respect to future integrations (e.g., with future APIs that do not yet exist). In such cases, the requesting entity's (320b, 320c) authentication/authorization request must itself include information to enable the multi-IdP engine 310 to validate the entity's authentication certificate (e.g., as part of a public key infrastructure) provided during in initial handshake between the multi-IdP engine 310 and the requesting entity (320b, 320c). Once the certificate is validated, the multi-IdP engine 310 may provide the authentication/authorization token(s). For example, if the requesting entity comprises one or more internal and/or external systems requiring multiple credentials for access 320b, each of which relies on a respective authentication and/or authorization protocol (e.g., OAuth1.0, OAuth2.0), the multi-IdP engine 310 may respond with mutual authentication/authorization SAML token(s) and/or mutual authentication/authorization JWT token(s) (with grant), as appropriate for the particular requesting system 320b. Similarly, if the requesting entities comprise one or more internal APIs 320c, each of which relies on a respective authentication and/or authorization protocol (e.g., OAuth1.0, OAuth2.0), the multi-IdP engine 310 may respond with mutual authentication/authorization SAML token(s) and/or mutual authentication/authorization JWT token(s) (with grant), as appropriate for the particular requesting API 320c.

As detailed above, it should be noted that the access and/or authorization requests and response tokens may be configured and provided according to the framework of each corresponding request. Thus, requests provided using an OAuth1.0 framework may be processed using SAML standard/format, in which SAML access/authorization tokens may be generated and returned. Similarly, OAuth2.0 requests may be processed using JWT standard/format, in which case JWT tokens may be generated and returned.

As a result of its novel design, the SSO multi-IdP engine described herein is uniquely configured (among other things) to establish seamless mutual authentication in an integrated polyglot micro-services architecture, regardless of whether aspects thereof rely on legacy (e.g., OAuth1.0) and/or more modem (e.g., OAuth2.0) authorization protocols and/or frameworks. The multi-IdP engine of this disclosure may also be updated to account for future updates and/or versions of such protocols and/or frameworks. As noted above, the multi-IdP engine of this disclosure is also suitable for systems, applications, etc. having multiple a credentials, but also requiring mutual authentication (e.g., for certain types of transactions), as discussed above.

Further, the multi-IdP engine described herein provides authorization across services to enable denial of external and internal service attacks. An external service attack, for example, may involve a security attack with payload modification on an external service to gain access to the system. This type of attack may be prevented by the multi-IdP's token validation and signature functions described above. Internal service attacks may result from concurrent user endpoint requests that result in an exponential surge of requests in a micro-services architecture. These internal attacks may be thwarted by access denials driven by token expiry and gateway validation functions of the SSO multi-IdP engine discussed herein.

In a non-limiting example, the SSO multi-IdP engine of the present disclosure may be implemented in a system that provides a lending as a service (LaaS) or unified lending software application, which may be characterized by providing access to initiate any number of complex multi-step workflow journeys (each associated with one or more particular electronic lending products). As with other types of workflow journeys contemplated herein, lending-specific workflow journeys may similarly involve accessing any number of other software applications, systems, networks, APIs, services, micro-services, etc. As discussed above, the multi-IdP engine of the present disclosure is uniquely configured to provide mutual authorizations between such software applications, systems, networks, services, micro-services, and/or any other type of resource. This includes, for example, using a single set of log-in credentials of any type to grant access to systems, applications, etc. that rely on one or more authentication/authorization protocols, standards and/or formats (e.g., OAuth1.0, OAuth2.0, etc.). This also includes using the single set of log-in credentials to grant access to multiple systems (where the user has different access credentials for each) that must be mutually authenticated and/or authorized for in certain instances, to grant access to other system(s) that use their own SSO technology, to prevent external and/or internal service attacks, etc., all as part of the LaaS multi-step workflow journey.

Figure 4:
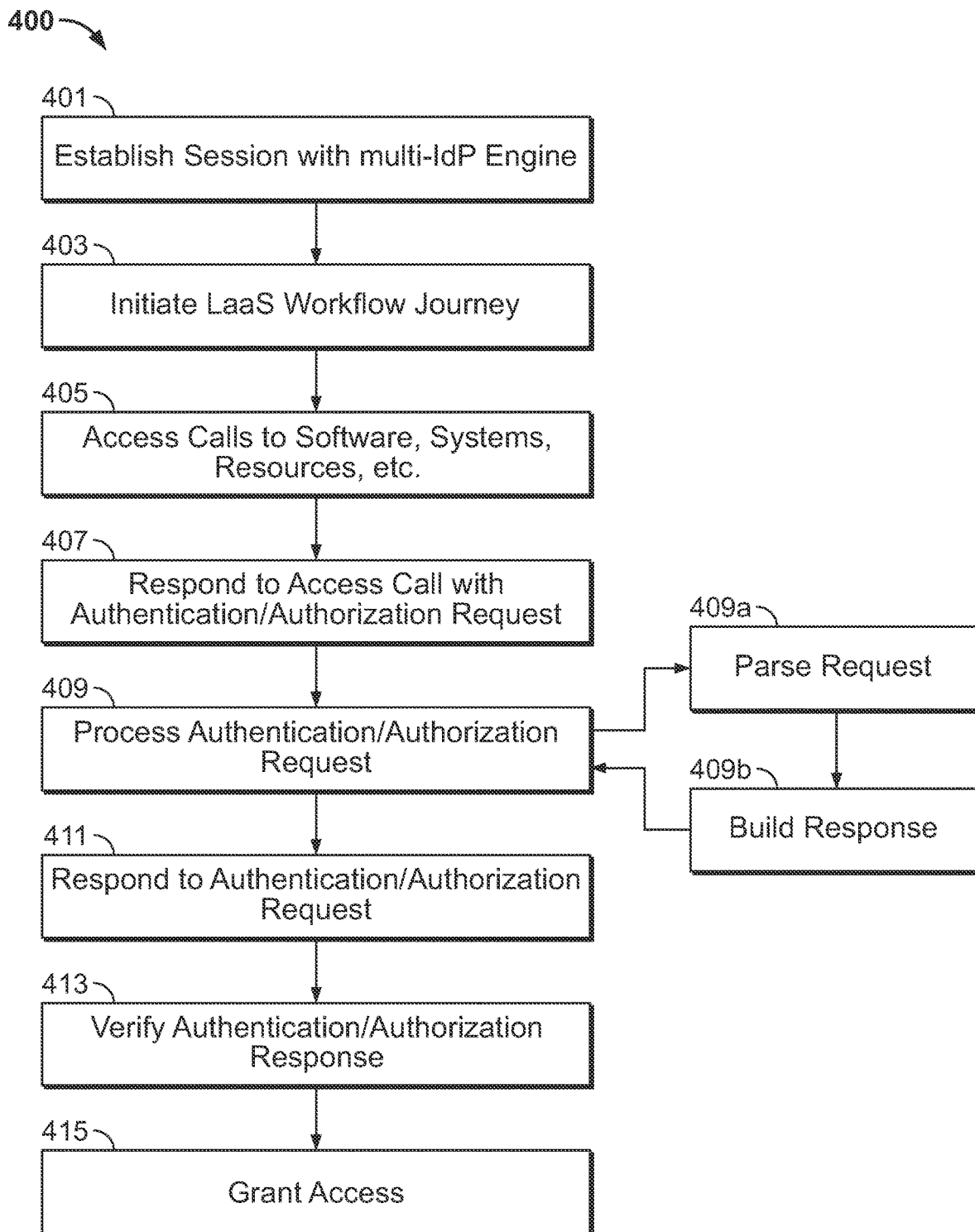
FIG. 4 is flowchart of an exemplary electronic authentication and authorization method 400 according to the present disclosure.

Turning now to FIG. 4, an exemplary electronic authentication and authorization method 400 for providing access to any number of resources, such as software applications, systems, networks, services, micro-services, etc., associated with completing a multi-step workflow journey is shown. In this example, the multi-step workflow journey may define an electronic lending product (e.g., personal loan, credit card, etc.) and comprise any number of workflow steps (e.g., Origination, Underwriting, Processing, Issuing, Servicing, etc.) that each requires accessing any number of disparate and/or independent resources (e.g., software applications, systems, networks, routes, services, micro-services, APIs, etc.). Navigating through the various workflow steps of this exemplary multi-step workflow journey may be facilitated by a software and/or web application, such as a LaaS application, embodied on one or more computing devices.

A first step of the authentication and authorization method 400 may comprise establishing a session with a multi-IdP engine 401 configured to receive, process and respond to authentication and authorization requests according to any number of protocols, standards and data formats. Establishing the session 401 may comprise submitting, via a user device, user access credentials (e.g., username and password, biometric data, or any other authentication factor) to the platform and/or system on which the multi-IdP engine is operating, and authenticating, by the multi-IdP engine, the user based on the submitted access credentials.

Once the user's access credentials are authenticated (e.g., by an authentication server of the multi-IdP engine), the user, via the user device, may initiate the exemplary multi-step workflow journey 403 (hereafter, the "LaaS workflow journey"). In some embodiments, the LaaS workflow journey may be initiated by launching, via the user device, a LaaS software application embodied on a platform and/or system. In other embodiments, successfully logging in to the platform on which the multi-IdP engine resides may automatically launch the LaaS software application.

Notably, if the user attempts to initiate the LaaS workflow journey without having first established a session with the multi-IdP engine (i.e., perform step 403 prior to step 401), the platform on which the IdP engine is operating may redirect the user back to step 401 for authentication, after which the user may continue onto step 403 to initiate the LaaS workflow journey.

Next, at step 405, one or more calls for access to one or more resources (e.g., software applications, systems, networks, routes, services, micro-services, APIs, etc.) associated with each workflow step of the LaaS workflow journey (e.g., Originate, Underwrite, etc.) may be made by the LaaS software application at its appropriate time. These software applications, systems, networks, etc. may be native to the platform and system (e.g., internal), or they may be external to and/or accessed by the platform and/or system.

Before access to each of the software applications, systems, networks, routes, services, micro-services, APIs, etc. associated with workflow step is granted, however, each such software application, system, network, route, service, micro-service, etc. may respond to its respective call with an authentication/authorization request 407.

At step 409, the authentication/authorization request(s) are received and processed by the multi-IdP engine. This may include, for example, parsing each such request 409a to identify and extract information therefrom to determine the particular protocol (e.g., OAuth1.0, OAuth2.0), standard and/or format utilized by the requesting application, system, etc., and based on these determinations, building responses 409b to such requests according to the appropriate data format and/or standard (e.g., SAML, JWT, etc.).

In some embodiments, where the multi-IdP engine requires the requesting software application, system, network, route, service, micro-service, resource (e.g., API), etc. to authenticate before responding with the authentication/authorization token(s) (e.g., mutual authentication), step 409 may further involve validating each requesting entity's authentication certificate(s) based on information extracted (via step 409a) from their respective authentication/authorization request(s) before commencing to build responses at step 409b.

Building responses 409b to authentication/authorization requests may further include retrieving the user's access credentials (e.g., from an authentication server of the multi-IdP engine) to authenticate the user. In some embodiments, the access credentials may be provided in the form of identity token(s) and/or assertion(s), depending on the standard, protocol and/or format determined for the response. The identity token(s) and/or assertion(s) may then be used, as part of step 409b, to generate (e.g., via a generation module of the multi-IdP engine) access and/or authorization token(s) according to the user's authorization level. The access and/or authorization token(s) may be time bound, and, if the token(s) expire (e.g., during execution of an authorized application, system, resource, etc.), they may be regenerated (e.g., by a refresh module of the multi-IdP engine) at any point in the LaaS workflow journey, if needed. Optionally, building responses 409b may also include generating and providing token signatures (e.g., by a signature module of the multi-IdP engine) that include, for example, grant types, roles, etc., as well as public and private keys, as part of the access and/or authorization token(s). If token signatures are generated and provided, the signatures and expirations of the access and/or authorization token(s) may be validated (e.g., by a validator class engine of the multi-IdP engine).

Upon completing building responses 409b to the authentication/authorization request(s) according to the appropriate protocol, standard and/or format, the multi-IdP engine may, at step 411, provide the responses comprising the access and/or authorization token(s) to the requesting software application, system, network, route, service, micro-service, resource (e.g., API), etc. If, for example, the requesting entity comprises one or more internal and/or external systems, each of which relies on a respective authentication and/or authorization protocol (e.g., OAuth1.0, OAuth2.0), the multi-IdP engine may respond 411 with SAML token(s) and/or JWT token(s), as appropriate for the particular requesting system. In another example, if the requesting entity comprises one or more internal and/or external systems requiring multiple credentials for access, each of which relies on a respective authentication and/or authorization protocol (e.g., OAuth1.0, OAuth2.0), the multi-IdP engine may respond 411 with mutual authentication/authorization SAML token(s) and/or mutual authentication/authorization JWT token(s) (with grant), as appropriate for the particular requesting system. Similarly, if the requesting entities comprise one or more internal APIs, each of which relies on a respective authentication and/or authorization protocol (e.g., OAuth1.0, OAuth2.0), the multi-IdP engine may respond 411 with mutual authentication/authorization SAML token(s) and/or mutual authentication/authorization JWT token(s) (with grant), as appropriate for the particular requesting API.

Next, at step 413, the responses (from 409b) may be verified by the requesting software application, system, network, route, service, micro-service, resource (e.g., API), etc., after which access to the same is granted 415.

The steps of this method 400 may be repeated for each authentication and/or authorization request, and once all authentication and authorization requests associated with all workflow steps have been received, processed and responded to, the LaaS workflow journey may be completed and the authentication and authorization method may end.

1. Dynamic User Interface (UI) Framework.

The dynamic UI framework of the present disclosure may be configured for operating in an integrated and polyglot micro-services architecture to generate custom web pages for any number and complexity of multi-step workflow journeys. Among other advantages, the dynamic UI framework described herein can quickly and efficiently scale to any number of web pages, and can provide consistent web page experiences across any number and/or complexity of multi-step workflow journeys (e.g., relating to products, sub-products, services, etc.) for any number of users or user personas across any number and type of user devices. As described further below, the dynamic UI framework can be implemented across one or more data processing devices such as servers, computers, user devices, etc., and may include multiple engines comprising a configuration engine, a dynamic forms engine, and an aggregator engine. In at least some embodiments, each of the configuration engine, dynamic forms engine, and aggregator engine comprises computer-readable instructions that, when executed by one or more processors of one or more of the data processing devices, cause the one or more processors of the data processing devices to perform any of the functions described below.

The configuration engine may be configured to capture, store, maintain and/or update configuration and properties data that may be used to build any number of customized web pages. This data may include, for example, universal resource locator (URL) data, web page layout data, data structure information, etc., for any number of device types (e.g., web devices, mobile devices, tablet devices, laptop devices, etc.), web browsers, operating systems, and device configurations. In this manner, the configuration engine is able to maintain and centrally manage all of the configuration and property 'building blocks' that can then be used for building custom web pages, such as user-specific web pages, in real-time (e.g., on the fly). For example, the configuration engine may generate and output universal object(s) (e.g., JSON objects) that characterize one or more web pages, where the universal objects have universal compatibility and usability across one or more suitable programming languages.

The dynamic forms engine may receive the universal objects from the configuration engine and, based on the received universal objects, may render, test, and publish one or more web pages for use by one or more specific user devices or types of user devices. For example, a web page may be generated for a specific device type running a particular operating system and that executes a specific browser to access the web page. Further, and based on the universal objects and generated web page(s), the aggregator engine may generate web page metadata for the generated web page(s) for rapid integration with backend software and/or hardware components such as API's, databases, and scripts, among other backend components. This may include, for example, providing information and instructions to be carried out by backend components of the system, such as API's, databases, and scripts.

Based on the foregoing and other features, the dynamic UI framework of the present disclosure is able to generate web pages in a mere fraction of the time that is required by conventional approaches (e.g., minutes as opposed to days). In addition, the web pages generated by the dynamic UI framework described herein may provide consistent user interfaces and experiences across any number of user personas, products, services, workflows, journeys, different types of devices and/or browsers and operating systems, while also being backwards compatible and scalable. Further still, the dynamic UI framework may be configured to build web pages in batch and/or in real time.

The dynamic UI framework may also allow for high manageability of the configurations that drive consistent user experiences, and high horizontal (e.g., across wide and complex journeys with numerous webpage sequencing) and vertical (e.g., an amount of information to be displayed on the web page) scalability and flexibility, among other benefits and advantages. The dynamic UI framework of the present disclosure is flexible insofar as it may be implemented in connection with any industry and/or with online platform that itself provides different types of complex multi-step workflows and/or that involve multiple types of users. For example, the dynamic UI framework may be configured to build customized web pages for both internal users (e.g., platform-side users or colleagues) and external users (e.g., customers, clients, etc.), simultaneously, that are a part of one or more of the same multi-step workflows (e.g., lending process, medical records transfer, biometric data verification/authentication, etc.).

Figure 5:
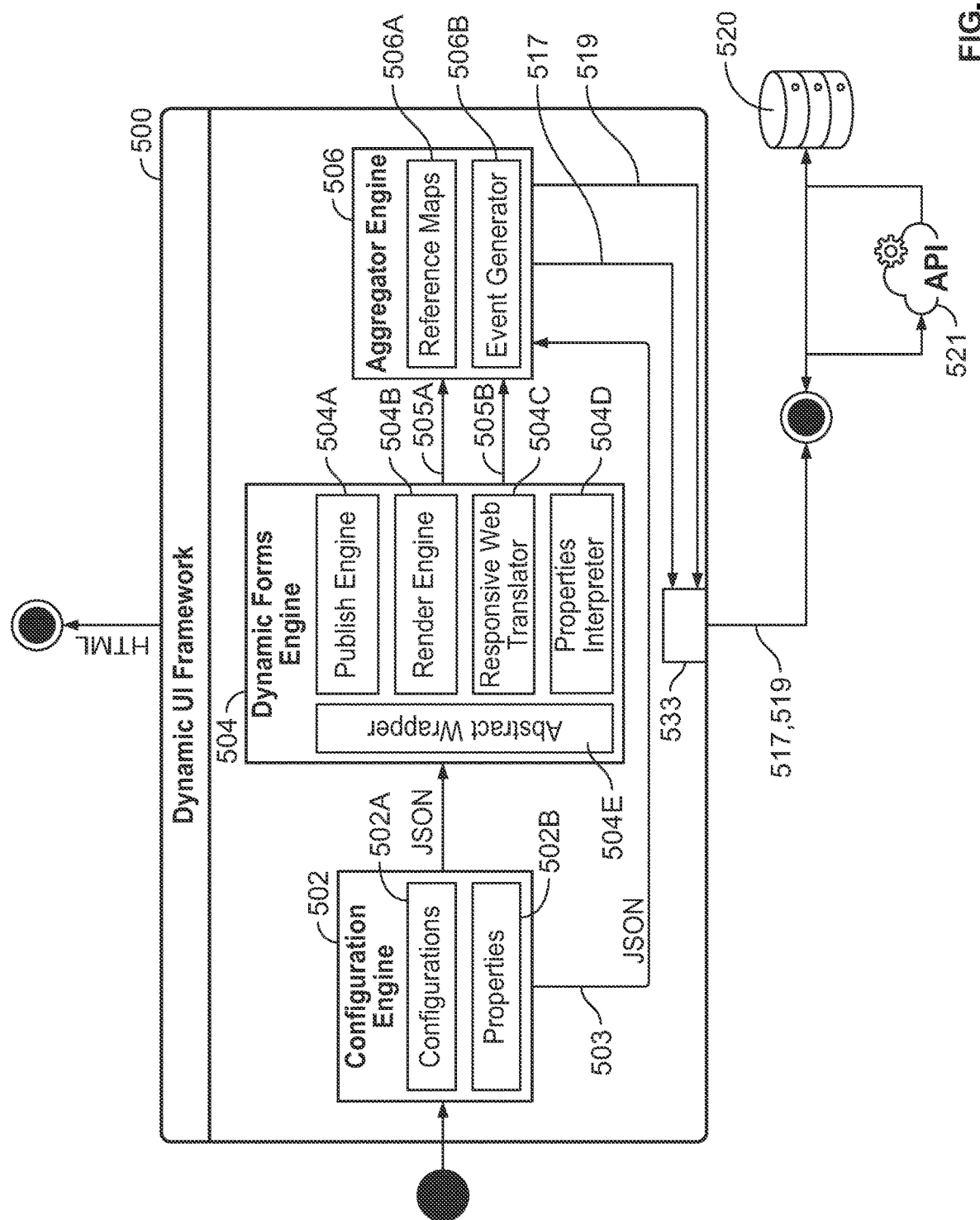
FIG. 5 is an exemplary dynamic user-interface (UI) framework according to the present disclosure.

Turning to FIG. 5, an exemplary dynamic UI framework 500 configured for dynamically generating custom web pages for workflows, according to this disclosure, is shown. The dynamic UI framework 500 may be configured for use with any type and number of workflows, including complex, real-time workflows. In this example, dynamic UI framework 500 includes a configuration engine 502, a dynamic forms engine 504, and an aggregator engine 506. Each of the configuration engine 502, dynamic forms engine 504, and aggregator engine 506 may include instructions to be executed by one or more processors of the dynamic UI framework 500. For instance, one or more servers of the dynamic UI framework 500 may execute the instructions of the configuration engine 502, dynamic forms engine 504, and aggregator engine 506 to implement any of the corresponding functions described herein. Moreover, the configuration engine 502, dynamic forms engine 504, and aggregator engine 506 may be reused and configured for rapid development, such as UI/UX development.

Configuration engine 502 may be configured to capture, store, maintain and/or update configurations data 502A and properties data 502B that may be utilized to build any number of customized web pages. For instance, the configurations data 502A and properties data 502B may be maintained within a data repository, such as within a memory device (e.g., RAM, ROM, hard drive, etc.) of the dynamic UI framework 500 or a cloud-based storage device (not shown in FIG. 5). The configurations data 502A may include, for a corresponding web page, universal resource locator (URL) data, web page layout data, and data structure information, for example. The properties data 502B may characterize device types, web browsers, operating systems for any number of devices, among other exemplary property data, for example. For example, during one or more workflow steps of a particular workflow (e.g., Originate, Underwrite, Process, etc. of a unified lending workflow journey), and in response to user input and/or one or more user interactions on a current web page (e.g., via a current web browser on a current user device having a current display configuration), the configuration engine 502 may identify and select a combination of configurations data 502A and properties data 502B for use in automatically building a subsequent user-specific web page. To do this, the configuration engine 502 may utilize data and information provided by the current web browser (and/or previously captured from prior interactions), such as device type, operating system, etc. In this manner, the configuration engine 502 maintains and centrally manages all of the configuration and property 'building blocks' that may ultimately be used for building custom web pages in real time.

Further, the configuration engine 502 may select and use configurations data 502A and properties data 502B to generate and output universal objects characterizing a corresponding web page, based on characteristics, attributes and/or specifications the particular user device, web browser, etc. for which the corresponding web page is being generated. The universal objects may have universal compatibility/usability across any programming language (e.g., Angular, React, Vue, Python, .Net, etc.). In some examples, the universal objects may be generated using JSON (Javascript object notation) or any other standard text-based format for representing structured data. As illustrated, the configuration engine 502 in this example generates JSON objects 503, which are provided to both the dynamic forms engine 504 and the aggregator engine 506. The JSON objects 503 may be in standard text-based format, for example.

The dynamic forms engine 504 may include one or more modules (e.g., modules of executable instructions) including a publish engine 504A, a render engine 504B, a responsive web translator 504C, a properties interpreter 504D, and an abstract wrapper 504E. In operation, upon receiving the JSON objects 503 from the configuration engine 502, the abstract wrapper 504E may be configured to generate translated objects based on the received JSON objects 503. For instance, the abstract wrapper 504E may translate the JSON objects 503 from a standard text-based format to an XML (extensible markup language) format, or to another suitable simple text-based format for representing structured information, to generate the translated objects.

Once translated, the abstract wrapper 504E may provide the translated objects to the properties interpreter 504D, which may be configured to interpret (e.g., based on device type, browser type, resolution, screen size, etc.) the properties data 502B and the configuration data 502A selected and provided by the configuration engine 502. Further, the abstract wrapper 504E may provide the interpreted properties data 502B and the configurations data 502A to the responsive web translator 504C. The responsive web translator 504C may be configured to render, based on the interpreted configurations data 502A and properties data 502B, a subsequent web page for the user's particular device (e.g., desktop computer, mobile device, tablet computer, etc.), web browser, and in some examples, operating system. For example, the configurations data 502A may include web page layout data, forms data, fields data, and sequencing data for use in addressing "what to render," whereas the properties data 502B may include data defining a device type, a web browser type and version, and an operating system for the device, for instance, (e.g., for forward and backward rendering compatibility) for use in addressing "how to render" the subsequent web page. As such, the responsive web translator 504C may render the subsequent web page using information provided by the configurations data 502A identifying "what to render" based on the information provided by the properties data 502B specifying "how to render" the subsequent web page.

Further, the render engine 504B may receive the subsequent web page from the responsive web translator 504C, and may test the subsequent web page. Such testing may involve, among other things, testing a compatibility of a type of page block for a web browser/device type combination, testing navigation to the subsequent web page (while keeping configurations intact from prior web page), etc. Once tested, the publish engine 504A may receive the tested web page from the render engine 504B, and may publish the subsequent web page. In this regard, the publish engine 504A may generate tags coded in any suitable programming language for structuring the tested web page and its contents. In this example, publish engine 504A generates HTML (HyperText Markup Language) tags 505A to build and/or integrate the tested web page with any programming language. The publish engine 504A may also generate objects in any standard text-based format for representing structured data, such as JSON objects 505B, which may include data to integrate the tested web page into a backend component such as an API and/or database, for example.

The aggregator engine 506 may receive the HTML tags 505A and the JSON objects 505B from the dynamic forms engine 504, and generate web page metadata for rapid integration with the backend components (API's, databases, scripts, etc.). For instance, the web page metadata may include information and instructions to be carried out by the backend components of the system to support a web page for a workflow journey. In this example, the aggregator engine 506 includes a reference maps module 506A and an event generator 506B. The reference maps module 506A may include a data repository (e.g., local or cloud-based memory device) that stores reference maps and/or index maps that include instructions that identify when to invoke certain functions, such as when to group and/or cluster web page forms together, among other examples. For example, an index map may define when to invoke a particular function, while a reference map may provide a reference between the particular function and an HTML tag, for example. Further, and based on the reference maps and/or index maps of the reference maps module 506A, the event generator 506B may generate metadata 517 characterizing a sequence of events for a workflow journey, such as an order of webpages for the workflow journey indicating when to go from one webpage to another. The metadata 517 may be used by the backend system components to support the web pages for various workflow journeys.

In some examples, the metadata 517 may be provided in the form of objects, in any suitable standard text-based format, such as JSON objects, so as to enable use and integration with any existing programming language. In some embodiments, the functions of the aggregator engine 506 may occur in a runtime environment (e.g., Node.js).

Further, the dynamic UI framework 500 may output the tested web page 519 (e.g., a user-specific subsequent web page configured for a user-specific device executing one or more of a particular web browser, operating system, etc.) and the corresponding metadata 517 for rapid integration with the backend components 521 (e.g., API's, database, etc.). For example, the dynamic UI framework 500 may transmit, via a transceiver 533, to data repository 520. In some instances, the dynamic UI framework 500 may store the tested web page 519 together with the web page metadata 517 in a data repository, such as data repository 520 (e.g., a local or cloud-based memory storage device). As illustrated, the tested web page 519 and the metadata 517 may be provided in the form of objects in any suitable standard text-based format, such JSON objects, to the backend components 521 and/or data repository 520 for rapid integration.

As noted above, the dynamic UI framework 500 may be used in any industry, in connection with an online platform that itself provides access to complex multi-step workflows. Some of the complex multi-step workflows may require simultaneous or sequenced access to customized webpages by multiple users and/or multiple types of users (e.g., internal users such as platform-side users or colleagues and/or external users such as customers, clients, etc). In such an instance, the multiple users having multiple user types may be operating different device types. (e.g., desktop computer, tablet computer, mobile device, etc.), having different types of browsers (e.g., Chrome™, Safari™, Edge™, etc.) and/or operating systems. The dynamic UI framework 500 of this disclosure is able to build all needed web pages configured for each users' particular device, browser, and/or operating system, thereby enabling the one or more users to progress seamlessly through the particular workflow journey.

Further still, the dynamic UI framework 500 may be configured to build web pages in batch and/or in real time. Additionally, as new or additional devices, web browsers, products, sub-products, and/or personas become available and/or applicable, the dynamic UI framework 500 may quickly be configured to generate compatible web pages by updating one or more of its components (e.g., configuration engine 502, dynamic forms engine 504, and/or aggregator engine 506). For instance, the configurations data 505A and/or properties data 505B of the reference and/or index maps may be updated to reflect new devices, new browsers, and/or new configurations of such devices and/or browsers. As will be appreciated, the dynamic UI framework 500 represents a quantum leap in this field. Indeed, conventional systems require the building of completely new sets of web pages for each new device, browser, operating system, product, etc.

Figure 6A:
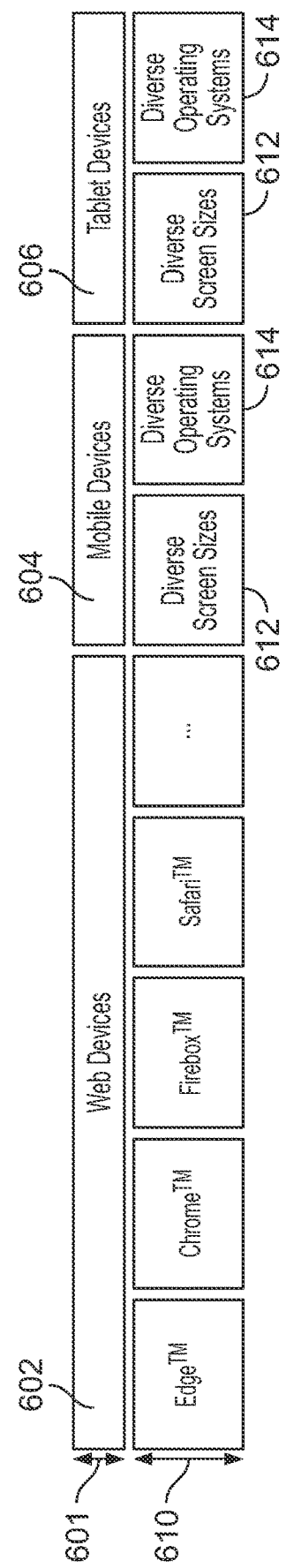
FIG. 6A is a diagram illustrating various exemplary types of devices and attributes for which a dynamic UI framework according to the present disclosure may generate custom web pages.

Turning now to FIG. 6A, various exemplary types of devices utilizing varied exemplary web browsers and having varied screen sizes and other varying attributes are shown to illustrate the range of device and attribute permutations for which the dynamic UI framework described herein (e.g., see FIG. 5, dynamic UI framework 500) is able to dynamically generate custom web pages. Indeed, although only a few variations are shown, it should be understood that dynamic UI framework described herein is able to accommodate any device-attribute combination. For instance, as illustrated, a rendering device 601 (e.g., user device) may include, among others, web devices 602 (e.g., computers), mobile devices 604 (e.g., smart phone), and tablet devices 606. Further, each of the web devices 602, mobile devices 604, and tablet devices 606 may execute one or more available web browsers 610 to access web pages, wherein the web browsers may include any among (without limit) an Edge™, Chrome™, Firebox™, and/or Safari™ web browser. In addition, each of the web devices 602, mobile devices 604, and tablet devices 606 may have a corresponding screen size 612 and operating system 614 specific to it. The dynamic UI framework described herein may build web pages for any quantity and combination of devices (e.g., web devices 602, mobile devices 604, and tablet devices 606) utilizing any web browser(s) (e.g., web browser(s) 610) and having any combination of attributes (e.g., screen size 612, operating system 614, etc.) for navigating through any and all aspects of any workflow journey(s).

Figure 6B:
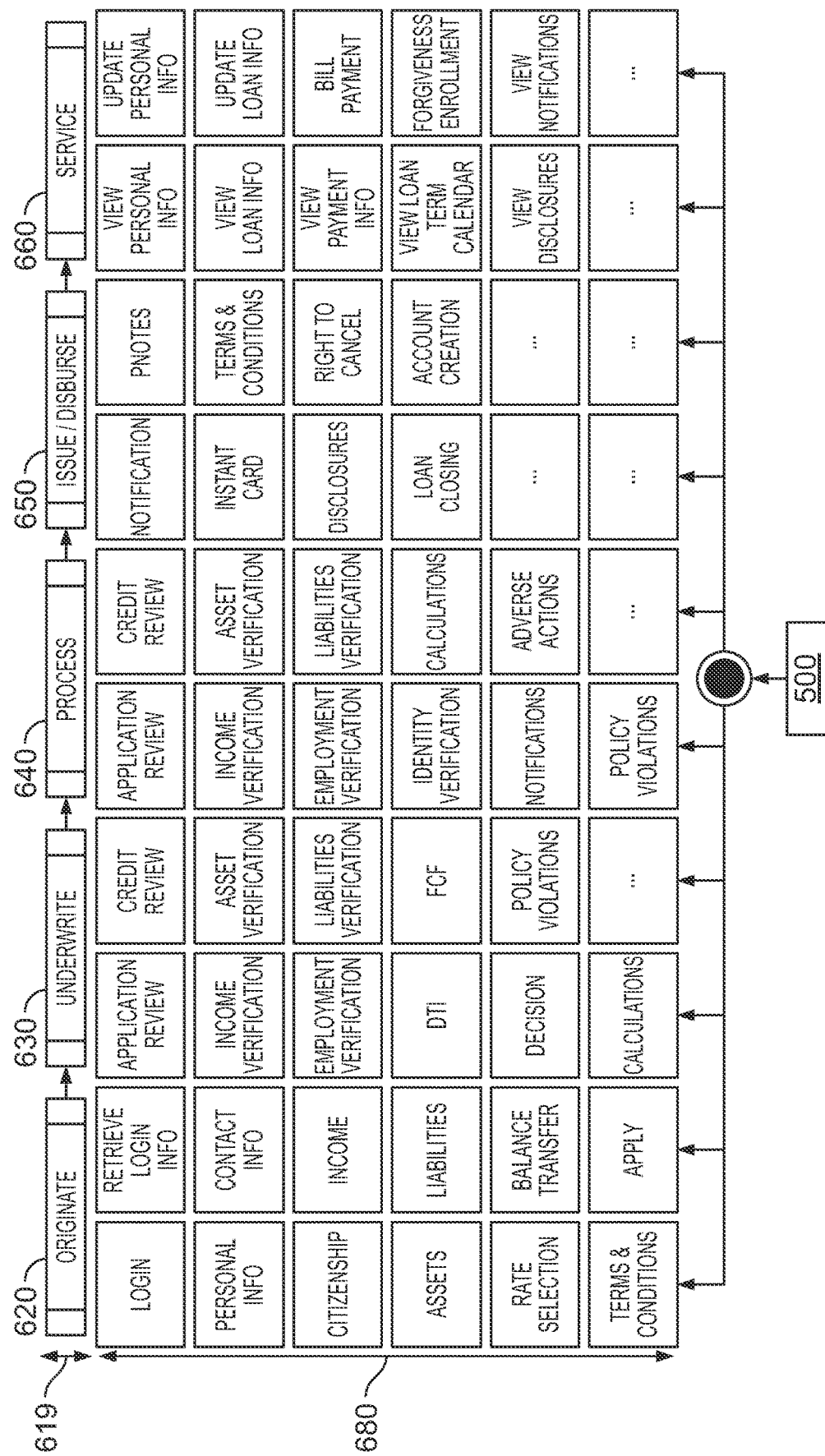
FIG. 6B is a diagram illustrating an exemplary workflow journey according to the present disclosure.

FIG. 6B illustrates an exemplary workflow journey (e.g., a unified lending journey) 619 having workflow steps that include Originate 620, Underwrite 630, Process 640, Issue/Disburse 650, and Service 660, each of which may comprise one or more sub-journeys 680. For example, workflow step Originate 620 may include sub-journeys such as LOGIN, PERSONAL INFO, etc. For each aspect of the unified lending journey 619, its workflow steps 620-660 and/or any of the sub-journeys 680, the dynamic UI framework 500 may dynamically generate all webpages, as needed, to navigate there through.

Moreover, as discussed above, each webpage may be specifically configured for each particular user device as it navigates through the unified lending journey 619, workflow step(s) 620-660 and/or the corresponding sub-journey(s) 680. This includes, for example, the use of multiple devices within a particular workflow step 620-660 and/or sub-journey 680. Thus, a first device having a first combination of attributes may be used to commence a particular sub-journey 680 (e.g., PERSONAL INFO), and prior to completing that sub-journey 680, a second device having a different combination of attributes may be used to complete that same sub-journey 680. In such a scenario, the dynamic UI framework 500 may generate only the web pages needed for each device in accordance with each device's attribute, thereby optimizing efficiency, usability, flexibility and overall user experience.

Referring again to FIG. 6A, a user device may include (among others) a web device 602, mobile device 604, tablet device 606, etc., each comprising one or more corresponding browsers 610, operating systems 614, screen sizes 612, etc. Thus, in addition to generating webpages specific to any permutation of device/attribute combination, the dynamic UI framework 500 may be configured to retrieve, capture and/or generate metadata to indicate how and when to proceed from one webpage to another. For instance, the metadata may identify a "flow" within and between various sub-journeys 680 and/or workflow steps 620-660 for each workflow journey (e.g., unified lending journey 619), and in response, generate webpages according to that 'flow.'

As an example, for the Originate 620 workflow step, the dynamic UI framework 500 of this disclosure may generate a plurality of sub-journey webpages (each corresponding to a sub-journey of the Originate 620 workflow step) that may include a login webpage, a personal information webpage, a citizenship webpage, an assets webpage, a rate selection webpage, a terms and conditions webpage, a retrieve login information webpage, a contact information webpage, an income webpage, a liabilities webpage, a balance transfer webpage, and an apply webpage. Similarly, for the Underwrite 630 workflow step, the dynamic UI framework 500 may generate sub-journey webpages particular to this workflow step 630, including an application review webpage, an income verification webpage, an employment verification webpage, a DTI webpage, a decision webpage, a calculations webpage, a credit review webpage, an asset verification webpage, a liabilities verification webpage, an FCF webpage, and a policy violations webpage. The Process 640 may workflow step include sub-journeys requiring custom webpages that include an application review webpage, an income verification webpage, an employment verification webpage, an identity verification webpage, a notifications webpage, a policy violations webpage, a credit review webpage, an asset verification webpage, a liabilities verification webpage, a calculations webpage, and an adverse actions webpage. Further, the Issue/Disburse 650 workflow step may include sub-journeys 680 requiring custom webpages such as a notification webpage, an instant card webpage, a disclosures webpage, a loan closing webpage, a pnotes webpage, a terms and conditions webpage, a right to cancel webpage, and an account creation webpage. And the Service 660 workflow step may require the following webpages: a view personal information webpage, a view loan information webpage, a view payment information webpage, a view loan term calendar webpage, a view disclosures webpage, an updated personal information webpage, an update loan information webpage, a bill payment webpage, a forgiveness enrollment webpage, and a view notifications webpage.

When proceeding through any of the workflow steps 620-660 and/or any of their respective sub-journeys 680, the dynamic UI framework 500 may be configured to generate and/or display all needed webpages, in their proper sequence, customized for each particular device 602, 604, 606, utilizing a respective web browser 610, having a respective screen size 612 and operating via a respective operating system 614. For instance, assuming that a device, such as a particular mobile device 604 attempts to proceed through one or more workflow steps (e.g., Originate 620, Underwrite 630, Process 640, Issue/Disburse 650, and/or Service 660) of the exemplary unified lending journey 619, the dynamic UI framework 500 may dynamically generate (and display) all webpages needed for that particular mobile device 604 to traverse each sub-journey 680 of each workflow step 620-660. As discussed above, each such needed webpage may be configured to the specifications and requirements of the particular mobile device 604, including the web browser 610, operating system 614, and/or screen size 612 of the particular mobile device 604.

In some instances, the dynamic UI framework 500 may be further configured to determine whether one or more sub-journey 680 webpages has previously been generated for the type of device 602, 604, 606, browser 610, operating system 614, and/or screen size 612, and if available, may provide the previously generated sub-journey 680 webpages for access by the device 602, 604, 606. Otherwise, if one or more needed webpages is not available, the dynamic UI framework 500 may automatically generate, on the fly, the needed sub-journey 680 webpage(s), as described herein.

Figure 7:
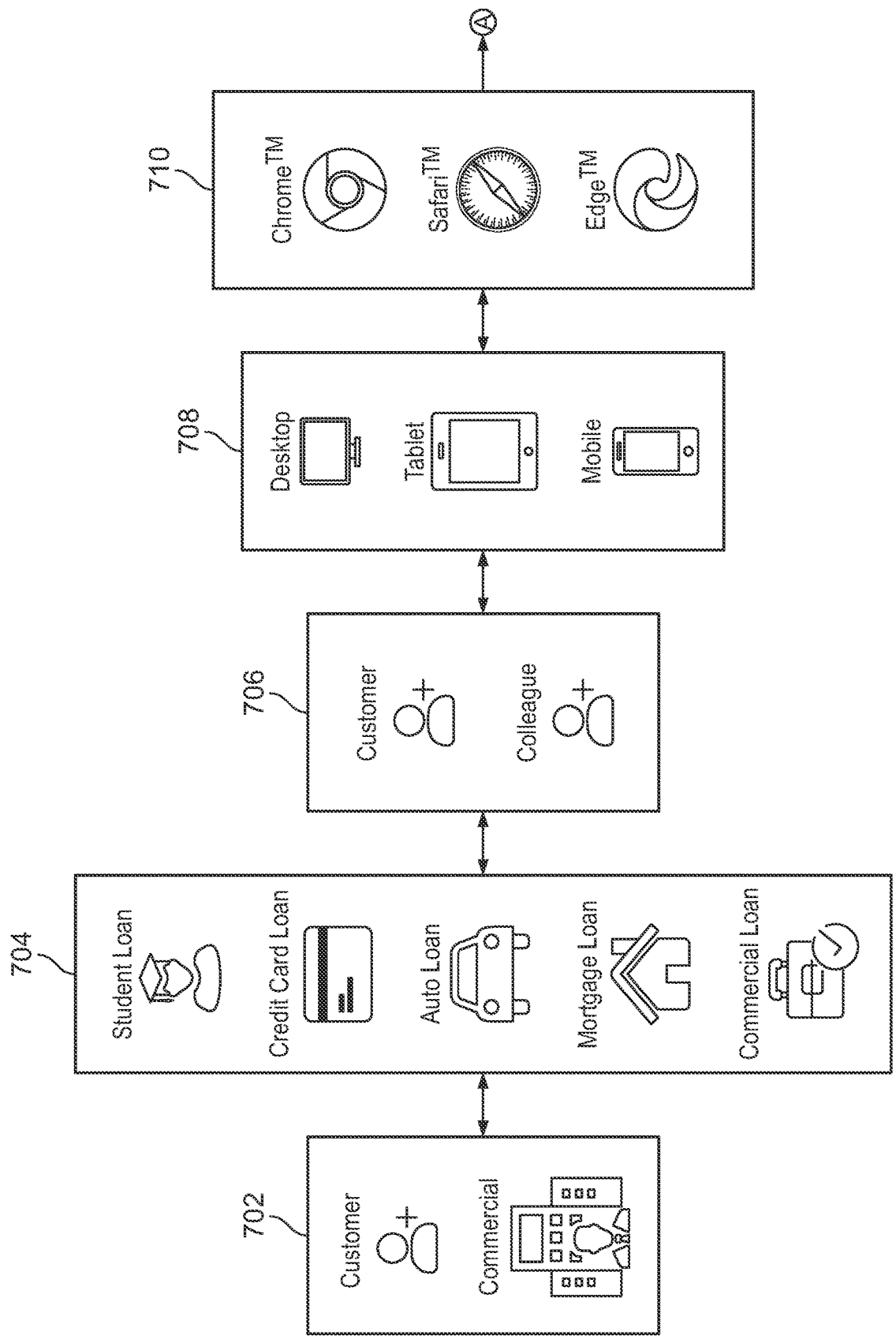
FIG. 7 is a diagram illustrating an array of customized webpages that a dynamic UI framework according to the present disclosure may generate, sequence and deploy according to entity type, product type, user type, device type and web browser type.
Figure 7:
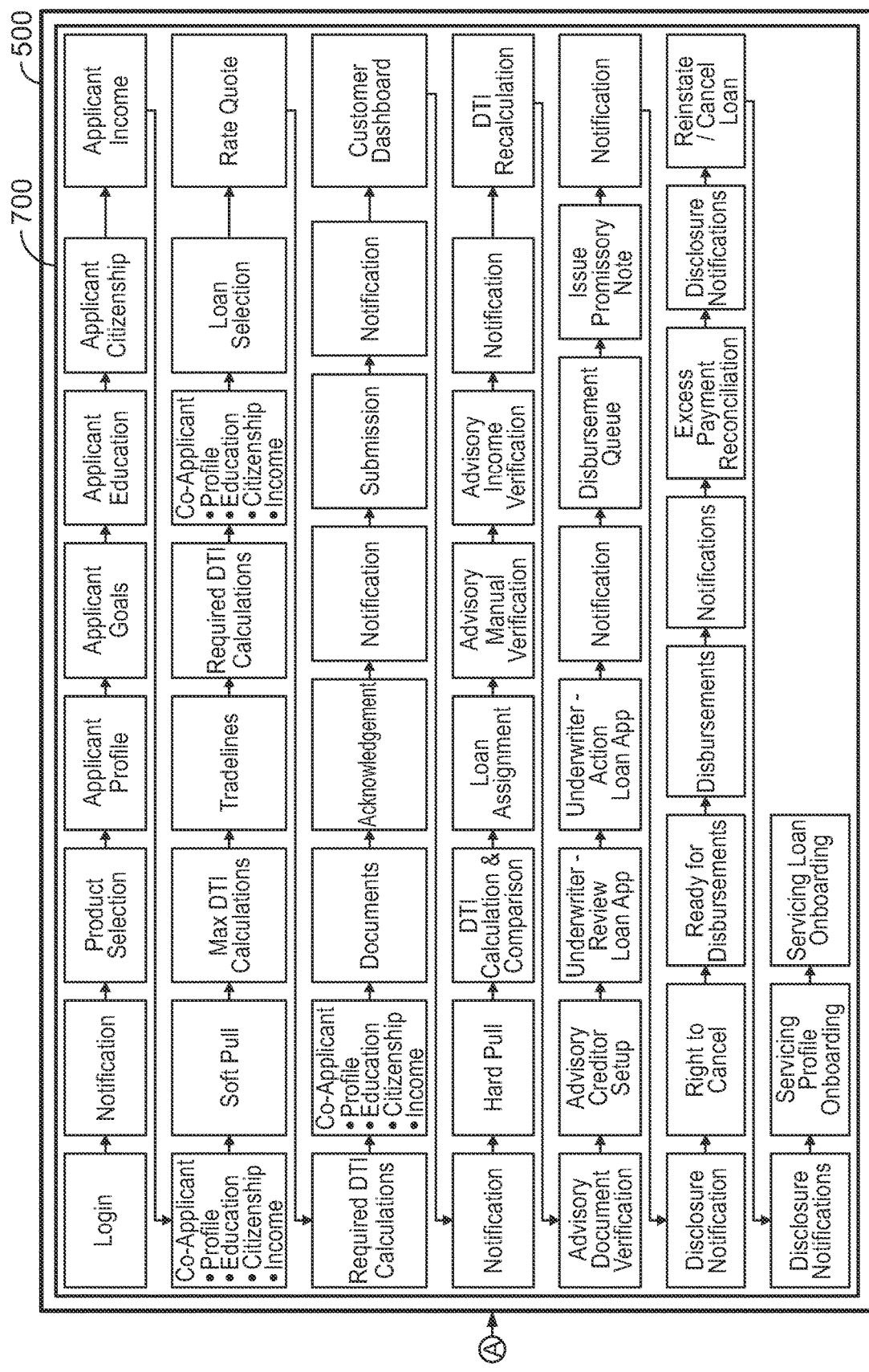

Turning now to FIG. 7, a further illustration of how the dynamic UI framework of the present disclosure (e.g., UI framework 500 of FIG. 5) may generate, sequence and deploy a series of customized webpages 700 for navigating through any number and complexity of workflow journeys, including an exemplary unified lending journey. The sequence of customized webpages 700 shown in FIG. 7 is only illustrative, as the true number of customized webpages needed for certain workflows may number in the thousands, tens of thousands, hundreds of thousands, or more.

Returning now to FIG. 7, one or more entities 702 (e.g., customers, commercial entities, etc.) desiring any number of products 704 (e.g., student loan, credit card, auto loan, mortgage, commercial loan, etc.) may access an online platform, such as one supporting the dynamic UI framework described herein (see, e.g., FIG. 5, dynamic UI framework 500), to initiate one or more lending workflow journey(s) corresponding to one or more of the products 704. Depending on the particular product(s) 704, the corresponding workflow(s) may involve multiple users 706, such as one or more external user(s) (e.g., customer) and/or one or more internal user(s) (e.g., platform-side colleague(s)). In some embodiments, users 706 may initiate multiple workflow journeys simultaneously, one each for multiple products 704.

Each user 706 may access the online platform using any type of device 708 (e.g., desktop computer, tablet computer, mobile device, etc.), and using any type of web browser 710 (e.g., Chrome™, Safari™, Edge™, etc.). As the user 706 progresses through the one or more workflow lending journeys, the dynamic UI framework 500 may build and sequence all needed webpages 700 as described above, where each webpage is configured for each user's 706 device(s) 708 and web browser(s) 710, thereby enabling the user(s) 706 to progress seamlessly through their corresponding workflow(s).

As new or additional devices 708, web browsers 710, products 704, sub-products (or services, not shown), and/or personas (not shown) become available and/or applicable, the dynamic UI framework 500 may generate compatible webpages by updating one or more of its components (e.g., configuration engine 502, dynamic forms engine 504, and/or aggregator engine 506). As such, rather than the having to build a completely new set of webpages for each workflow of a journey, for each new device, for each new product, etc., the dynamic UI framework 500 can dynamically build and provide the webpages not only for each of the workflows, but based on the type of device accessing the webpages, the browser the devices are using, and, in some examples, other criteria, such as the device's operating system and screen size.

Figure 8:
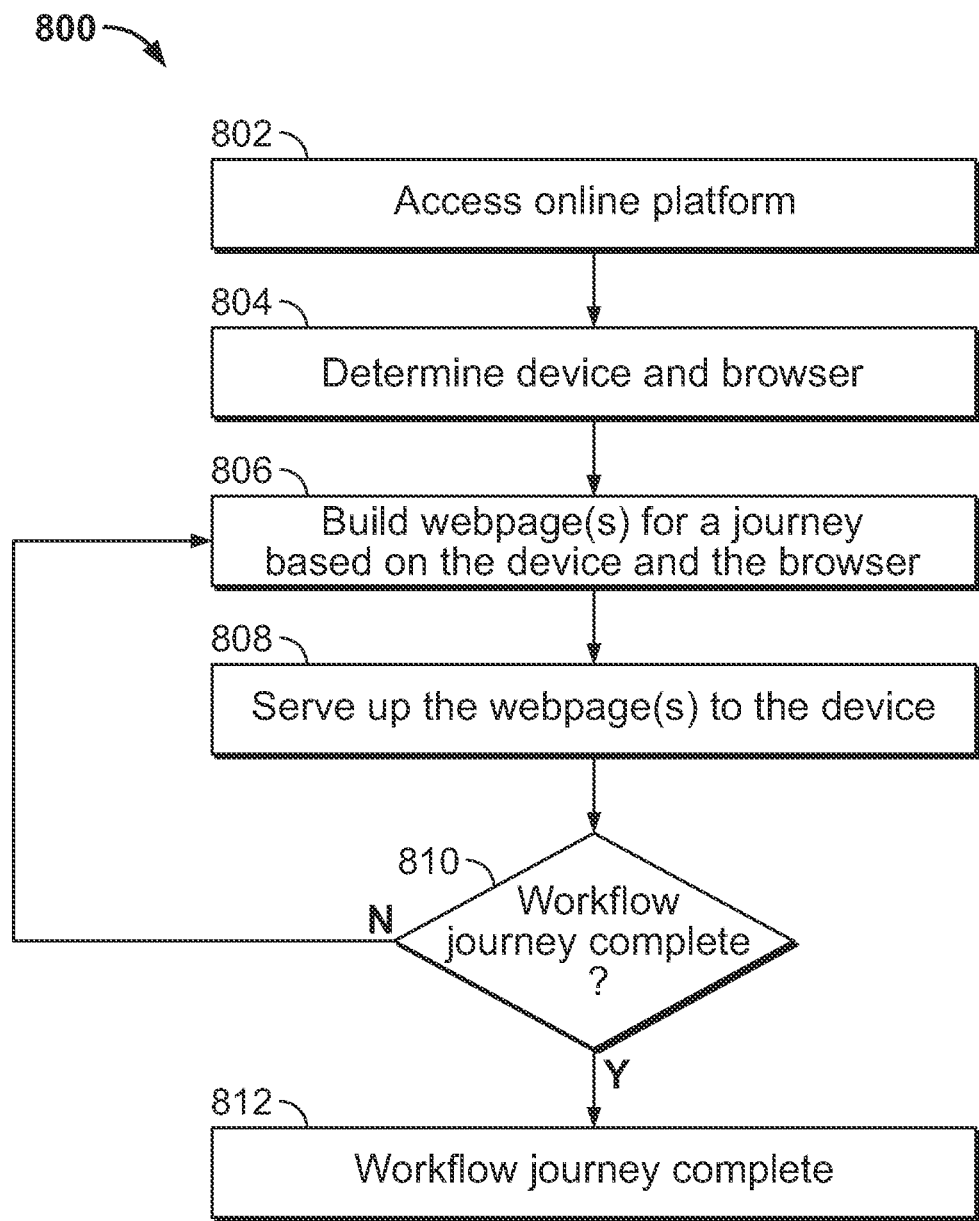
FIG. 8 is a flowchart of an exemplary electronic webpage generation method 800 according to the present disclosure.

Turning now to FIG. 8, an exemplary electronic webpage generation method 800 for providing webpages to a particular device to proceed through a multi-step workflow journey is illustrated. In this example, the multi-step workflow journey may comprise a unified lending journey that itself defines one or more electronic lending products (e.g., personal loan, credit card, etc.) and comprises any number of workflow steps (e.g., Origination, Underwriting, Processing, Issuing, Servicing, etc.), each requiring accessing any number of webpages. The dynamic UI framework 500 described herein may facilitate the electronic webpage generation method 800.

At step 802, a device (see, e.g., FIG. 6), such as a web device 602, mobile device 606, or tablet device 606 may attempt to access an online platform, such as an online platform of a banking, lending or other type of institution. The device may be operated by a user, such as an internal user (e.g., employee) or external user (e.g., customer) of the banking or lending institution, and the attempted access may comprise submitting user input (via a device GUI) to the online platform and/or another type of interaction on a current webpage associated with the online platform.

At step 804, a dynamic UI framework according to the present disclosure (see, e.g., FIG. 5, dynamic UI framework 500) may determine a type of the device (e.g., a computer, a laptop, a tablet, etc.), the web browser that the device is using to access the online platform, the size of the screen of the device, the operating system of the device and/or other configuration and/or properties information and data associated with the device. For example, the online platform may employ a user agent to detect and/or determine (e.g., based on metadata included in a transmission from the device, data already stored on the online platform, etc.), the type of device, the type of web browser used by the device, the operating system of the device, a screen size of the device and/or other configurations and/or property information pertaining to the device. Based on the detected/determined properties of the device, web browser, screen size, etc., the dynamic UI framework 500 may select a combination of configuration data (see, e.g., FIG. 5, 502A) and properties data (see, e.g., FIG. 5, 502B) for use in automatically building and/or displaying device-specific webpages. As discussed above, the configuration data 502A may include, for a corresponding web page, universal resource locator (URL) data, web page layout data, and data structure information, while the properties data 502B may characterize the device type, web browser(s), operating system of the device, among other exemplary property data, for example.

At step 806, based on the selected combination of configuration and properties data, the dynamic UI framework 500 may build and sequence each needed webpage for each step in the multi-step workflow journey, where the webpages are specifically configured for the device based, for example, on the type of the device and the type of the browser. In some instances, where one or more of the needed webpages were previously built according to the needed specifications, the dynamic UI framework 500 may not need to be re-build such webpages, but instead simply identify and make them available (e.g., from storage). Building the device-specific webpages may involve, for example, generating and outputting universal objects (e.g., JSON objects), based on the configuration data 502A and properties data 502B that characterize each of the one or more webpages. In some examples, the dynamic UI framework 500 may then translate the universal objects into a simple text-based format, such as an XML format, that may then be used to serve up and deploy the one or more webpages, as needed.

Proceeding to step 808, the online platform may serve up and deploy the one or more webpages to the device to enable the user to proceed through the workflow journey. Serving up or deploying each of the one or more webpages may include, for example, interpreting the universal objects (previously translated into a simple text-based format such as XML) to identify the properties data and configuration data selected for each of the webpage(s). This configuration and properties data may then be used to create a proper rendering (e.g., for forward and backward compatibility) of each of the one or more webpages, in its appropriate sequence, for the particular device, web browser, screen size, etc. Once each of the one or more webpages is created, the dynamic UI framework 500 may test each webpage rendering before publishing (e.g., serving up) to the device.

In some embodiments, the dynamic UI framework 500 may also generate tags coded in any suitable programming language for structuring each of the one or more webpages and its contents (e.g., HTML tabs (see, e.g., FIG. 5, 505A)).

In such examples, the dynamic UI framework 500 may also generate webpage metadata characterizing each of the corresponding webpages based on the JSON objects (see, e.g., FIG. 5, 505B) and HTML tags (see, e.g., FIG. 5, 505A). The metadata may be used by the online platform to support the workflow journey webpages. In some examples, the metadata may be provided in the form of data objects in any suitable standard text-based format, such as JSON objects, so as to enable use and integration with any programming language as may be required by the online platform.

In an illustrative example, if a user is interacting with the online platform during a workflow step (e.g., see FIG. 6, Underwrite 630) of a unified lending workflow journey, the online platform may receive input, via a user device, from a current webpage with which the user is interacting. This user input may comprise data input into one or more fields of the current webpage, as well as a transmission (e.g., "submit") command. As an example, the user device may be used to enter user data into designated fields on the current webpage, which may also include a "submit" icon that generates and transmits a request, such as an HTTP request, for an application review webpage. In response, the online platform may determine the next webpage in the user's Underwrite 630 workflow step, and build (or provide, if previously build) and serve up/deploy the next webpage via an HTTP response that characterizes the next webpage (e.g., HTTP data), where the next webpage may be configured for the particular user device. In some examples, this next webpage may comprise an application review webpage with which the user may interact by providing (via the user device) and/or verifying information related to a loan application. Once the user has completed interacting with the application review webpage, the user may provide further input (e.g., clicking a "submit" icon) indicating that the user has completed a current interaction with the webpage, after which the user device may generate and transmit a command/request for a subsequent webpage in the workflow step of the unified lending journey to be generated and deployed. This may continue until the workflow journey has been completed.

At step 810, the online platform may determine whether the workflow journey is complete. As the user proceeds through the workflow journey, the dynamic UI framework 500 builds and/or provides and deploys corresponding webpages, as needed, with which the user may interact and progress through the workflow journey. For instance, based on webpage metadata (and/or other data) of a webpage that the user has completed interacting with, the online platform may determine whether the user has reached the end of the workflow journey, or whether a next webpage is needed, and if so, which one. If, for example, the user has completed interacting with an 'income verification' webpage, the dynamic UI framework 500 may determine (e.g., based on metadata of the 'income verification' webpage or other sequencing data) that a next webpage, such as an 'employment verification' webpage, is needed. This process continues until the user completes interacting with a webpage that indicates (e.g., via metadata or other data) that a next workflow journey related webpage is not needed or available for display to the user, at which point the workflow journey ends at step 812. If, however, an additional webpage is to be provided to the user, the method proceeds back to step 806 to build the next webpage, as described above.

2. Workflow State Management Framework.

Described herein is a novel online (e.g., cloud-based) architectural framework and pattern, comprising finite state machines (FSMs), that uniquely and efficiently manage the exponential complexities of real-time states and state transitions. This unique architectural framework and pattern is specifically configured to orchestrate (e.g., manage, maintain, transition, etc.) any number of synchronous and/or asynchronous workflows, in real-time (or near real-time) in a manner that optimizes system resource usage, while minimizing system downtime, errors, and/or latency. Moreover, the architectural framework and pattern is designed to be easily scalable, thereby rendering any system or platform in which it is implemented as 'future proof' (e.g., the system or platform is configurable to adapt to future expansion in size and complexities of workflows, users, personas, etc.).

Aspects of this unique state management framework include functionality for: independent management of states, transitions, and events; parallel event execution; logically performing actions during each transition independently of each other; providing high traceability of the cause (e.g., transitions, data, events, states, etc.) and effects (e.g., outcome, new state, events, data, etc.) of micro-service requests; avoiding hard coding in any code repositories; state management of abstracts and all logic regarding states and transitions on behalf of a requestor; etc.

For purposes of this disclosure, finite state machines (FSMs) refer to proprietary mathematical models of computation used to design proprietary algorithms. FSMs describe the behavior of a system or components or subcomponents, defined in a single state at a time from a finite number of possible states. In the case of complex multi-step workflows, as a workflow progresses through its journey, it may undergo any number of concurrent and/or sequential state changes, and these state changes may be handled using FSM real-time workflows. The workflow state management framework described herein comprises highly optimized and customized FSMs to maintain, manage and transition states of workflows for concurrent and/or sequential deterministic and non-deterministic events and users for real-time task execution and journey progression.

In some aspects, workflow outcomes may be dependent on the following:
1. Input Parameters: e.g., entity data, product data and persona data, system data, etc.
2. Events: may be triggered through a variety of input parameters, system generated or user initiated, and/or synchronous, asynchronous and concurrent.
3. Workflow: a single workflow can have any number (e.g., 100's, 1000's, etc.) of steps triggered through an event or a group of events to achieve an outcome.
4. States: every step of the workflow can have numerous but finite states.
5. Transitions: the workflow steps and states can change synchronously and asynchronously.

Figure 9:
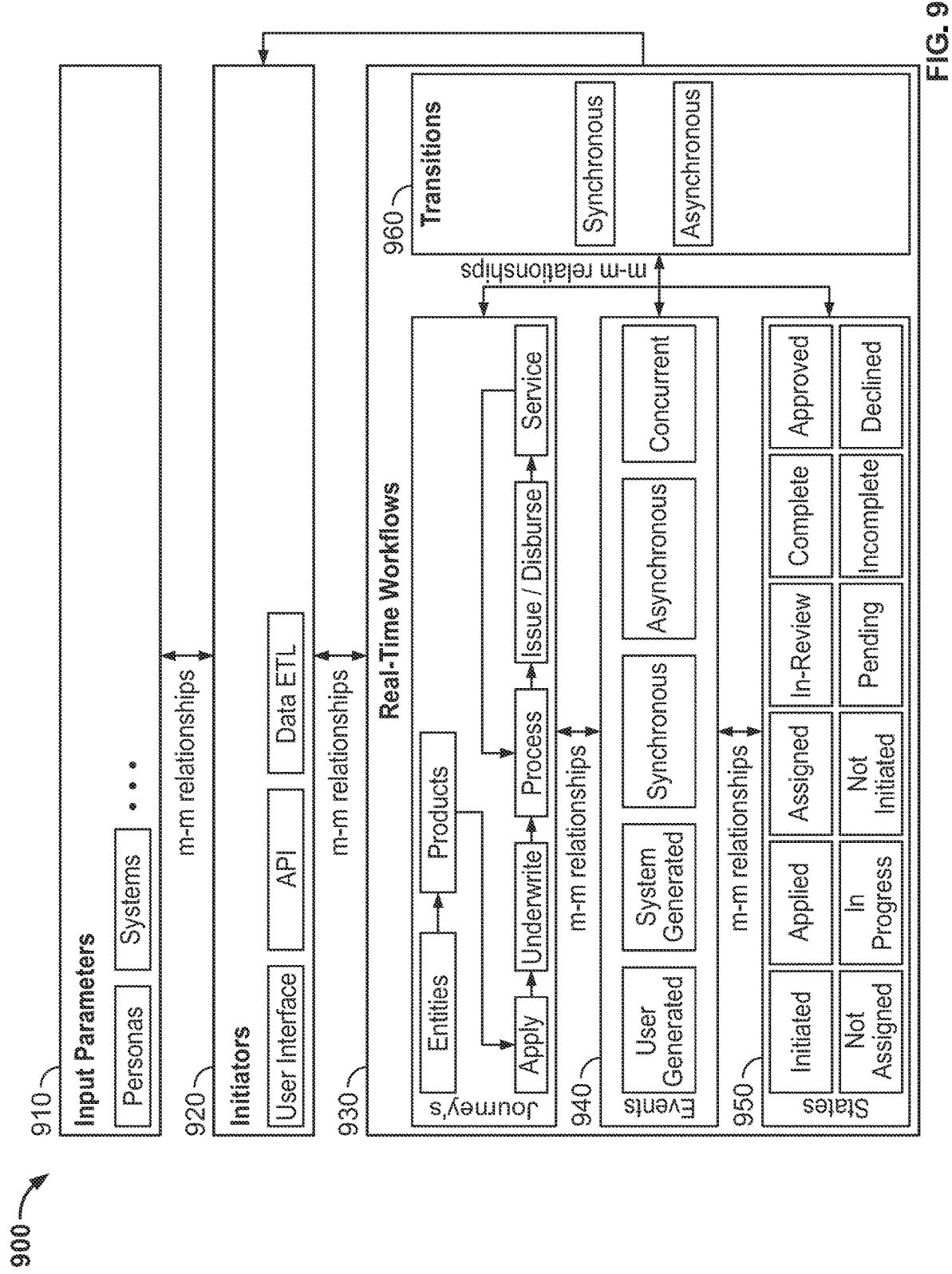
FIG. 9 is a diagram illustrating an exemplary state machine orchestration 900 of one or more real-time workflows according to the present disclosure.

Turning now to FIG. 9, a diagram showing an exemplary state machine orchestration 900 of one or more real-time workflows is shown. The exemplary state machine orchestration 900 comprises one or more computer modules embodied in one or more specialized computer devices executing computer-readable code. For illustrative purposes, the complex real-time workflow 930 depicted in FIG. 9 pertains to a complex real-time lending product (e.g., a unified lending journey), such as a commercial real estate loan, a student loan, a credit card application, a mortgage, a home equity line of credit, a personal loan, a bilateral loan, a syndicated loan a working capital loan, etc. It should be noted, however, that the state management framework (e.g., see FIG. 10) and corresponding state machine orchestration technology described herein is not limited to loan products, or even to entities and/or industries associated with loan (or other financial) products generally. To the contrary, the state management framework and corresponding technology described herein is designed to orchestrate states and state transitions associated with any type of workflow, in any industry and in any application, pertaining to any type of products or services, regardless of the number of workflow steps and/or the complexity associated therewith, including those that span computer components, computer systems, computer networks, etc.

Returning to FIG. 9, the exemplary state machine orchestration 900 shows that the input parameters 910 may comprise any number and/or type of input. As further discussed below, the input parameters 910 may trigger state changing events 940 requiring transitions 960 from one state to another. In this example, the input parameters 910 comprise persona data and system data. However, the state machine orchestration 900 may accommodate any number and/or type of additional and/or alternative input parameters 910 (e.g., network data, user data, product data, etc.).

The input parameters 910 may be received via one or more computer input devices (not shown) and/or generated from within the system or platform on which the state machine orchestration 900 is being executed. Responsive to receiving the input parameters 910, one or more initiators (or workflow initiators) 920 may trigger/initiate one or more real-time workflows 930 (e.g., unified lending journey), as well as orchestration thereof. Notably, the exemplary workflow initiators 920 shown in FIG. 9 (e.g., user interface, API, data ETL) are non-limiting, as any number of additional and/or alternative workflow initiators 930 are contemplated by the present disclosure.

As depicted, the input parameters 910 may have a many-to-many relationship with the workflow initiators 920, and the workflow initiators 920 may have a many-to-many relationship with the real-time workflows 930, meaning that any initiator component 920 may initiate any number of real-time workflows 930 responsive to any of the input parameter(s) 910.

As indicated above, the exemplary workflow 930 shown in FIG. 9 pertains to a complex real-time lending product (e.g., a unified lending journey). This particular workflow 930 comprises the following workflow steps: Entities (e.g., access to framework), Product (e.g., selection, definition, etc. of any type of lending product such as (without limit) student, auto, buy-now-pay-later, working capital, mortgage, home equity line of credit, credit card, commercial real estate, bilateral and personal loans), where the journey of the Product may itself be characterized by the workflow steps: Apply, Underwrite, Process, Issue/Disburse and Service. In this exemplary workflow 930, the Service step may initiate an additional Process step, thereby creating a loop that may be executed any number of times. Progress through the workflow steps (including any loops) 930 may be defined as the workflow's journey which, as explained above, may include accessing and/or initiating any number of system recourses and/or functions needed for progressing through the workflow.

Events 940 that may impact the workflow's 940 journey may be triggered through a variety of input parameters 910 which may be user-generated, system-generated, synchronous, asynchronous, concurrent, sequential, etc., and each of the events 940 (and/or workflow 930 steps 930) may have any number of states 950 (e.g., installed, applied, assigned, in-review, complete, approved, not initiated, not assigned, pending, incomplete, declined, etc.) to which or from which a current state must be transitioned 960.

Transitions 960 (e.g., from step to step, event to event, state to state, etc.) may be synchronous and/or asynchronous, and each of the workflow 930 journeys, events 940 and/or states 950 may have a many-to-many relationship with each other and with the transitions 960, as depicted in FIG. 9. This means that any workflow 930 journey may be impacted by any type of event 940 that involves initiating a state transition 960 from and/or to any possible state 950.

In operation, the state machine orchestration 900 of FIG. 9 may be embodied on and implemented by a real-time workflow state management framework, which itself may comprise a combination of logic and/or machine learning being executed by one or more computing devices to orchestrate all aspects of state transitions associated with workflow steps and journeys. This may include, for example, continuously defining, testing and/or improving next-best step options (e.g., within a particular workflow journey, which is the next best step to execute?), transitions, resource utilization, workflow state data, etc. (e.g., via machine learning), and using this information to define each workflow journey, allocate system resources across any number of journeys so as to optimize system performance and efficiency, identify workflow events, update workflow journeys and/or resource allocation (in real-time) as needed, continuously update the next-best step options for any given workflow journey, transition between and amongst workflow steps, events, and/or states, etc.

Figure 10:
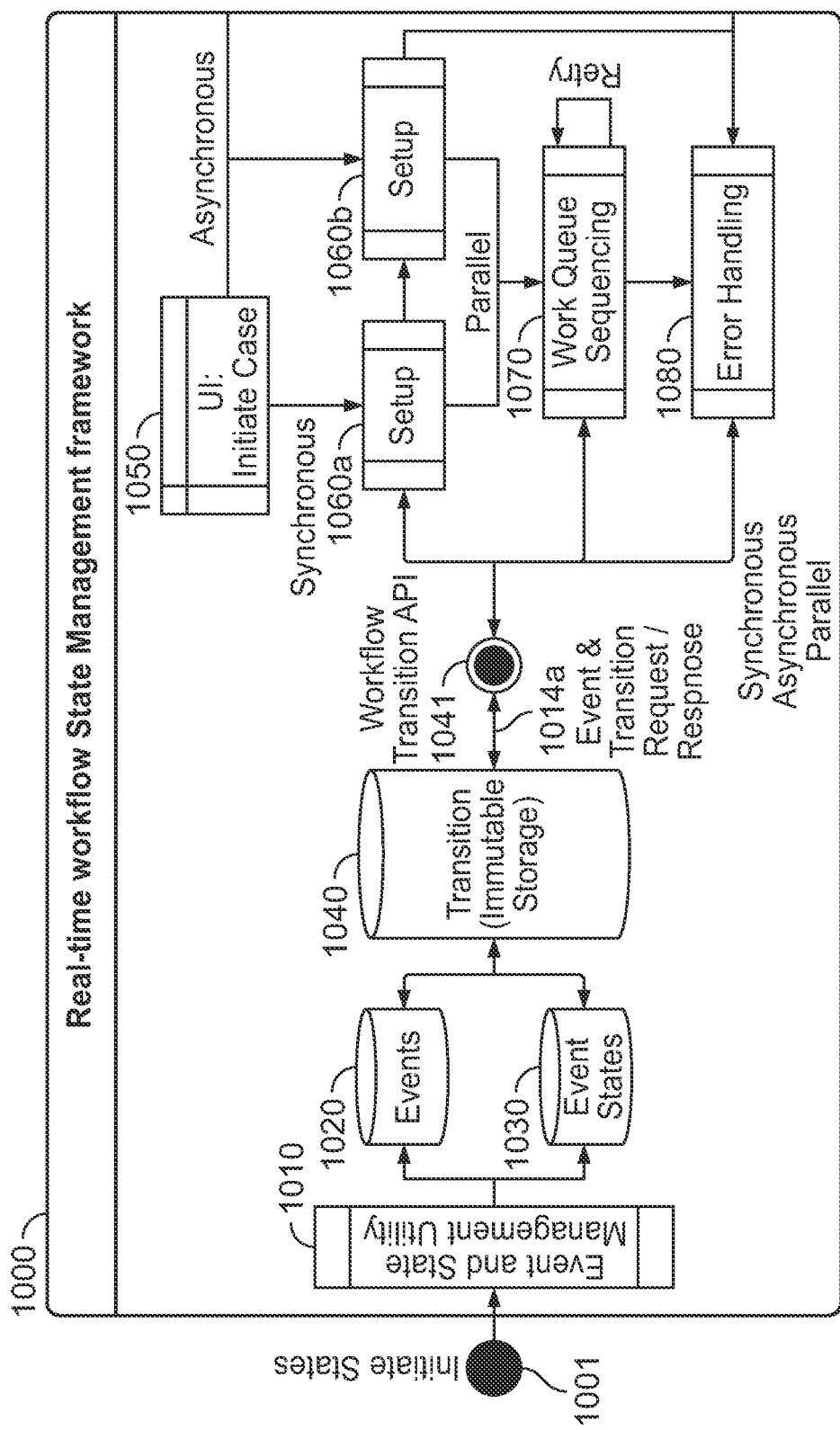
FIG. 10 is an exemplary real-time workflow state management framework according to the present disclosure.

An exemplary real-time workflow state management framework 1000 according to one exemplary embodiment is shown in FIG. 10. This exemplary framework 1000 may be configured to orchestrate (e.g., manage, maintain and/or transition states associated with) complex real-time workflows, including any concurrent and/or sequential deterministic and non-deterministic events and users, so as to enable real-time task execution and journey progression. This may be accomplished, at least in part, by an event and state management utility 1010 that controls the operation of the various components of the real-time workflow state management framework 1000, as further discussed below.

The exemplary real-time workflow state management framework 1000 of FIG. 10 includes an events database 1020 for capturing, maintaining and storing event metadata for one or more workflows (e.g., a lending product workflow). That is, each time an event occurs and/or is triggered, metadata associated with that event is captured, maintained and stored in the events database 1020.

State machine metadata (e.g., state machine codes for each workflow event) may also be captured and maintained, and stored in an event states database 1030. Both the event metadata and state machine metadata may be updated using a non-blocking I/O utility operating in a cross-platform runtime environment (e.g., Node.Js).

A transition utility 1040 (e.g., comprising immutable storage) may be configured to capture permutations of possible workflows, events, states, and transition data (e.g., from events database 1020 and/or event states database 1030), and store such data in a manner that enables real-time (or near real-time) data retrieval. Once captured, this data may be continually tested (e.g., via machine learning modeling, not shown) and updated (e.g., via event and transition request and/or response data 1041*a*) so as to provide the most up-to-date data at all times, and to continually improve determinations as to next best step, state, transition, resource, etc. In this manner, the data may be used by the event and state management utility 1010 to control the flow between states triggered by initiators 920 (e.g., API's, user interfaces, data ETL's, scripts, etc.). In an exemplary embodiment, the permutations of workflows may be finite.

At any given point of a given workflow's journey (including its initiation), input parameters and/or initiators associated with the workflow may trigger one or more events that result in an initiate state event 1001 (see, for example, FIG. 9). In response, the event and state management utility 1010 may utilize then-current state data associated with the workflow to determine and suggest the next best step, state, transition, resource, etc. to continue the workflow's journey. As indicated above, the then-current state data may be stored in the transition utility 1040 and based on event and event state metadata captured by the events database 1020 and event states database 1030, respectively, as updated by event and transition request and/or response data 1041*a*. For example, responsive to the initiate state event 1001, the event and statement management utility 1010 may cause the transition utility 1040 to initiate an event and transition request 1041*a*, based on then-current state data, to a workflow transition API 1041. The workflow transition API 1041 may provide response data 1041*a* that may be used by the transition utility 1040 to update existing permutations of possible workflows, events, states, and transition data. The event and state management utility 1010 may then determine, based on the updated data from the transition utility 1040, the next best step, state, transition, resource, etc. Once this determination is made, the given workflow journey may advance to the next best step, state, etc. This process (including multiple instances thereof) may be continuously repeated, sequentially and/or in parallel, until the given workflow journey is completed. That is, this process may be executed multiple times simultaneously responsive to one or more triggering events requiring multiple transitions. It should also be noted that the next best step, state, transition, etc. in a given journey may evolve over time as determined by advanced machine learning analytics.

The exemplary real-time workflow state management framework 1000 may also include other utilities and/or functions for processing event and transition requests and providing responses thereto 1041*a*. These may include, for example, a user-interface utility 1050 (e.g., for initiating a case that may ultimately result in a workflow), one or more setup utilities 1060*a-b* (e.g., for one or more user types to synchronously and/or asynchronously set up a case), a work queue sequencing utility 1070, and an error handling utility 1080 (e.g., to advance a workflow despite missing data, erroneous data entry, runtime error, etc.). As an illustrative example, the user-interface utility 1050 may initiate a case denying a document (e.g., provided as part of a current workflow) because there is missing data. In such a scenario, the work queue sequencing utility 1070 may add one or more additional workflow steps to the current workflow that may be allocated (e.g., by the set up utility(s) 1060*a-b*) to one or more user types (e.g., end-user, platform side user, etc.). The one or more workflow steps may include requesting a new document (complete with all required data), requesting approval (e.g., from platform side users) for the document as-is, and/or a combination of both. These additional workflow step(s) would then become part of the current workflow, and the event and state management utility 1010 may determine the next best step, state, transition, resource, etc. in view of the newly-added workflow step(s). In another example, a case may be automatically generated by the error handling utility 1080 as a result of an error. For instance, i a required document is tagged and/or categorized incorrectly, the error handling utility may create a 'missing document' case to indicate that a required document is missing. The work queue sequencing utility 1070 may add one or more additional workflow steps to the current workflow to correct this error (e.g., request re-categorizing/re-tagging), which may then be managed by the event and state management utility 1010. In this manner, the real-time workflow state management framework 1000 is able to provide full end-to-end, real-time state orchestration of any complex real-time workflow. It should also be noted that the real-time workflow state management framework 1000 is configured to orchestrate any number of workflows simultaneously, for any number of users and/or personas, across any number of computer components, systems and/or networks.

Aspects and benefits of the real-time workflow state management framework 1000 include (without limitation): independent management of states, transitions, and events; parallel event execution (asynchronous workflow); logically performed actions during each transition may be independent of each other; traceability of causes (transitions/data/events/states) and effects (outcome/new state/events/data) of micro-service requests; avoids hard coding conditions in code repositories; state machine abstracts all logic regarding states and transitions on behalf of a requestor; promotes stability and reliability while allowing for changes to workflows without having to make code changes; workflows are less prone to errors and bugs; and others. These and other aspects constitute a technological improvement to conventional state management systems.

As a further illustrative (non-limiting) example, reference is now made to Table 2 below.

utilities (and/or human operators), and flagged as 'closed' or 'completed' following a required action.

Rules, states, state machine codes and descriptions may be defined and organized in tables, such as shown in Table. 2. Notably, the Table 2 is but one exemplary excerpt/snapshot of the information that may be defined, captured and/or stored in such tables. Indeed, as a complex workflow transitions from one step to another, such tables may be automatically updated to reflect then-current rules, states, state machine codes and descriptions. Multiple micro-services may then leverage the states defined in FSMs to orchestrate complex workflows in parallel and independently generate one or more next best actions such as notifications, disclosures, letters, cases, tasks, batch files, etc.

3. Document Automation and Template Management Framework.

An end-to-end unified lending workflow may involve the platform of this disclosure obtaining, modeling and/or assessing data associated with a user including (for example) data reflective of a user's credit, risk, ability to pay, and other data informing attributes of the user (e.g., income, assets, liabilities, expenses, etc.). Portions of the data may be embodied on (and thus extracted from) electronic documents. Similarly, the end-to-end unified lending workflow may involve generating and transmitting informative electronic documents to the user (e.g., terms, conditions, disclosures and notifications about a loan product, information required by regulations and/or policies, etc.). Thus, in order to support these and other data and document needs, Appli-

TABLE 2

| Finite State Machine ID | Parent Finite State Machine ID | Finite State Machine CD | Finite State Machine Description | Finite State Machine Hierarchy (JSON) | Finite State Machine Type |
|---|---|---|---|---|---|
| 1 | Null | ERL_Case_Management_OLD | ERL Case Management | {"1"; "ERL_Case_Management" . . . } | Workflow |
| 2 | 1 | Income_Verification | Income Verification | {"1"; "Income_Verification", "2":[ ]} | Task |
| 3 | Null | CC_Application | Credit Card Application | {"1"; "CC_Application", "2":[ ]} | Workflow |
| 4 | Null | ERL_Case_Management_2 | ERL Case Management | { } | Workflow |
| 5 | 4 | SSN_Verification | SSN Verification | { } | Task |
| 6 | Null | ERL_Case_Management | ERL Case Management | { } | Workflow |
| 7 | 6 | Select_New_Offer | Select a New Offer | { } | Task_Customer |
| 8 | 6 | Reduce_Loan_Amount | Reduce Loan Amount | { } | Task_Customer |
| 9 | 6 | ERL_Case_Management_UW | ERL Case Management Underwriting | { } | Workflow |
| 10 | 6 | Verify_Income | Verification of Income | { } | Task_Customer |
| . . . | . . . | . . . | . . . | . . . | . . . |

As a complex workflow transitions from an initial workflow step to a final workflow step (e.g., such as a loan product workflow that transitions from origination to underwriting), additional workflows may be created to account for different interim functions associated with the overall workflow. In the case of a loan product, for example, the additional workflows may be created to account for functions such as identity verification, document verification, SSN verification, income document verification, and others. These interim functions may be assigned to one or more cant has developed a document automation and template management framework to address and provide these functions. In that regard, the document automation and template management framework described herein is configured to perform certain core functions which include: 1) uploading any document (in any format), and orienting and storing the document(s); 2) extracting information from any document type; and 3) scoring the extracted information for accuracy and/or compliance with predetermined data requirements. As a result, this document automation and template management framework enables the overall platform of this disclosure to achieve high levels of process automation for intelligent document verification and translation tasks, thereby avoiding human involvement to gather, print, fax, read, translate, code and/or store information from documents. This framework also avoids manual coding errors by systematically capturing information embedded in documents through advanced machine learning accuracy scoring algorithms.

Figure 11:
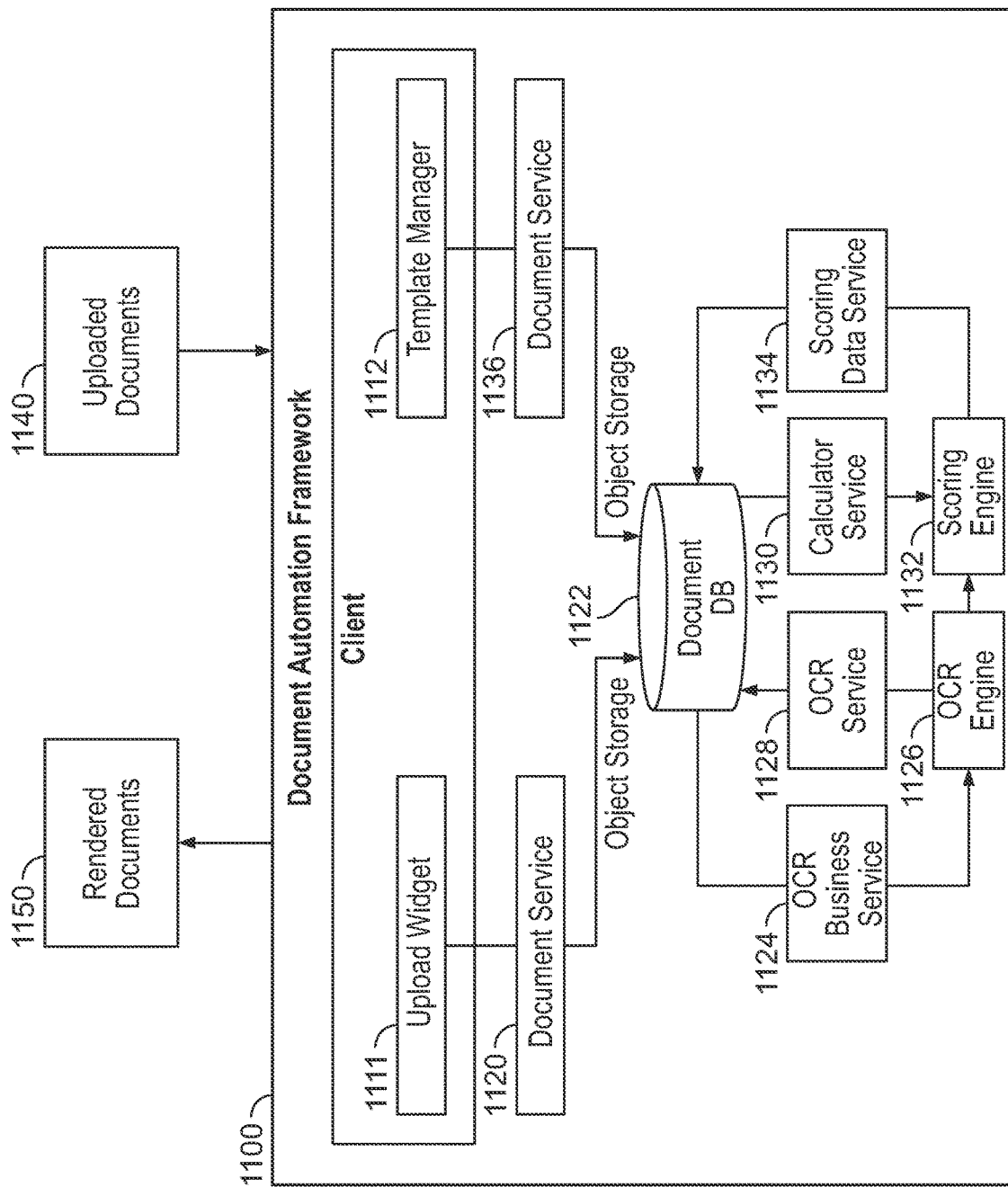
FIG. 11 is an exemplary document automation and template management framework according to the present disclosure.

An exemplary document automation and template management framework 1100 according to the present disclosure is shown is shown in FIG. 11. Included in this exemplary framework 1100 are an upload widget module 1111 and a template manager 1112, each providing and/or utilizing corresponding document services 1120, 1136, one or more document storage devices (e.g., document database(s) 1122), an OCR engine 1126 providing and/or utilizing OCR business 1124 and other OCR services 1128, and a scoring engine 1132 providing and/or utilizing calculator 1130 and scoring data 1134 services. In some embodiments, the various services provided by this framework 1100 may be executed by one or more computer modules, engines and/or processors included in the framework 1100. Collectively, components of this exemplary framework 1100 enable the platform of this disclosure to perform automated and intelligent document verification translation, creation and rendering tasks.

In operation, the upload widget module 1111 may be configured to upload any document 1140 (e.g., from a user device or any other data source) of any type in any format, and orient and store the document (e.g., via document service(s) 1120) in a document database 1122. In some embodiments, the uploaded document 1140 may be first converted (e.g., via document service(s) 1120) into standard text-based data objects (e.g., JSON objects) prior to storage in the document database 1122. The OCR engine 1126 may then scan, identify and extract predetermined types and quantities of information from the uploaded document 1140 (e.g., utilizing OCR/business service(s) 1124, 1128). The information extracted from the uploaded document 1140 may then be stored in the document database 1122 for later use and/or provided to the scoring engine 1132 for further processing. In some embodiments, the extracted information may be converted to standard text-based data objects (e.g., JSON objects).

The scoring engine 1132 may then score the extracted information (e.g., utilizing calculator services 1130 and scoring data services 1134), which themselves may implement machine learning modeling for continually improving scoring accuracy. Based on the scoring, the document automation and template management framework 1100 may verify the document(s) (e.g., if the scoring meets or exceeds predetermine scoring thresholds) and/or automate certain tasks based on the information extracted from the uploaded document(s) 1140, such as printing, faxing, reading, translating, coding, storing information from the uploaded document(s), etc.

Verified information extracted from uploaded documents 1140 may be used by the template manager 1112 to automatically generate (e.g., via document service 1136) electronic documents or communications (e.g., emails, text messages, etc.). In some embodiments, the template manager 1112 may retrieve one or more document templates from the document database 1122 (or other storage) and auto-populate the templates with the (verified) information obtained from uploaded documents 1140. Completed/populated document templates may then be rendered (e.g., converted into an electronic communication/document 1150 suitable for transmitting and/or displaying to a user via a user device).

In some embodiments, in addition to extracting data and information from uploaded documents 1140, the document automation and template management framework 1100 may be further configured to process (e.g., convert, store, score, verify, etc., as discussed above) and utilize data captured from one or more other external data sources and/or by the platform of this disclosure itself. For example, data received from one or more external data sources (e.g., an electronic transmission from an external system) may be scanned and/or extracted by the OCR engine 1126, scored and verified by the scoring engine 1132, and then utilized (alone or in combination with other data from other sources) by the template manager 1112 to auto-populate document templates that may ultimately be rendered 1150.

4. Notification and Active Data Loss Prevention (DLP) Engine Framework.

For purposes of this disclosure, active data loss prevention (DLP) technology may generally be characterized as technology that performs content inspection and/or contextual analysis of data sent via any number of electronic communication channels such as email, instant messaging, text messaging, etc. The data may be inspected and/or analyzed while in transit (e.g., over the network, across networks, etc.), while in use (e.g., on a network-connected endpoint device), and/or while at rest (e.g., on file servers, in cloud applications, in cloud storage, etc.). As discussed further below, the active DLP engine of the present disclosure is specifically and uniquely configured to automatically detect and prevent the loss, leakage and/or exposure of sensitive data outside of authorized channels, including within complex multi-step workflow journeys.

For purposes of this disclosure, sensitive data may be characterized as personal identifiable information ("PII"), which may include any information with which the identity of an individual may be directly and/or indirectly inferred. Examples of PI may include (without limit) a person's: full name, social security number (SSN), driver's license number, mailing address, credit card information, debit card information, passport information, financial information (e.g., tax returns, debts accounts, credit reports, etc.), medical records, employer identification number (EIN), taxpayer identification number (TIN), computer log-in credentials, email address, medical information, computer IP address, geo location, and so on. This group of PII may be referred as "Primary PII," insofar as it may provide a direct link to the person's identity. Other types of PII, such as a person's race, gender, date of birth, place of birth, religion, residential zip code, and the like may be referred to as "Secondary PII," insofar as this type of data alone may not necessarily be used to identify an individual.

Sensitive data communicated through email, text message, instant messages, or any other communication channel may be at risk for loss, leakage, and/or exposure, including as a result of the vulnerabilities inherent to the various communication channels themselves. Increases to the number and/or frequency of communications, the volume of sensitive data being communicated, the number of channels through which the sensitive data is communicated, and other variables may further increase the risk of loss, leakage and/or exposure.

The particular environment in which the sensitive data is being communicated may also exacerbate the risk of loss, leakage and/or exposure. For example, complex multi-step workflow journeys may exist in complex environments in which numerous communications and notifications across multiple channels comprising the most sensitive Primary PII are being communicated to and from multiple users, internal systems, external systems, various networks, data repositories, regulatory reporting systems, recordation systems, etc. In a non-limiting example, an end-to-end unified lending journey may comprise a complex multi-step workflow journey that is embodied in a complex (computerized/networked) environment in which the generation and transmission of numerous communications across any number of systems, networks, etc. may be driven (or triggered) by user interactions, system policies, regulations, operations, etc. Examples of the types of communications associated with this exemplary workflow journey may include electronic disclosures, electronic terms and conditions, electronic promissory notes, e-signatures, e-consents, adverse actions, etc. Notifications within this environment may be characterized as informative real-time or batch communications, that may be transmitted throughout the environment via communication channels such as email, text messages, phone communications, video communications, letters, etc. Similar complexities and challenges may exist in other types of complex end-to-end workflow journeys (e.g., weather mapping journeys, machine learning modeling, vote tallying/analytics, etc.).

Conventional DLP technology is not equipped to address the uniquely complex risks of data loss, leakage and/or exposure that exist in complex multi-step workflow environments. As a result, described herein is a new, configurable active DLP framework with an integrated notification capability for detecting and preventing data loss, leakage, and/or exposure, including in complex multi-step workflow journey implementations such as in a unified lending platform. The active DLP framework of this disclosure may be configured for real-time and batch based detection, protection and controls for potential data loss, leakage and/or exposure causing events, triggers, pattern matching, classifications, notifications, and communications with an immutable log. Aspects of this new DLP framework are discussed below.

Figure 12:
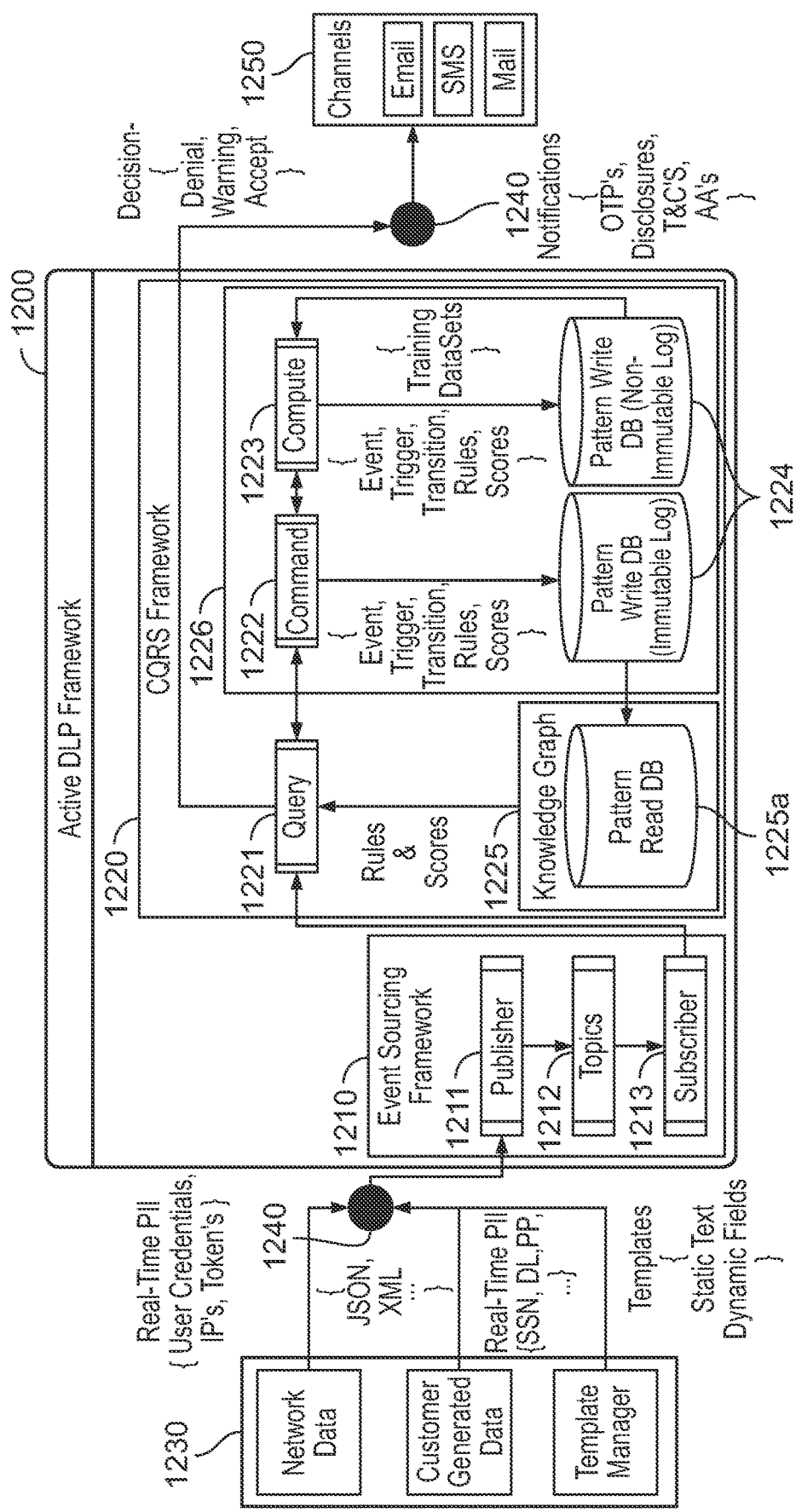
FIG. 12 is an exemplary active data loss prevention (DLP) framework according to the present disclosure.

Turning now to FIG. 12, an exemplary active DLP framework 1200 according to the present disclosure is shown. For purposes of illustration only, an exemplary end-to-end lending journey (e.g., FIG. 6) will be used to describe and demonstrate certain aspects and functions of the exemplary active DLP framework 1200. It should be noted, however, that this exemplary active DLP framework 1200 may be configured for use in connection with any type and/or complexity of end-to-end workflow journey, in any industry or application.

The exemplary active DLP framework 1200 of FIG. 12 is shown as comprising an event sourcing framework 1210 and a CQRS (Command Query Responsibility Segregation) framework 1220. This exemplary active DLP framework 1200, as well as its components 1210, 1220 may be embodied in the same online electronic computing platform that hosts the exemplary end-to-end lending journey, or across one or more additional or alternative computing systems.

The event sourcing framework 1210 may itself include any number of components or modules configured for capturing data, including in real-time, at any given time (e.g., on-demand, periodically, continuously, etc.). Such data may be captured from user input into the electronic computing platform on which the framework 1200 is embodied, platform-generated data and/or any type of communication (e.g., text message, email, video communications, etc.) entering into, out of and/or within such electronic computing platform.

As shown, the event sourcing framework 1210 may include an event publisher module 1211, a streaming service module ('Topic') 1212 and an event subscriber module 1213, although alternative or additional components may be included therein. In operation, the event sourcing framework 1210 may be configured to capture network data, user (e.g., customer, client, colleague, etc.) generated data, template manager data, or data from any other source, including data that is pre-existing within the system 1230 and/or that exists in any type or quantity of communications. The type, quantity and/or source of data 1230 being captured may depend on the number of users and/or personas engaged in a workflow journey, the user(s)' particular workflow journey(s) and/or on the particular step(s) within the user(s)' particular workflow journey(s). The data 1230, which may include PI and non-PII, may be captured in real-time and/or in batch, and may be converted (e.g., by a data conversion module 1240) to standard text-based data objects (e.g., JSON (JavaScript object notation)). If the data exists in any type of communication, the framework 1200 may include a monitoring device (not shown) configured to monitor communications, interrogate communication content to identify potentially sensitive data, and extract the potentially sensitive data for further processing.

Referring briefly to FIG. 6, the exemplary end-to-end lending journey shown therein includes various workflow steps (e.g., Originate→Underwrite→Process→Issue/Disburse→Service), each having one or more respective sub-journeys. As shown, some of the sub-journeys may include functions such as 'log-in', 'rate selection', 'apply', etc., that may involve generating a respective webpage (or user interface ("UI")), and receiving (and/or providing) input/data via the respective webpage/UI. For example, user generated data may include a user's log-in credentials, captured during the 'login' step of the Originate sub-journey, as well as user PII included in electronic documents uploaded during this Originate sub-journey. As discussed above, types of PII data that may be captured (whether alone or as part of non-PII data) may include a user's log-in credentials, IP address, tokens, social security number, etc.

Once data is captured (and converted to text-based data objects), the event publisher module 1211 may be configured to identify the source(s) of the captured data, to ensure that the data originated from a registered/authorized publisher or source. This may include, for example, interrogating and analyzing metadata associated with the captured data and/or the communication(s) comprising such data. The event publisher module 1211 may then provide the captured data to the streaming service module 1212, which may be configured to capture and/or continuously monitor all data (PII and non-PII) captured by the event publisher module 1211. The event subscriber module 1213 may subscribe to the streaming service module 1212 to receive event and other data. The event subscriber module 1213 may also be configured to read rules from a rule-based system, read scores from a real-time scoring system (discussed further below), as well as provide event and other data to the CQRS framework 1220.

The CQRS framework 1220 may include a query module 1221, a command module 1222, a compute module 1223, one or more pattern write databases (e.g., immutable logs) 1224, and a knowledge graph module 1225 which itself may comprise one or more pattern read database(s) 1225a. The query module 1221 may be configured to receive event and other data from the event subscriber module 1223, as well as to read and apply patterns, rules, and/or scores (which may be housed in the pattern read database(s) 1225*a* of the knowledge graph module 1225) to such data in order to classify this data as PII and/or non-PII. For example, by applying such rules, patterns and/or scores to the data, the query module 1221 may be able to classify a first combination of data (e.g., a user's first name and a scrambled account number within a text message) as non-PII, while recognizing and classifying (e.g., based on such rules and/or patterns) a second combination of data (e.g., a user's full mailing address in an email) as PII. That said, if the second combination of data is included in and/or allocated by the platform for further transmission or distribution via a non-electronic channel (e.g., such as in an outbound physical letter that will be mailed), the query module 1221 may apply rules that classify the second combination of data as non-PII, since it will not be susceptible to data loss, leakage and/or exposure via an electronic communication channel. In some aspects, application by the query module 1221 of patterns, rules and/or scores to data may result in a stop or pause to communication(s) comprising such data, so that the communication(s) may be further processed (e.g., inspected and/or analyzed) by a separate system and/or operator (not shown). In other aspects, applying patterns, rules and/or scores to data may result in the active DLP framework 1200 generating and transmitting notification, alert and/or other communication.

The command module 1222, the compute module 1223 and the one or more pattern write databases (e.g., immutable log(s)) 1224 may collectively be referred to as a configurable rules engine 1226. This configurable rules engine 1226 may be configured to provide pre-configured rules to the knowledge graph 1225, as well as to conduct real-time dynamic data scoring, which may involve executing rules and/or computing probabilities based on predictive and/or unsupervised machine learning models (e.g., unsupervised generative statistical models).

The command module 1222 may itself be configured to make determinations (including as to initiating actions triggered by rules), and to write to the immutable log(s) (e.g., pattern write database(s) 1224). For example, if the command module 1222 determines that a segment of data has a high probability of including PII, any number of controls and preventative measures may be initiated by the command module 1222. For example, the command module 1222 may trigger generation of a notification (discussed below) or alert and/or a stop or pause communication instruction that includes the segment of data, so that the communication may be further processed (e.g., inspected and/or analyzed) by a separate system or operator.

The compute module 1223 may be configured for continuous learning (e.g., via machine learning models) to continuously improve the knowledge graph 1225. The machine learning models may be unsupervised, and configured to continually refine rules, patterns and/or scores, which may be provided to the command module 1222 and written in an immutable log (e.g., pattern write database 1224).

If the active DLP framework 1200 triggers creation and/or transmission of one or more notifications (e.g., via the command module 1222), whether in real-time or in batch, instructions for creating and/or transmitting the notification(s) may be generated by the query module 1221 and provided to a notifications module 1240. The notifications module 1240 may in turn cause the notification(s) to be created and/or transmitted through any suitable communication channel 1250 (e.g., email, text message, physical mail, etc.). Example events that may occur during one or more end-to-end workflow journey(s) and cause the active DLP framework 1200 to trigger one or more notifications may include (without limit): data input indicative of a 'forgot password' during a 'login' function; receipt of communications comprising user PII; data input responsive to a 'rate selection' function; initiating one or more 'application' functions; instances of user data that are inconsistent and/or erroneous; completion of a workflow step; and others. In response, the active DLP framework 1200 may initiate creation and/or transmission of notifications in the form of text messages, emails, web-rendered messages, secure messages, physical letters, etc. Such notifications may include data and information to advise a user of acceptance and/or denial determinations, to provide information with which a user may reset a password, to alert or warn a user as to potential data leaks, inconsistent user data, etc., to provide the user with secure access to certain private information (e.g., terms and conditions information), etc.

Contrary to existing DLP technology, the active DLP framework described herein (including the exemplary active DLP framework 1200 discussed with reference to FIG. 12 represents a significant technological advancement. Indeed, as explained above, the active DLP framework described herein is configured to identify, maintain, manage, and react to: synchronous and asynchronous events that may be triggered by any number of factors (e.g., a diverse set of workflow journeys, persona's, communications, and channels) and an ever-changing landscape of PII data attributes. In addition, the active DLP framework of the present disclosure is configured to limit false event-triggering events through the training of datasets, thereby avoiding unnecessary and/or erroneous system processing. The active DLP framework is also configured to process real-time and/or batch events in an integrated architecture, and real-time and/or batch communications across a wide variety of communication channels. Further still, the active DLP framework described herein provides strong controls with transparency on the events, triggers, data and communications through the framework's knowledge graph.

Figures 13A, 13B:
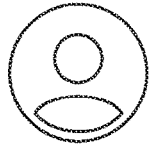
FIG. 13A is first exemplary event-triggered text notification generated according to the present disclosure.
FIG. 13B is second exemplary event-triggered text notification generated according to the present disclosure.

Turning now to FIG. 13A-D, example event-triggered notifications configured for different types of communication channels are shown. These examples include, for example, exemplary SMS text notifications 1310 and 1320, as shown in FIGS. 13A and 13B, respectively. FIG. 13A shows a first exemplary SMS text notification 1310 that features an alert message to advise a user that updated and/or additional account information is needed. This SMS text notification 1310 may be generated, for example, in response to incomplete user input and/or automatically after a predetermined amount of time. FIG. 13B shows a second exemplary SMS text notification 1320 that features a message to advise a user that a requested fund transfer from one electronic account to another has been completed. This SMS text notification 1320 may be generated, for example, automatically upon completion of one or more system transfer functions, which themselves may have been initiated automatically (e.g., responsive to account activity) and/or by user input (e.g., a user input request to transfer funds across electronic accounts).

FIG. 13C illustrates an example direct mail notification 1330 that may be generated automatically responsive to an adverse system determination. And FIG. 13D illustrates an example email notification 1340 comprising details associated to a particular online product journey. As noted above, other types of notifications may be generated and transmitted across other types of communication channels, both in real-time and/or in batch. The examples shown in FIGS. 13A-D are illustrative and non-limiting.

5. Orchestration Engine Framework.

Systems, methods and computer program products for providing a novel and unique real-time orchestration engine framework is described herein. This real-time orchestration engine framework may comprise one or more real-time orchestration engines that are specifically configured to perform complex real-time service orchestrations in a polyglot micro-services architecture for any number and/or complexity of workflows and journeys (e.g., for products, sub-products, services, accessibility patterns, etc.), end-to-end, for any number of users and/or user personas, for any number and type of system components written in any number of programming languages, etc. This includes, for example, managing the exponential complexities of sequencing asynchronous API (application program interface) calls across end-to-end workflow functions, while also managing a diverse set of concurrent entities, products, sub-products, entities, users, personas, events, accessibility patterns, journeys, etc.

Further, the real-time orchestration engine framework described herein enables API's to be built using any number of programming languages, and the API's may follow a micro-service architecture. In some embodiments, the real-time orchestration engine framework may optionally comprise multiple real-time orchestration engines implemented simultaneously, each configured for a particular class of user, journey, product, sub-product, etc. For example, some workflow journeys may simultaneously involve multiple classes of users (e.g., an external user (customer) and an internal user (system-side colleague)), each traversing related, but different, workflow journeys. In such a scenario, it may be preferable to utilize multiple instances of a real-time orchestration engine, one each for performing orchestration functions associated with each user's workflow journey.

The real-time orchestration engine framework may also be configured to comprehensively resolve any number of communication protocols, bytecodes, data exchange protocols and rules for the micro-services. As a result, this framework is able to achieve (among other things): high manageability of the orchestration rules of the micro-services, seamless micro-services orchestrations which include transitioning complex, concurrent and parallel services, future proofing (e.g., scalability and upgradeability) of the platform through nimble handling of diverse and evolving polyglot architectural patterns, and service functions such as start, pause, resume, restart and stop.

Figure 14:
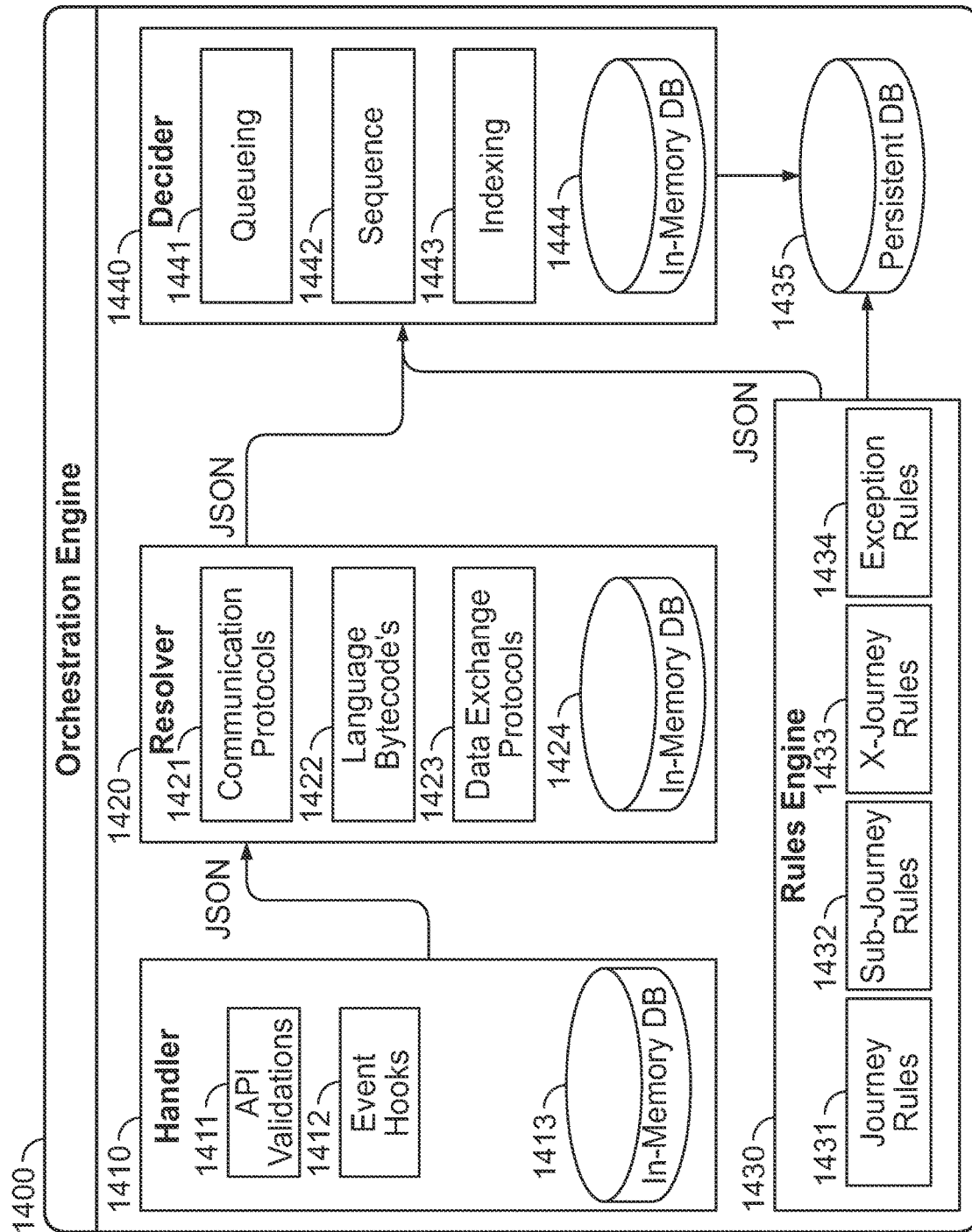
FIG. 14 is an exemplary real-time orchestration engine according to the present disclosure.

Turning now to FIG. 14, an exemplary real-time orchestration engine (or simply "orchestration engine") 1400 is shown. Although a single orchestration engine 1400 is shown, multiple orchestration engines may be included in a framework and implemented simultaneously, according to the particular needs of the particular implementation.

The exemplary orchestration engine 1400 of FIG. 14 may be configured for complex real-time orchestration in a polyglot micro-services architecture having any number of real-time dependencies. In other words, the exemplary orchestration engine 1400 may be configured to coordinate and/or manage of any number of computer systems, computer components, modules, applications, services, micro-services, etc. in order to string together multiple tasks in a proper sequence so as to execute larger workflow journeys and/or sub-journeys. This orchestration may occur in real-time, in an architecture developed using multiple programming languages and/or technologies simultaneously, thereby enabling each service and/or micro-service to utilize the technology that is best suited for its particular implementation. This includes, for example, orchestrating states and/or transitions between multiple real-time micro-services, including numerous concurrent micro-services, across multiple system and/or system components, written in multiple programming languages.

As shown, the exemplary orchestration engine 1400 comprises a unique, modular design that includes one or more components and/or modules that may be modified (e.g., updated), re-arranged, scaled, etc. as needed. In this example, the modular components uniquely include a handler 1410, a resolver 1420, a rules engine 1430 and a decider module 1440. It should be understood, however, that the orchestration engine 1400 of the present disclosure may include alternative and/or a different number of components, as appropriate for the particular implementation.

The handler 1410 in this example may embody and/or execute one or more routines configured to manage any number of APIs connecting to any number of endpoints to perform a set of capture validations 1411 (e.g., to validate incoming data) and/or event hooks 1412 (e.g., to create a chain of functions/procedures), regardless of client type (e.g., as defined according to API protocol), which may then be stored in a real-time in-memory database 1413. This may include, for example, creating a client class along with instructions for configuration, exceptions for error handling, batch polling, queuing, telemetry, etc. for each of any number of protocols, including ReST (Representational State Transfer) and/or gRPC (open-source Remote Procedure Call).

The resolver 1420 of this example may be configured to resolve/translate communication protocols 1421, language bytecodes 1422, data exchange protocols 1423, etc. associated with the data captured and managed by the handler 1410. The resolver 1420 may accomplish such resolve/translate functions via an interpreter (not shown) which translates, for example, language bytecodes 1422 into machine understandable bytecode. Since the orchestration engine is configured to operate in a polyglot architecture, the resolver 1420 may be configured to resolve/translate any number of varying programming languages, communication protocols, bytecodes, data exchange protocols, etc. For example, the resolver 1420 may provide an interface class to compile, interpret and/or execute different communication protocols and programming languages. In some examples, software development kits (SDKs) may be utilized to resolve and/or translate between and amongst varying data exchange protocols and/or programming languages. Metadata from the translations may then be stored within an in-memory database 1424 for use in future resolver functions.

The rules engine 1430 may be configured to store any number of workflow journey rules 1431, sub-journey rules 1432, X-journey rules 1433, exception rules 1434, and/or other types of rules (e.g., for queueing, sequencing, indexing, etc.) in a persistent database 1435, for example, which may then be utilized by the decider module 1440 for performing its respective functions. In some embodiments, output from the resolver 1420 may be provided to the rules engine 1430 for use in creating rules.

In some embodiments, the rules engine 1430 may be configured for generating one or more sequence rules in which a state flow occurs. Thus, if a user selects a particular event within a particular context, for example, the rules engine 1430 may determine what is to be displayed to the user in a consequent menu. In this example, the rules engine 1430 may utilize data and information from a knowledge base (e.g., any type of memory or storage device) comprising APIs and data (e.g., platform details, workflow details, transaction details, etc.), for example, to make such a determination. This knowledge base may be kept updated (e.g., by one or more processors) by continuous interaction with the user, platform, workflows, etc., which in turn enables the rule engine 1430 to form new and up-to-date rules.

The decider module 1440, with input from the resolver 1420 and rules engine 1430, may perform all needed orchestrations. This may include, for example, queueing 1441, sequencing of state machines 1442, indexing 1443 of "workers" (e.g., APIs in a micro-service architecture) through various software development kits ("SDK's") and other micro-service orchestrations in accordance with the respective rules from the rules engine 1430. Metadata of the orchestrations may then be stored in a real-time in-memory database 1444, while the orchestrations themselves may be stored in a suitable persistent database (e.g., NoSQL ("Not Only Structured Queue Language"), RDBMS ("Relational Database Management System", etc.) 1435.

Communications between and amongst the various orchestration engine 1400 components may occur using standard text-based data objects (e.g., JSON (JavaScript object notation)). That is, each component 1410, 1420, 1430 may translate data/information it receives into JSON objects, for example, which may then be communicated to other components. [←

Figure 15:
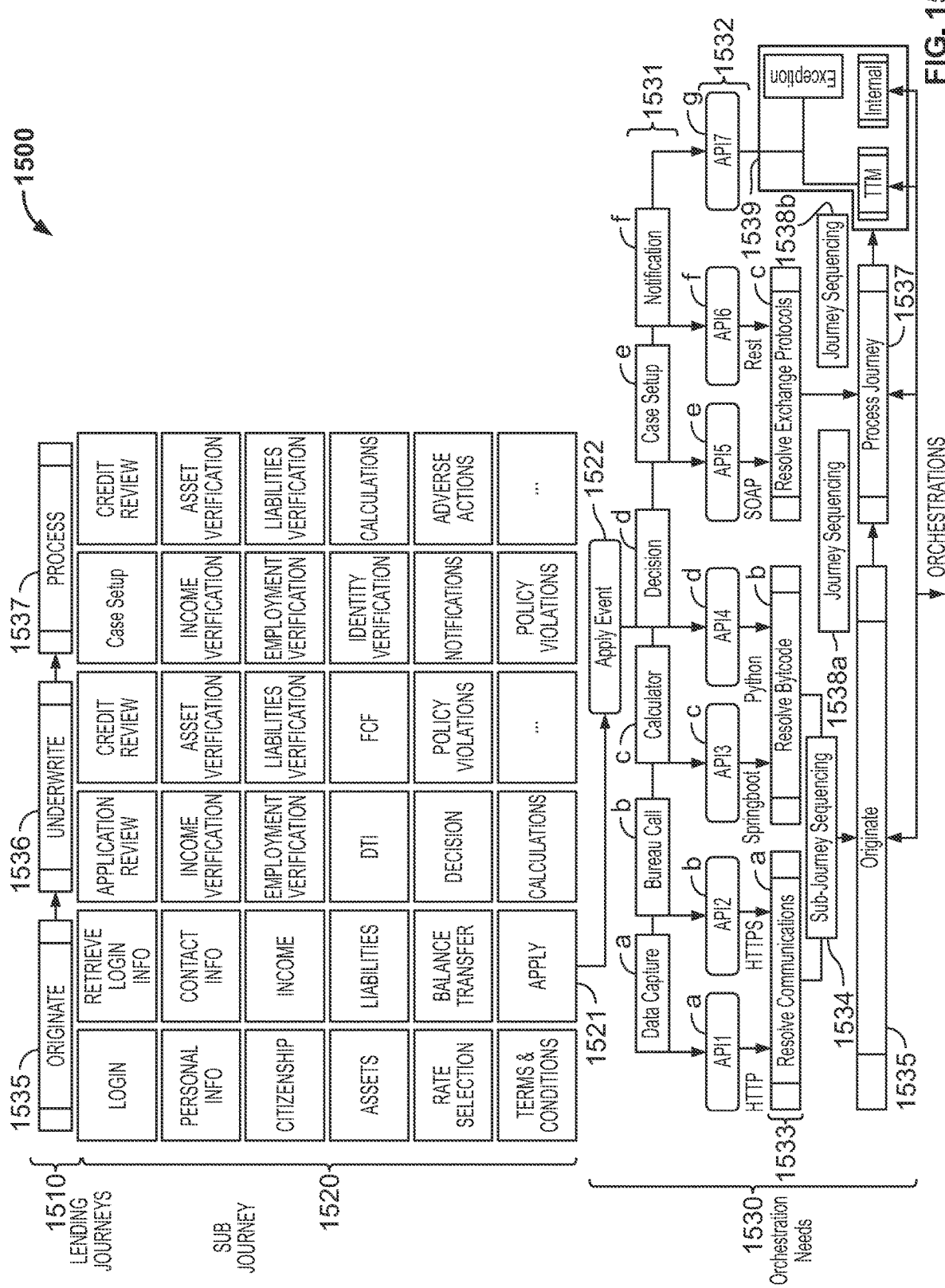
FIG. 15 is a diagram illustrating an exemplary lending journey, its underlying sub-journeys and exemplary orchestration needs that may be associated with one particular sub-journey, according to the present disclosure.

Reference is now made to FIG. 15, an illustrative diagram 1500 which depicts an exemplary lending journey 1510 (e.g., Originate 1535→Underwrite 1536→Process 1537), its underlying sub-journeys 1520 (e.g., Login . . . Adverse Actions), and exemplary orchestration needs 1530 that may be associated with one particular sub-journey 1521. As explained above, a journey and each of its sub-journeys may require real-time orchestration of a combination of computer systems and/or components executing any number of functions, routine calls, state transitions, translations, sequencing, queueing, etc. to, collectively, accomplish or achieve a particular outcome, product and/or service. In this example, the journey is a complex lending journey 1510 having multiple sub-journeys 1520 that collectively result in the generation and processing of an electronic lending product. As such, real-time orchestration of this type of complex workflow journey 1510 may involve hundreds of services (and micro-services) and thousands of API end points that may perform, for example, CRUD (Create, Read, Update and/or Delete) operations on databases/tables. Such real-time orchestration may also involve sequencing, prioritizing, executing and tracking (e.g., by an orchestration engine according to this disclosure) synchronous and/or asynchronous API calls across and within this exemplary workflow journey 1510. As summarized above, this may include, for example, handling state and transitions between multiple micro-services, orchestrations between concurrent services, resolution/translation of diverse communication protocols, handling communications between various components written in diverse programming languages, and handling start, pause, restarts, resume and stops. As further discussed below, an orchestration engine according to the present disclosure is specifically designed and configured for such real-time orchestration.

Included in the exemplary sub-journeys 1520 is an Apply workflow sub-journey 1521 which may comprise any number of functions, routines, etc. requiring orchestration. In one embodiment the Apply workflow sub-journey 1521 of the exemplary lending journey 1510 may be initiated upon the occurrence of an Apply event 1522, which itself may be initiated from a user device (e.g., computer, mobile telephone, etc.) comprising an interactive graphic user interface (GUI) configured to receive user input (not shown). For example, the Apply event 1522 may be initiated in response to user input into the user device (e.g., via an input device such as a mouse click, touching of selectable icon on a touch screen, voice activation, etc.). Additionally or alternatively, the Apply event 1522 may be initiated automatically by a platform on which the lending journey 1510 is being executed (e.g., responsive to determinations made by the platform via, for example, machine learning routines). Other events associated with the lending journey 1510 and/or its sub-routines 1520 may similarly be initiated via one or more user devices and/or automatically.

Once the Apply event 1522 is initiated, various orchestration needs 1530 of the Apply workflow sub-journey 1521 may need to be resolved and/or addressed. For example, initiating the Apply event 1522 may trigger a series of functions 1531 that, collectively, accomplish the Apply workflow sub-journey 1521. This series of computer operations and/or functions 1531 may include, for example, one or more data capture functions 1531*a*, bureau call functions 1531*b*, calculator functions 1531*c*, decision functions 1531*d*, etc.

In some embodiments, the data capture function(s) 1531*a* may communicate with other software, components, systems, etc. via API-1 1532*a*, where API-1 1532*a* supports hypertext transfer protocol (HTTP) as its communication protocol; and the bureau call function(s) 1531*b* may communicate via API-2 1532*b* and supports hypertext transfer protocol secure (HTTPS) as its communication protocol. As shown in the diagram 1500, these differing communication protocols may need to be resolved 1533*a* before sub-journey sequencing 1534 of the respective data capture function(s) 1531*a* and bureau call function(s) 1531*b* (as well as calculator function(s) 1531*c* and decision function(s) 1531*d*, discussed below) may occur.

The calculator function(s) 1531*c* may utilize API-3 1532*c* to communicate using Spring Boot™ coded bytecodes, whereas the decision function(s) 1531*d* may utilize API-4 1532*d* to communicate using Python™ coded bytecodes, for example. As with the differing communication protocols discussed above, the bytecodes coded with the Spring Boot™ and Python™ programming languages may also need to be resolved 1533*b* before the sub-journey sequencing 1534 may occur. To this end, an orchestration engine according to this disclosure may be configured to attend to these and other orchestration needs 1530.

For example, once the Apply event 1522 is initiated, a series of computer operations and/or functions 1531 that collectively execute the Apply workflow sub-journey 1521 may be triggered. In this example, the series of computer operations and/or functions 1531 may include the data capture functions 1531*a*, bureau call functions 1531*b*, calculator functions 1531*c*, and decision functions 1531*d*. As discussed above, triggering of these computer operations and/or functions 1531 may require orchestration, namely, the coordination and/or management of any number of computer systems, computer components, modules, applications and/or services, in order to string together multiple tasks in a proper sequence, so as to execute the larger workflow or process of the Apply workflow sub-journey 1521. The exemplary orchestration engine 1400 of FIG. 14 may be configured to perform such orchestration.

Indeed, once the data capture 1531a and bureau call 1531b functions are called, the handler 1410 (shown in FIG. 14) may perform a set of API validation functions 1411 in connection with API-1 1532a and API-2 1532b. Results of the validation functions 1411, together with data and/or instructions associated with the data capture 1531a and bureau call 1531b functions, may then be converted into JSON objects (or any other standard text-based format for representing structured data) and provided to the resolver 1420. At the resolver 1420, data objects received from the handler 1410 may be processed and translated (e.g., via an interpreter) into a common, understandable machine language, which may in turn be provided to the decider 1440 in the form of JSON objects (or any other standard text-based format).

Similar orchestration functions may be provided by the handler 1410 and resolver 1420 in connection with the calculator 1531c and decision 1532d functions. The decider 1440 may then process the data objects received from the resolver 1420, together with rules (e.g., sub-journey rules 1432) from the rules engine 1430, and attend to sequence 1534 the data capture 1531a, bureau call 1531b, calculator 1531c and decision 1532d functions of Apply workflow sub-journey 1521.

Returning again to FIG. 15, sequencing 1534 of the Apply workflow sub-journey 1521 (which is a part of the Originate journey 1535) may automatically trigger aspects of the Process journey 1537, based on X-journey sequencing 1538a, 1538b determined and/or provided by the decider 1440 (e.g., based on X-journey rules 1433 from the rules engine 1430). The Process journey 1537 may itself may comprise a set of functions (e.g., case setup 1531e and notification 1531f functions) having respective APIs (e.g., API-5 1532e, API-6 1532f) supporting different data exchange protocols (e.g., SOAP, REST) requiring orchestration (e.g., resolving exchange protocols 1533c). In some embodiments, the notification function 1531f may further utilize a second API (API-7 1532g) in connection with exception generation and processing (1539), which may similarly be orchestrated (e.g., based on exception rules 1434) by the orchestration engine 1400 of FIG. 14.

The unique modular design and functions of the orchestration engine described herein (e.g., orchestration engine 1400 of FIG. 14) provide many benefits and improvements over existing technology in this art. These include (without limit) the efficiency and ease with which numerous and complex orchestration rules may be managed, an ability to seamlessly transition complex and concurrent states between any number of micro-services in a polyglot architecture, an ability to effectively and efficiently handle diverse polyglot architectural patterns, any number of diverse communication protocols, data exchange protocols, programming language bytecodes, etc., an ability to handle service restarts: start, pause, resume, restart and stop, and others, as detailed above.

6. API's in a Micro-Service Architecture.

API's play the quintessential role of enabling real-time information exchange between the users and the platform of the present disclosure throughout various phases of end-to-end journeys. As previously noted, the platform of this disclosure may be configured for end-to-end unified lending journeys (or more generally, for Lending as a Service (LaaS)). To that end, the unified lending platform (e.g., the unified lending platform 200 of FIG. 2A) may implement a micro-services architectural pattern that arranges the platform as a collection of loosely coupled, fine grained services, communicating through lightweight protocols. Further, the platform may comprise a Command Query Resource Segregation (CQRS) pattern to drive independent business logic and data read/write functions. This paired with an orchestration engine as described herein may provide significant benefits to the platform including (without limit): improved and independent scalability of read and write workloads for high real-time traffic; improved read/write operation time with optimized domain driven data architecture; high platform resiliency through high fault isolation and circuit breakers; high data security and compliance maintained through secured services, mutual authorization across services and purpose-built services which limits access and risk to sensitive data; future proofing the platform through high service manageability (independent service management, logic and data), reduced dependencies and outage impacts.

Figure 16:
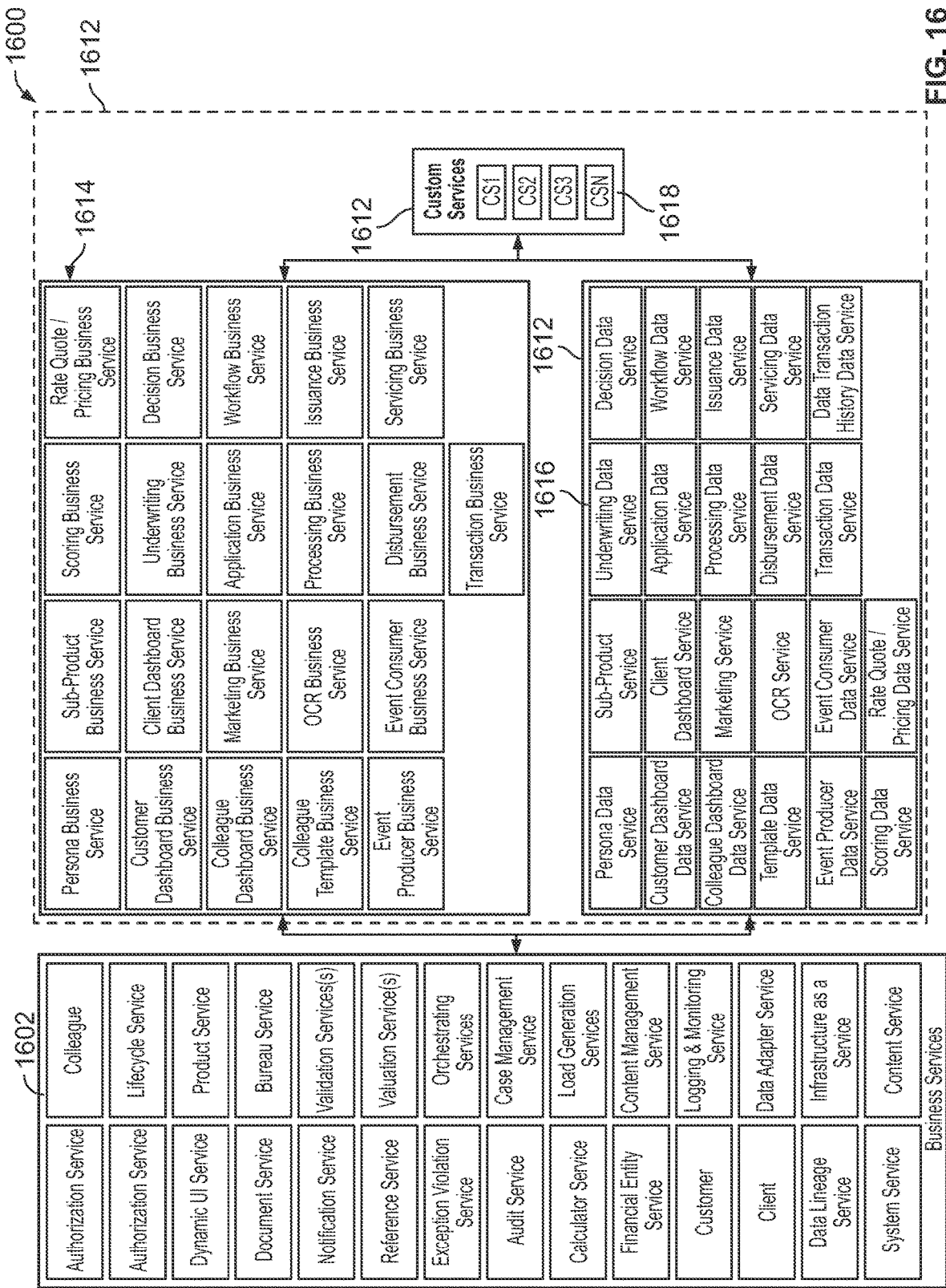
FIG. 16 is a diagram illustrating an exemplary micro-services architectural pattern that may underpin and/or be implemented by a unified platform according to the present disclosure.

For instance, FIG. 16 illustrates an exemplary micro-services architectural pattern 1600 that may underpin and/or be implemented by the unified lending platform 200 described herein. The micro-services architectural pattern 1600 may include one or more servers (e.g., cloud-based servers) that implement one or more APIs to provide one or more micro-services, such as platform services 1602 and/or CQRS pattern services 1612. As illustrated, platform services 1602 may include various services such as, for instance, authentication, authorization, customer, client, product, notification services, among others (both shown and not shown). CQRS pattern services 1612 may include, among other examples, business services 1614, data services 1616, and custom services 1618 (e.g., micro-services customized for one or more of a plurality of sub-journey webpages). Each of the platform services 1602 and CQRS pattern services 1612 may be accessed by an orchestration engine of the unified lending platform 200 (see, e.g., FIG. 14, Orchestration Engine 1400) through one or more APIs across one or more secure or unsecure communication channels.

To illustrate, in order to support one or more lending workflow journeys (see, e.g., FIG. 6, unified lending journey 619), their respective workflow steps (see, e.g., FIG. 6, workflow steps Originate 620, Underwrite 630, Process 640, Issue/Disburse 650, Service 660, etc.) and/or their respective sub-journeys (e.g., see FIG. 6, sub-journeys 680), the dynamic UI framework described herein (see, e.g., FIG. 5, dynamic UI framework 500) may build and maintain a corresponding plurality of webpages. In accordance with a corresponding workflow journey, the orchestration engine 1400 may access one or more of the platform services 1602 and/or CQRS pattern services 1612 through corresponding APIs. For instance, the orchestration engine 1400 may receive input data provided by a user via a webpage during a sub-journey 680 of the unified lending journey 619 (e.g., during workflow step Originate 620). In response to receiving the input data, the orchestration engine 1400 may access an authentication service of the platform services 1602 to, for example, authenticate the user. Data may be exchanged between the orchestration engine 1400 and the micro-services architectural pattern 1600 to authenticate the user. The orchestration engine 1400 may similarly access other micro-services provided by the micro-services architectural pattern 1600 throughout the exemplary unified lending journey 619.

7. Domain Based Data Architecture.

Complex end-to-end workflows, such as unified lending, may entail multiple entities issuing multiple, independent loan products offerings, each having a preset but personalized (and customizable) journey. Adding new persona's, products and personalized journeys may result in capturing, storing and using of new data attributes. As such, the platform of this disclosure comprises a domain driven data architecture that uses a balance of normalized and de-normalized data to cluster journey information into databases and tables with keys to connect them. Benefits of this domain-based data design includes (without limit): high horizontal (adding new tables) and vertical (adding new attributes) scalability of data within domains, thereby minimizing re-architecting the platform when new products, persona and personalized journey data is added; an ability to stitch end-to-end customer journeys together for audit, compliance and issue root cause analysis; balancing normalized and de-normalized data with the domain minimizes the efforts and time to extract information from the databases; enforcement to the micro-services and CQRS patterns with bounded context; and others.

Figure 17:
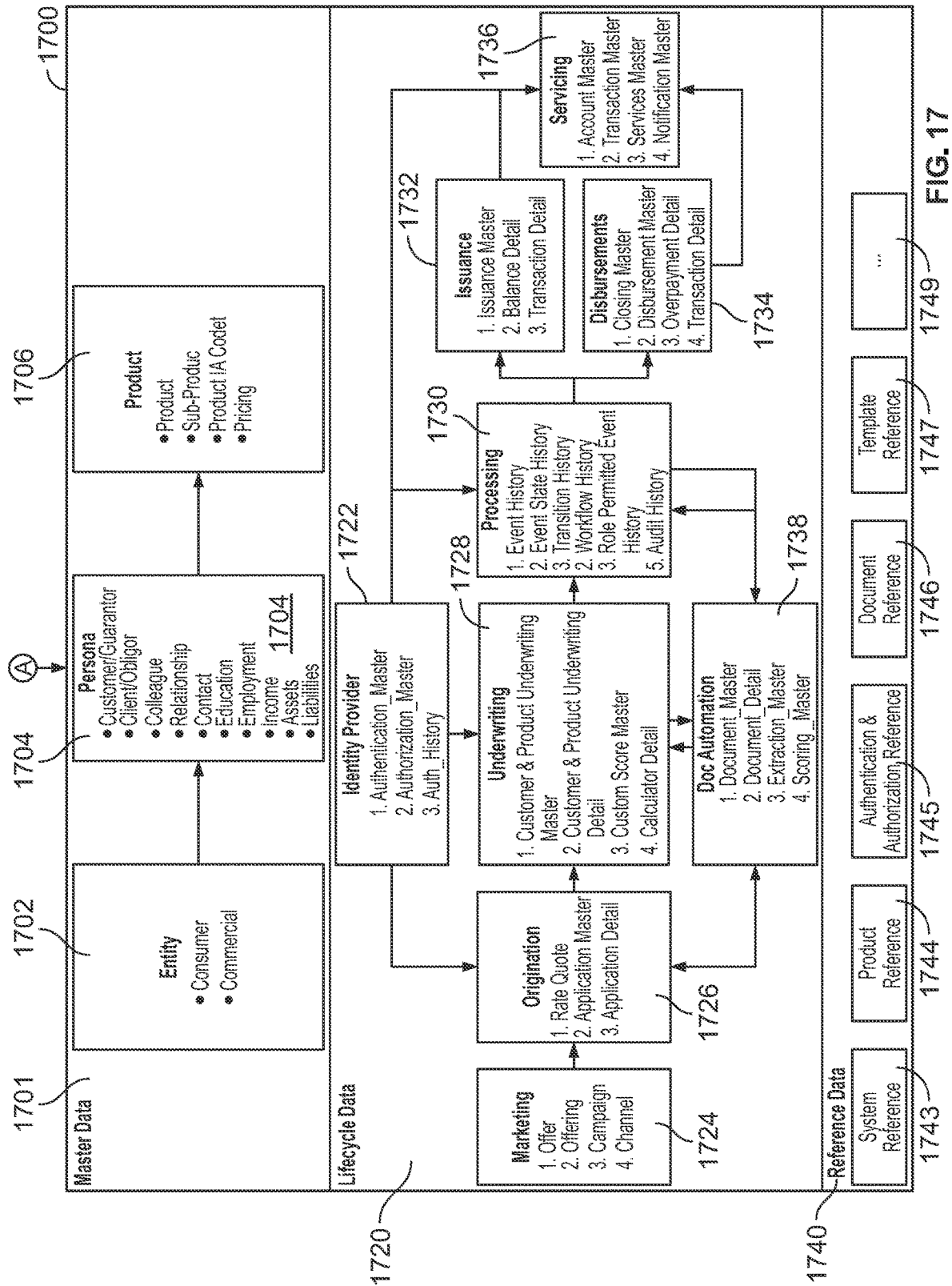
FIG. 17 is a diagram illustrating an exemplary domain driven data architecture that is operatively coupled to a micro-services architectural pattern according to the present disclosure.
Figure 17:
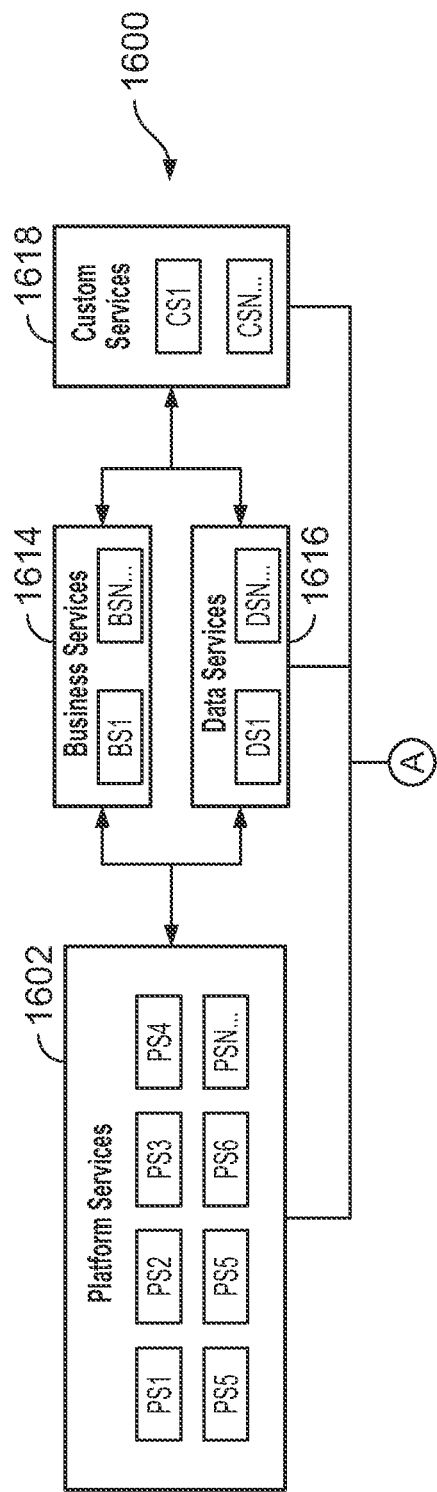

Turning now to FIG. 17, an exemplary domain driven data architecture 1700 that is operatively coupled to a micro-services architectural pattern (e.g., such as architectural pattern 1600 of FIG. 16) is shown. The domain driven data architecture 1700 may include any number of storage devices and/or data repositories, such as (without limit) a master data database 1701, a lifecycle data database 1720, and a reference data database 1740. Each of the master data database 1701, the lifecycle data database 1720, and the reference data database 1740 may comprise one or more data repositories, such as cloud-based data repositories, that store corresponding data.

The master data database 1701 may be configured to store all types of data, including (without limit) entity data 1702, persona data 1704, and product data 1706. The lifecycle data database 1720 may be configured to store data and information relevant to any workflow journey, sub-journey and/or workflow steps, such as those discussed herein with reference to FIG. 6 (e.g., unified lending journey 619 having workflow steps Originate 620, Underwrite 630, Process 640, Issue/Disburse 650, and Service 660 and corresponding sub-journeys 680). Such data and information may include, for example, identity provider data 1722, marketing data 1724, origination data 1726 (e.g., associated with one or more product/service originations corresponding to the Originate 620 workflow step), underwriting data 1728 (e.g., associated with one or more underwriting processes comprising the Underwriting 630 workflow step), processing data 1730 (e.g., associated with one or more data processing processes comprising the Process 640 workflow step), issuance data 1732 and disbursements data 1734 (e.g., associated with issue/disburse processes comprising the Issue/Disburse 650 workflow step), servicing data 1736 (e.g., associated with one or more servicing processes comprising the Service 660 workflow step), document automation data 1738, etc.

The reference data database 1740 may be configured to store, among other things, system reference data 1743, product reference data 1744, authentication and authorization reference data 1745, document reference data 1748, template reference data 1747, and/or any other reference data 1749. In operation, any of the micro-services of the micro-services architectural pattern 1600, such as platform services 1602 (e.g, PS1, PS2, . . . PSN), business services 1614 (e.g., BS1, BSN . . . ), data services 1616 (e.g., DS1, DSN . . . ) and/or custom services 1618 (e.g., CS1, CSN . . . ), may store data to, and/or read data from, any of the master data database 1701, lifecycle data database 1720, and reference data database 1740, thereby rendering all data and information accessible to components and operations of the platform as needed (e.g., in real-time).

8. One-Click Infrastructure as a Service Framework.

The Applicant has designed the unified lending (or LaaS) platform of this disclosure as a service framework configured to package network, security, infrastructure provisions (compute and storage) along with an integrated enterprise pipeline for engineering efficiencies into a one click deploy/destroy package on a cloud (e.g., AWS, GCP, Azure). As a result, the platform of this disclosure is scalable, for example, to account for new products, personas, user needs (e.g., users engaging in simultaneous and/or multiple end-to-end journeys, changes to linked systems, etc.), etc. Such scaling is possible because, as noted above, the platform has scalable compute and storage elements which may be leveraged by any number of users across any geography.

In addition, the service framework of this disclosure allows for the management of real-time high-volume traffic (e.g., millions of requests every second), etc., as well as for the automation of development, security and operation functions (e.g., for developing new features and/or customizing the platform). Further, this framework allows the platform of this disclosure to be packaged as a white-labeled solution as a software (e.g., LaaS) for other implementations.

Figure 18:
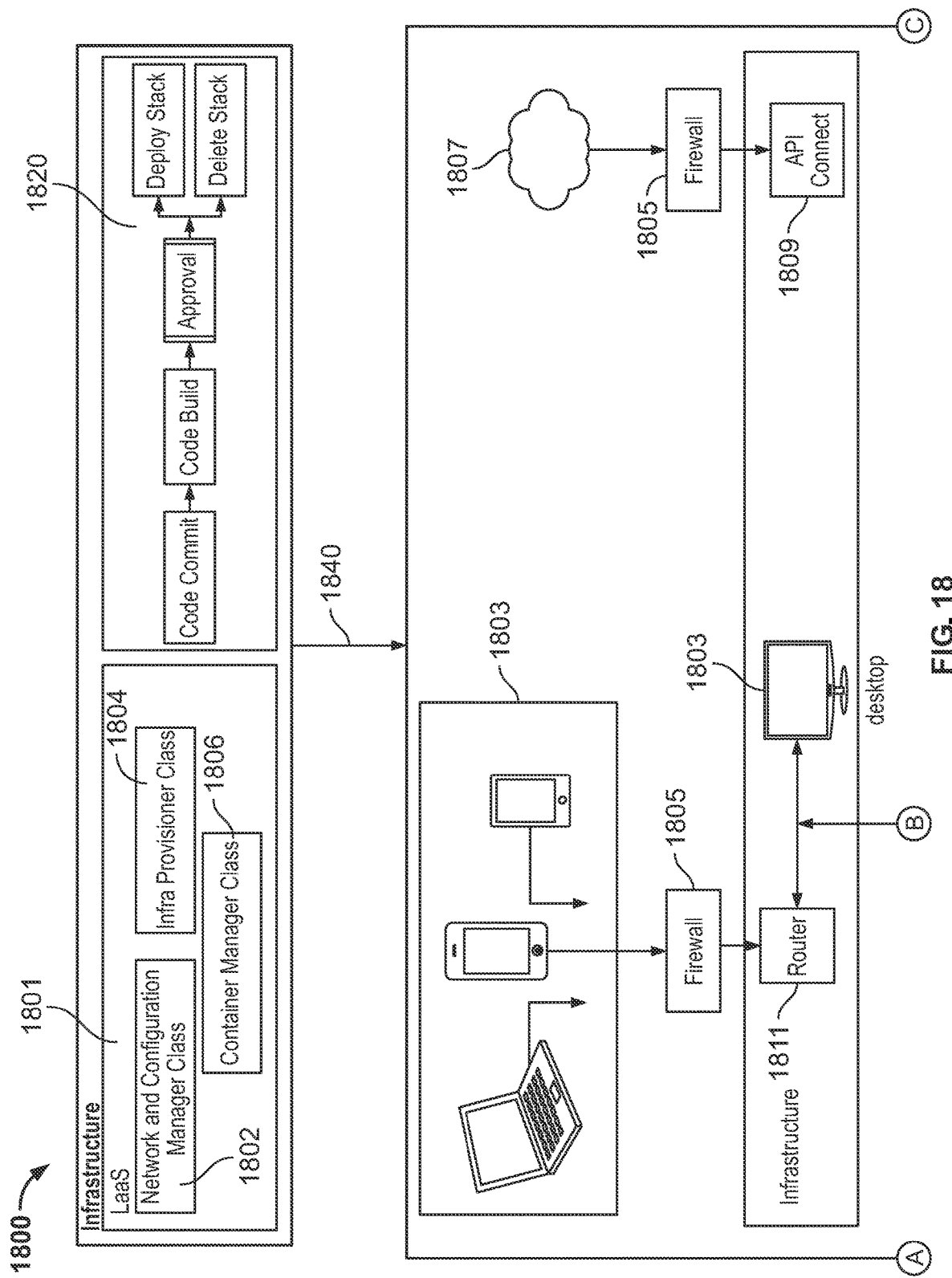
FIG. 18 is a diagram illustrating an exemplary service framework infrastructure that includes unified platform configured to package network, security, and infrastructure provisions, and an integrated enterprise pipeline for engineering efficiencies into a one click deploy/destroy package on a cloud, according to the present disclosure.
Figure 18:
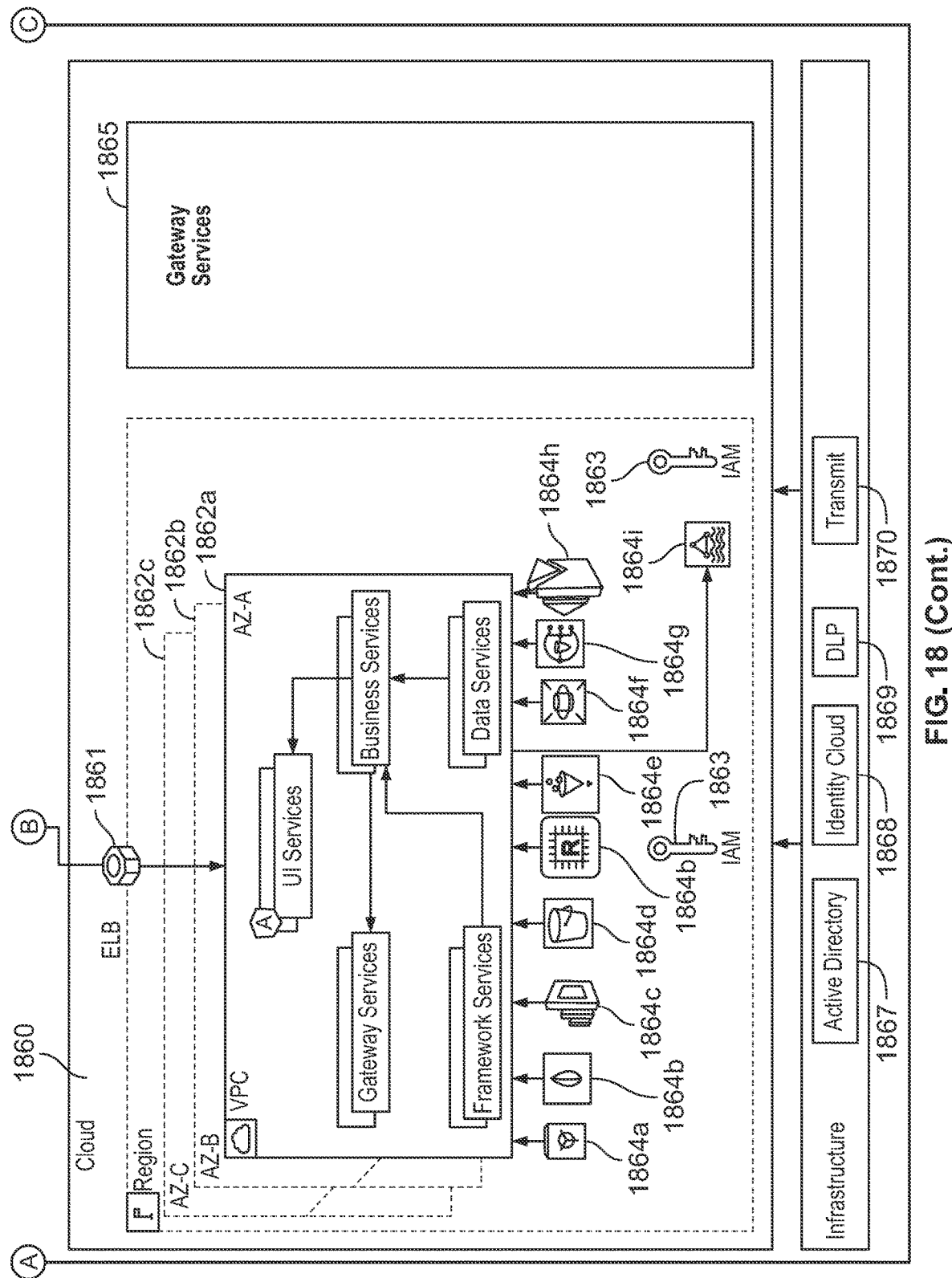

Turning now to FIG. 18, an exemplary service framework infrastructure 1800 that includes an LaaS platform 1801 configured to package network, security, and infrastructure provisions, and an integrated enterprise pipeline 1820 for engineering efficiencies into a one click deploy/destroy package 1840 on a cloud 1860, is shown. The LaaS platform 1801 and integrated enterprise pipeline 1820 may be implemented by one or more servers, such as cloud-based servers. The LaaS platform 1801 may include, for example, a network and configuration manager class 1802 configured to generate network and security provisions, an infrastructure provisioner class 1804 configured to generate infrastructure provisions, and a container manager class 1806 to package the network and security provisions and infrastructure provisions. Further, the integrated enterprise pipeline 1820 may perform operations to deploy code stacks to, or delete code stacks from, the cloud 1860. For instance, the integrated enterprise pipeline 1820 may generate a one click deploy/destroy package 1840 based on the packaged network and security provisions and infrastructure provisions provided by the container manager class 1806, and may deploy the one click deploy/destroy package 1840 to the cloud 1860. In this manner, the platform of this disclosure is scalable, for example, to account for new products, personas, user needs (e.g., users engaging in simultaneous and/or multiple end-to-end journeys, changes to linked systems, etc.).

Services (e.g., User Interface (UI) services, gateway services, business services, framework services, data services, etc.) on the cloud 1860 may be organized into multiple zones, such as Zone AZ-A 1862a, AZ-B 1862b, AZ-C 1862c, and so on, with each zone 1862a-c comprising a respective combination of available services (one or more of the services may be common among the zones 1862a-c). Access to the various services within the cloud 1860 may be protected by one or more identity and access management systems 1863, which may be configured to provide role-based access management to the services.

Users may access the various availability zones 1862a-c via a user device 1803 that may or may not first pass through a firewall 1805 before being routed via a router 1811 to the cloud 1860 hosting the availability zones 1862a-c, or the connection may be constituted via an API connect 1809 mechanism. User traffic for services in the availability zones 1862a-c may be balanced using an elastic load balancer 1861.

The cloud 1860 may also host any number of additional services and features for supporting the availability zones 1862*a-c* and their respective services. These include, for example, one or more: private key management service(s) for securely storing keys and other private data, memory data store(s) 1864*b*, search service(s) 1864*c*, blob storage 1864*d* for storing any file type, data processing service(s) 1864*e*, MySQL data store(s) 1864*f*, notification service(s) 1864*g* for sending alerts, texts, messages, etc. to platform-side users and end users, email service(s) 1864*h* for sending email transmissions to platform-side users and end users, service for processing and managing streaming data 1864*i*, and so on. The cloud 1860 may also host any number of third party gateway services 1865. The infrastructure may also provide active directory services 1867, secure identity cloud services 1868 (e.g., for linking multiple apps, logins, devices, etc.), data loss prevention services 1869, transmission services 1870, etc.

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including unified lending platform 200, single sign-on (SSO) multi-IdP framework 300, dynamic UI framework 500, real-time workflow state management framework 1000, document automation and template management framework 1100, active DLP framework 1200, orchestration engine 1400, micro-services architectural pattern 1600, domain driven data architecture 1700, service framework infrastructure 1800, LaaS platform 1801, and so on, may be implemented as one or more computer programs, i.e., one or more modules of computer program instructions encoded on a tangible non-transitory storage medium/program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, a server or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, special purpose microprocessors or another kind of specifically-configured central processing unit. A central processing unit according to this disclosure may receive instructions and data from a read-only memory or a random-access memory or both. Elements of a computer may include one or more central processing units for performing or executing instructions and one or more memory devices for storing instructions and data. A computer may also include, or be operatively coupled to receive, data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a laptop computer, a desktop computer, a television, a mobile audio or video player, a game console, a Global Positioning System (GPS), an assisted Global Positioning System (AGPS) receiver, a portable storage device, such as a universal serial bus (USB) flash drive, to name just a few.

Computer-readable media suitable for storing computer program instructions and data may include all forms of non-volatile memory, media and memory devices, including by way of example, semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube), LCD (liquid crystal display) monitor or other suitable display device for displaying information to the user and one or more input devices (e.g., a keyboard and a pointing device, such as a mouse or a trackball) by which the user can provide input to the computer. Other kinds of devices can be used to provide for interaction with a user as well such as, for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server may be co-located and/or remote from each other, and they may interact through one or more of a wired and wireless communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. A dynamic user interface framework comprising:
   one or more computing devices executing computer-readable program instructions that cause the dynamic user interface framework to:
   identify, select and obtain, from one or more memory devices, configuration and properties data associated with a user device;
   generate at least one web page for one or more workflow journeys based on the configuration and properties data;
   generate web page metadata for the at least one web page based on the configuration and properties data; and
   deploy the at least one web page and corresponding web page metadata, the at least one web page being configured specifically for the user device,
   wherein the one or more computing devices comprise an aggregator engine configured to generate web page metadata, the aggregator engine comprising a reference maps module that includes a data repository for storing at least one of a plurality of reference maps and index maps, the reference maps and index maps comprising instructions for invoking one or more functions.

2. The dynamic user interface framework of claim 1, wherein the configuration and properties data associated with the user device characterizes a type of the user device and a type of a browser of the user device, and wherein the dynamic user interface framework is configured to generate the at least one web page for the one or more workflow journeys based on the type of the user device and the type of the browser of the user device.

3. The dynamic user interface framework of claim 1, wherein the dynamic user interface framework is further configured to:
generate a dynamic and interactive graphical user interface (GUI) for the at least one web page in response to receiving a signal from the user device; and
generate a prompt message comprising the dynamic and interactive GUI for transmission to the user device.

4. The dynamic user interface framework of claim 1, wherein the one or more computing devices comprise a configuration engine configured to capture, store, maintain and update the configuration and properties data.

5. The dynamic user interface framework of claim 1, wherein the configuration and properties data comprises one or more of universal resource locator (URL) data, web page layout data, forms data, fields data, sequencing data, and data structure information data for one or more types of user devices, web browsers and operating systems.

6. The dynamic user interface framework of claim 4, wherein the configuration engine is further configured to generate, from the configuration and properties data, text-based data objects.

7. The dynamic user interface framework of claim 6, wherein the text-based data objects comprise Javascript™ object notation (JSON) objects.

8. The dynamic user interface framework of claim 6, wherein the one or more computing devices further comprise a dynamic forms engine configured to translate the text-based objects generated by the configuration engine, and to render, test and publish the at least one web page based on the translated text-based objects.

9. The dynamic user interface framework of claim 8, wherein the dynamic forms engine comprises one or more of an abstract wrapper, a properties interpreter, a responsive web translator, a render engine and a publish engine.

10. The dynamic user interface framework of claim 9, wherein the abstract wrapper is configured to translate the text-based objects from a standard text-based format to an extensible markup language (XML) format.

11. The dynamic user interface framework of claim 10, wherein the properties interpreter is configured to interpret the configuration and properties data included in the translated text-based objects.

12. The dynamic user interface framework of claim 11, wherein the responsive web translator is configured to render, based on the interpreted configuration and properties data provided by the properties interpreter, the at least one web page.

13. The dynamic user interface framework of claim 12, wherein the render engine is configured to test the at least one web page rendered by the responsive web translator.

14. The dynamic user interface framework of claim 13, wherein the publish engine is configured to publish the tested at least one web page.

15. The dynamic user interface framework of claim 14, wherein the publish engine is further configured to generate one or more tags coded for structuring the tested at least one web page and its contents.

16. The dynamic user interface framework of claim 15, wherein the one or more tags comprise hypertext markup language (HTML) tags.

17. The dynamic user interface framework of claim 15, wherein the publish engine is further configured to generate text-based data objects including data for integrating the tested at least one web page into one or more system backend components.

18. The dynamic user interface framework of claim 17, wherein the one or more system backend components comprise at least one of an application program interface (API), scripts and a database.

19. The dynamic user interface framework of claim 17, wherein the aggregator engine is further configured to generate the web page metadata from the text-based objects and tags generated by the dynamic forms engine, and wherein the web page metadata comprises information and instructions to be carried out by the one or more system backend components to support the tested at least one web page.

20. The dynamic user interface framework of claim 19, wherein the one or more functions comprise at least one of grouping a plurality of web pages together.

21. The dynamic user interface framework of claim 19, wherein the data repository comprises one or more of a local memory device and a cloud-based memory device.

22. The dynamic user interface framework of claim 20, wherein the aggregator engine comprises an event generator configured to generate, based on the at least one of the plurality of reference maps and index maps, metadata characterizing a sequence of events for the one or more workflow journeys.

23. The dynamic user interface framework of claim 20, wherein the metadata generated by the event generator is provided to the system backend components to support the one or more workflow journeys.

24. The dynamic user interface framework of claim 23, wherein the metadata generated by the event generator are converted to text-based objects prior to being provided to the system backend components.

25. The dynamic user interface framework of claim 19, wherein the aggregator engine is configured to operate in a runtime environment.

26. The dynamic user interface framework of claim 19, further comprising a transceiver for transmitting one or more of the tested at least one webpage and webpage metadata to one or more of the system backend components and a data storage device.

27. The dynamic user interface framework of claim 19, wherein each of the configuration engine, dynamic forms engine and aggregator engine are configured to operate in a polyglot micro-services architecture to generate, test, sequence and simultaneously deploy multiple webpages for multiple workflow journeys specifically configured for multiple types of user devices using multiple types of web browsers.

* * * * *